US012707154B2

(12) United States Patent
Xu

(10) Patent No.: US 12,707,154 B2
(45) Date of Patent: Aug. 11, 2026

(54) SHOOTING METHOD AND ELECTRONIC DEVICE

(71) Applicant: Honor Device Co., Ltd., Shenzhen (CN)

(72) Inventor: Jirun Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/696,501

(22) PCT Filed: Apr. 13, 2023

(86) PCT No.: PCT/CN2023/088174
§ 371 (c)(1),
(2) Date: Mar. 28, 2024

(87) PCT Pub. No.: WO2023/231600
PCT Pub. Date: Dec. 7, 2023

(65) Prior Publication Data
US 2024/0414444 A1 Dec. 12, 2024

(30) Foreign Application Priority Data
May 30, 2022 (CN) ......................... 202210603489.6

(51) Int. Cl.
*H04N 23/75* (2023.01)
*H04N 13/239* (2018.01)

(52) U.S. Cl.
CPC ........... *H04N 23/75* (2023.01); *H04N 13/239* (2018.05)

(58) Field of Classification Search
CPC ...... H04N 23/75; H04N 13/239; H04N 23/45; H04N 23/71; H04N 23/73; H04N 23/90; H04N 23/632; H04M 2250/52; H04M 1/72439
USPC ...... 348/221.1, 333.05, 333.11, 333.12, 362, 348/363, 364, 365, 366
See application file for complete search history.

(56) References Cited

U.S. PATENT DOCUMENTS 10,122,943 B1 11/2018 Chen et al.
11,343,438 B1 * 5/2022 Wang ..................... H04N 23/73
11,765,463 B2 9/2023 Li et al.
(Continued)

FOREIGN PATENT DOCUMENTS

CN 109151336 A 1/2019
CN 109743506 A 5/2019
(Continued)

*Primary Examiner* — Albert H Cutler
(74) *Attorney, Agent, or Firm* — Conley Rose, P.C.

(57) ABSTRACT

A shooting method and an electronic device, to synchronously increase or decrease an exposure for capturing images by a plurality of camera lenses when the plurality of camera lenses are used to perform shooting. The method is applied to an electronic device including a first camera lens and a second camera lens. The electronic device displays a first interface. The first interface includes a first image captured by the first camera lens and a second image captured by the second camera lens. The electronic device displays a second interface in response to the first operation performed on the second image. The second interface includes a third image captured by the first camera lens and a fourth image captured by the second camera lens.

20 Claims, 49 Drawing Sheets

(56) References Cited

U.S. PATENT DOCUMENTS

| | | | | |
|---|---|---|---|---|
| 2012/0105579 | A1* | 5/2012 | Jeon | H04N 5/772<br>348/47 |
| 2017/0264821 | A1* | 9/2017 | An | G06F 3/013 |
| 2017/0272644 | A1* | 9/2017 | Chou | H04N 7/181 |
| 2021/0203836 | A1* | 7/2021 | Qin | H04N 23/69 |
| 2022/0006939 | A1* | 1/2022 | Lee | G01B 11/026 |
| 2022/0053142 | A1 | 2/2022 | Manzari et al. | |
| 2022/0159183 | A1 | 5/2022 | Li et al. | |
| 2023/0116044 | A1* | 4/2023 | Han | H04N 23/45<br>348/220.1 |
| 2023/0164449 | A1* | 5/2023 | Guerin | H04N 23/741<br>348/222.1 |

FOREIGN PATENT DOCUMENTS

| | | | |
|---|---|---|---|
| CN | 110072070 | A | 7/2019 |
| CN | 107040726 | B | 4/2020 |
| CN | 107872625 | B | 5/2020 |
| CN | 108737739 | B | 1/2021 |
| CN | 113422908 | A | 9/2021 |
| CN | 113630558 | A | 11/2021 |
| CN | 113709354 | A | 11/2021 |
| CN | 114500843 | A | 5/2022 |

* cited by examiner

CONT. FROM FIG. 18D

SHOOTING METHOD AND ELECTRONIC DEVICE

CROSS-REFERENCE TO RELATED APPLICATIONS

This is a U.S. National Stage of International Application No. PCT/CN2023/088174, filed on Apr. 13, 2023, which claims priority to Chinese Patent Application No. 202210603489.6, filed on May 30, 2022, both of which are incorporated herein by reference in their entireties.

TECHNICAL FIELD

This application relates to the field of photo shooting technologies, and in particular, to a shooting method and an electronic device.

BACKGROUND

At present, electronic devices such as mobile phones and tablet computers usually support camera functions. For example, a camera application is installed in the electronic device. The electronic device may enable the camera function to shoot an image or a video. Further, to meet a diversified shooting requirement, the electronic device enables the camera function to simultaneously perform shooting by using a plurality of camera lenses, for example, to simultaneously perform shooting by using two camera lenses. Then, the electronic device may simultaneously display, in a display, images captured by the plurality of camera lenses.

However, in a conventional technology, in a scenario in which the electronic device performs shooting by using the plurality of camera lenses, the electronic device may only separately complete adjustment on an exposure parameter or a white balance for each camera lens. As a result, exposures or white balances of images in a plurality of regions in the display are inconsistent.

SUMMARY

In view of this, this application provides a shooting method and an electronic device, to maintain synchronous increase or decrease in an exposure for capturing images by a plurality of camera lenses when the plurality of camera lenses are used to perform shooting.

According to a first aspect, an embodiment of this application provides a shooting method. The shooting method is applied to an electronic device. The electronic device includes a first camera lens and a second camera lens. The electronic device displays a first interface. The first interface includes a first image captured by the first camera lens and a second image captured by the second camera lens. The electronic device receives a first operation performed on the second image. The first operation is used to trigger the electronic device to adjust an exposure parameter of a camera lens. For example, the first operation may be an operation a, for example, a tap operation performed on the second image by a user. Alternatively, the first operation may be an operation b performed on a control a, for example, a sliding operation performed on an EV adjustment bar on the second image by the user. It should be understood that the first operation is specific to the second image, that is, it indicates to request to adjust an exposure parameter for the second camera lens.

The electronic device displays a second interface in response to the first operation performed on the second image. The second interface includes a third image captured by the first camera lens and a fourth image captured by the second camera lens. An exposure of the third image is higher than an exposure of the first image, and an exposure of the fourth image is higher than an exposure of the second image. Alternatively, an exposure of the third image is lower than an exposure of the second image, and an exposure of the fourth image is lower than the exposure of the second image. In other words, an exposure of an image captured by the first camera lens and an exposure of an image captured by the second camera lens may be simultaneously increased or decreased.

In conclusion, in the method of this embodiment, when an exposure parameter of one camera lens is requested to be adjusted, the electronic device may synchronously adjust the exposure parameters of the two camera lenses, to enable the exposures of the images captured by the two camera lenses to be simultaneously increased or decreased.

The first interface may be a first interface in an embodiment shown in FIG. 7A to FIG. 7C, and correspondingly, the second interface may be a third interface in the embodiment shown in FIG. 7A to FIG. 7C. The first interface may be a third interface in an embodiment shown in FIG. 9A to FIG. 9C, and correspondingly, the second interface may be a fourth interface in the embodiment shown in FIG. 9A to FIG. 9C. The first interface may be a first interface in an embodiment shown in FIG. 12A to FIG. 12C, and correspondingly, the second interface may be a fifth interface embodiment shown in FIG. 12A to FIG. 12C. Alternatively, the first interface may be a fifth interface in an embodiment shown in FIG. 14A to FIG. 14C, and correspondingly, the second interface may be a sixth interface in the embodiment shown in FIG. 14A to FIG. 14C. The first image and the second image may be two images in the first interface, and the third image and the fourth image may be two images in the second interface. In addition, the first image and the third image are images captured by a same camera lens, and the second image and the fourth image are images captured by the same camera lens. The first operation may correspond to the operation a and the operation b in this embodiment. The first camera lens may correspond to the first camera lens in this embodiment, and correspondingly, the second camera lens may correspond to the second camera lens in this embodiment. Alternatively, the first camera lens may correspond to the second camera lens in this embodiment, and correspondingly, the second camera lens may correspond to the first camera lens in this embodiment.

In a specific implementation, the first camera lens and the second camera lens are front-facing camera lenses. Alternatively, the first camera lens and the second camera lens are rear-facing camera lenses. In a case in which the two camera lenses are the front-facing camera lenses, a shot view is usually a view on a front side of a mobile phone. In a case in which the two camera lenses are only the rear-facing camera lenses, a shot view is usually a view on a back side of a mobile phone. When the views shot by the two camera lenses are the same, coordination of the exposures of the images captured by the two camera lenses is higher. Therefore, in the case in which the first camera lens and the second camera lens are the front-facing camera lenses, or in the case in which the first camera lens and the second camera lens are the rear-facing camera lenses, a manner of synchronously adjusting an exposure parameter is used to synchronously change exposures of same images captured by the two camera lenses. Therefore, the coordination of the images captured by the two camera lenses is better.

In a specific implementation, a field of view of the first camera lens is greater than a field of view of the second camera lens. In other words, when an exposure parameter of a camera lens with a smaller field of view is required to be adjusted, the exposures of the images captured by the two camera lenses may be simultaneously increased or decreased.

It should be understood that, if a field of view FOV of a camera lens is larger, that is, a field of vision is larger, the camera lens may perform shooting on a view within a wider shooting angle range, an image with richer content and richer colors may be obtained, and a more appropriate exposure parameter may be determined based on the image.

Therefore, in a specific implementation, a touch position of the first operation performed on the second image is within a first region of the second image, and image content displayed in the first region is located within a second region of the first image. In a case in which the field of view of the first camera lens is greater than the field of view of the second camera lens, the method further includes: If an image parameter in the second region of the first image meets a first preset condition, the exposure of the third image is lower than the exposure of the first image, and the exposure of the fourth image is lower than the exposure of the second image. If an image parameter in the second region of the first image meets a second preset condition, the exposure of the third image is higher than the exposure of the first image, and the exposure of the fourth image is higher than the exposure of the second image. The image parameter includes clarity, contrast, and/a sharpening degree, and is a parameter reflecting quality of an image in the second region of the first image. The first preset condition and the second preset condition are conditions for measuring the quality of the image, for example, when the quality of the image is poor, the exposure may need to be decreased, and when the quality of the image is high, the exposure needs to be increased. In addition, the first region in this implementation corresponds to a second region in the embodiment shown in FIG. 12A to FIG. 12C, and the second region corresponds to a third region in the embodiment shown in FIG. 12A to FIG. 12C.

In other words, when the exposure parameter of the camera lens with the smaller field of view is required to be adjusted, a touched region may be first transferred to the first image, that is, transferred to an image that is captured by the camera lens that has a larger field of view, and the exposure is increased or decreased based on an image parameter in a corresponding region of the first image. This improves appropriateness of synchronously increasing the exposure.

In a specific implementation, the first preset identifier indicates a camera lens that is most suitably used as a basis for adjusting the exposure parameter and that is in a plurality of currently used camera lenses, that is, a master synchronization camera lens, for example, the first camera lens. Therefore, under a condition of determining that an identifier of the second camera lens is not the first preset identifier, a request of adjusting the exposure parameter needs to be switched to perform on the master synchronization camera lens, the exposure parameter is synchronously adjusted, and finally, the exposure parameter is displayed on the second interface.

In a specific implementation, the field of view of the first camera lens is smaller than the field of view of the second camera lens. In other words, when an exposure parameter of a camera lens with a larger field of view is required to be adjusted, the exposures of the images captured by the two camera lenses may be simultaneously increased or decreased.

In a specific implementation, the touch position of the first operation performed on the second image is within the first region of the second image. When the field of view of the first camera lens is smaller than the field of view of the second camera lens, the method further includes: If an image parameter in the first region of the second image meets a first preset condition, the exposure of the third image is lower than the exposure of the first image, and the exposure of the fourth image is lower than the exposure of the second image. If an image parameter in the first region of the second image meets a second preset condition, the exposure of the third image is higher than the exposure of the first image, and the exposure of the fourth image is higher than the exposure of the second image. The image parameter includes the clarity, the contrast and/the sharpening degree. In addition, the first region in this implementation corresponds to a first region in the embodiment shown in FIG. 7A to FIG. 7C.

In other words, when an exposure parameter of the camera lens with a larger field of view is required to be adjusted, the exposure may be directly increased or decreased based on an image parameter in the touch region of the image captured by the camera lens. Therefore, the switching process may be saved, and computation is saved.

In a specific implementation, the first preset identifier indicates the camera lens that is most suitably used as the basis for adjusting the exposure parameter and that is in the plurality of currently used camera lenses, that is, the master synchronization camera lens, for example, the first camera lens. Therefore, under a condition that an identifier of the first camera lens is a preset identifier, the exposure may be directly increased or decreased based on the image parameter in the touch region of the image captured by the camera lens, synchronized to the second camera lens, and displayed on the second interface.

In a specific implementation, the first operation indicates a first exposure value EV for performing exposure compensation. For example, the first operation may be the sliding operation performed on the EV adjustment bar. A corresponding EV may be selected by sliding. The method further includes: If the first EV is greater than a first preset EV, the exposure of the third image is lower than the exposure of the first image, and the exposure of the fourth image is lower than the exposure of the second image. If the first EV is less than a second preset EV, the exposure of the third image is higher than the exposure of the first image, the exposure of the fourth image is higher than the exposure of the second image, and the second preset EV is less than or equal to the first preset EV. For example, the first preset EV is equal to a second preset EV, that is, equal to 0. Therefore, the exposure parameter may be accurately adjusted based on the EV selected by the user. In this implementation, the first EV corresponds to a first EV in the embodiment shown in FIG. 9A to FIG. 9C, or a second EV in the embodiment shown in FIG. 14A to FIG. 14C.

In a specific implementation, the second image in the first interface includes a first control, and the first control is used to trigger the electronic device to adjust an exposure parameter of the second camera lens. The first operation includes a sliding operation performed on the first control. The first control corresponds to the control a in this embodiment.

In some scenarios, the user may need to adjust an exposure parameter of only one camera lens. After receiving a request to adjust the exposure parameter of only the one camera lens, the electronic device may record a corresponding preset identifier, to indicate to adjust the exposure parameter of only the one camera lens.

For example, after the electronic device displays the first interface, the electronic device receives a second operation performed on the second image. The second operation is used to trigger the electronic device to adjust the exposure parameter of the second camera lens, but not to adjust an exposure parameter of the first camera lens. For example, the second operation may be a long press operation. The electronic device records the second preset identifier in response to the second operation. The second preset identifier indicates to adjust the exposure parameter of only the second camera lens. In this implementation, the first camera lens corresponds to the second camera lens in the embodiment shown in FIG. 17A to FIG. 17C, and the second camera lens corresponds to the first camera lens in the embodiment shown in FIG. 17A to FIG. 17C. The second operation corresponds to an operation c in the embodiment shown in FIG. 17A to FIG. 17C, and the second preset identifier corresponds to a third identifier in the embodiment shown in FIG. 17A to FIG. 17C.

Further, after the electronic device receives the second operation performed on the second image, the method further includes: The electronic device displays first prompt information in the first interface in response to the second operation. The first prompt information prompts to adjust the exposure parameter of only the second camera lens. The first prompt information corresponds to the first prompt information in this embodiment.

Correspondingly, in response to the first operation performed on the second image, the electronic device simultaneously adjusts the exposures of the two camera lenses only in a case in which the second preset identifier is not obtained through querying, to display the second interface.

On the contrary, if obtaining through querying the second preset identifier, the electronic device displays a third interface in response to the first operation performed on the second image. The third interface includes a fifth image captured by the first camera lens and a sixth image captured by the second camera lens. An absolute difference between an exposure of the fifth image and the exposure of the first image is less than an absolute difference between an exposure of the sixth image and the exposure of the second image. In other words, the exposure of the image captured by only the second camera lens is significantly changed, while the exposure of the image captured by the first camera lens is not significantly changed. In this implementation, the first interface is a seventh interface in the embodiment shown in FIG. 17A to FIG. 17C, the first image is a thirteenth image in the embodiment shown in FIG. 17A to FIG. 17C, and the second image is a fourteenth image in the embodiment shown in FIG. 17A to FIG. 17C. The third interface corresponds to an eighth interface in the embodiment shown in FIG. 17A to FIG. 17C, the fifth image corresponds to a fifteenth image in the embodiment shown in FIG. 17A to FIG. 17C, and the sixth image corresponds to a sixteenth image in the embodiment shown in FIG. 17A to FIG. 17C.

According to a second aspect, an embodiment of this application further provides an electronic device. The electronic device includes a plurality of camera lenses (for example, a first camera lens and a second camera lens), a display, a memory, and one or more processors. The plurality of camera lenses, the display, and the memory are coupled to the processor. The memory stores computer program code, the computer program code includes computer instructions, and when the computer instructions are executed by the processor, the electronic device is enabled to perform the method according to the first aspect and any possible design manner thereof.

According to a third aspect, an embodiment of this application provides a chip system. The chip system is applied to an electronic device including a display and a memory; the chip system includes one or more interface circuits and one or more processors; the interface circuit and the processor are interconnected through a wire; the interface circuit is configured to receive a signal from the memory of the electronic device and send the signal to the processor, where the signal includes computer instructions stored in the memory; and when the processor executes the computer instructions, the electronic device performs the method according to the first aspect and any possible design manner of the first aspect.

According to a fourth aspect, this application provides a computer storage medium. The computer storage medium includes computer instructions. When the computer instructions are run on an electronic device, the electronic device is enabled to perform the method described in the first aspect and any possible design manner of the first aspect.

According to a fifth aspect, this application provides a computer program product. When the computer program product is run on a computer, the computer is enabled to perform the method described in the first aspect and any possible design manner of the first aspect.

It can be understood that, for beneficial effect that can be achieved by the electronic device according to the second aspect, the chip system according to the third aspect, the computer storage medium according to the fourth aspect, and the computer program product according to the fifth aspect, reference may be made to the beneficial effect in the first aspect and any possible design manner of the first aspect. Details are not described herein.

BRIEF DESCRIPTION OF THE DRAWINGS

FIG. TA to FIG. 1D are diagrams 1 of an interface of a mobile phone according to an embodiment of this application.

DESCRIPTION OF EMBODIMENTS

Figure 1A:
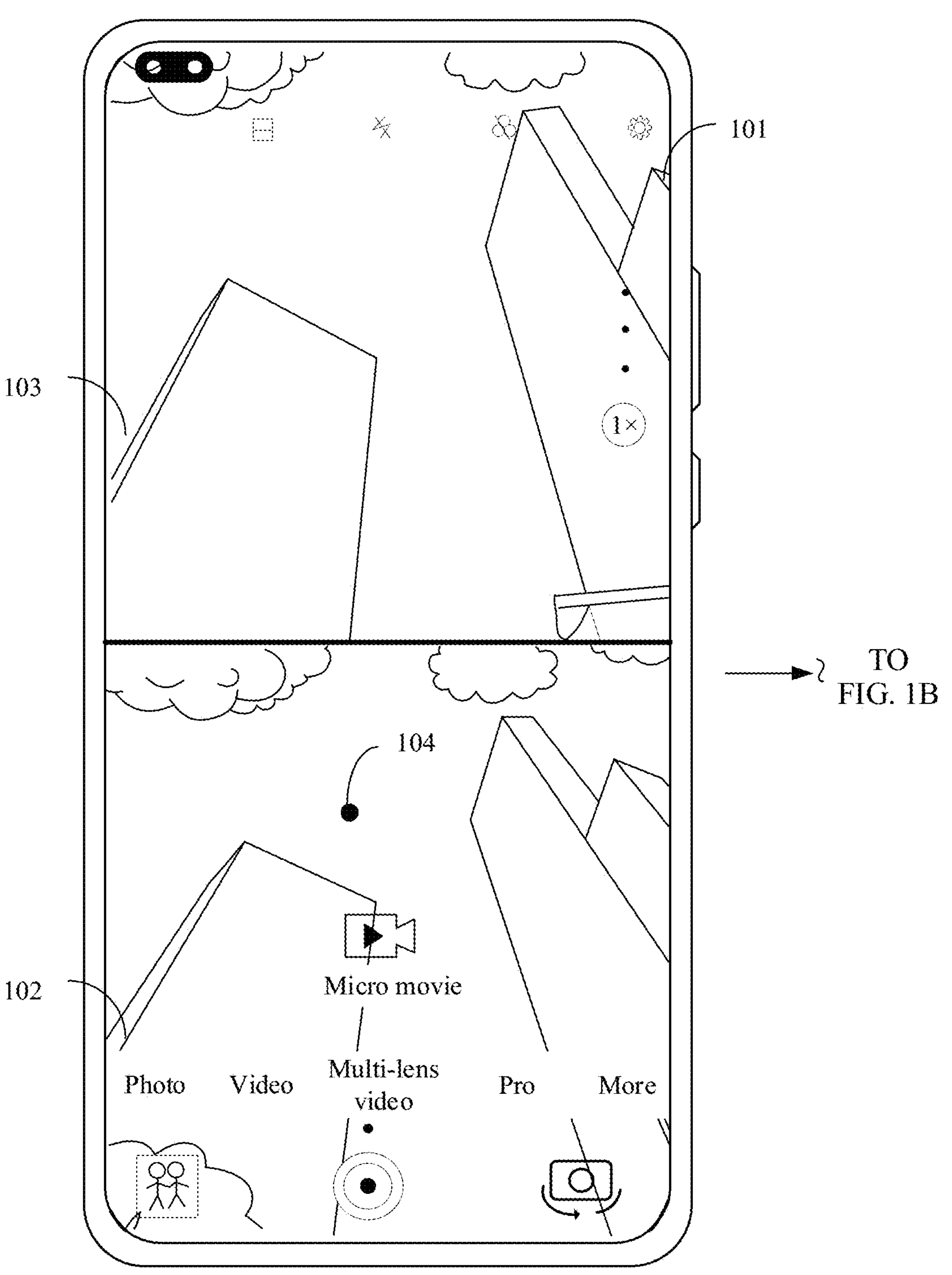
Figure 1B:
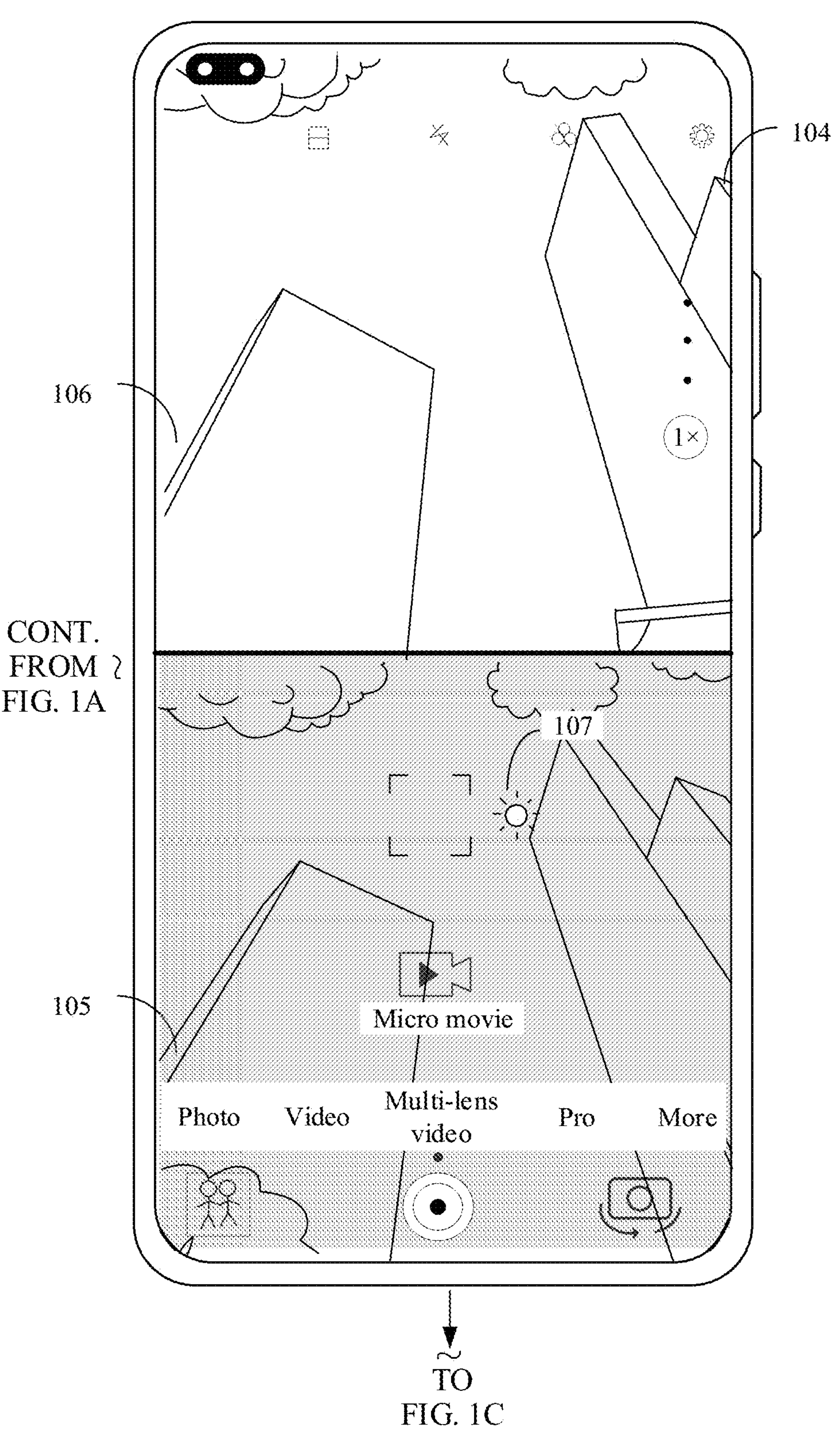
Figure 1C:
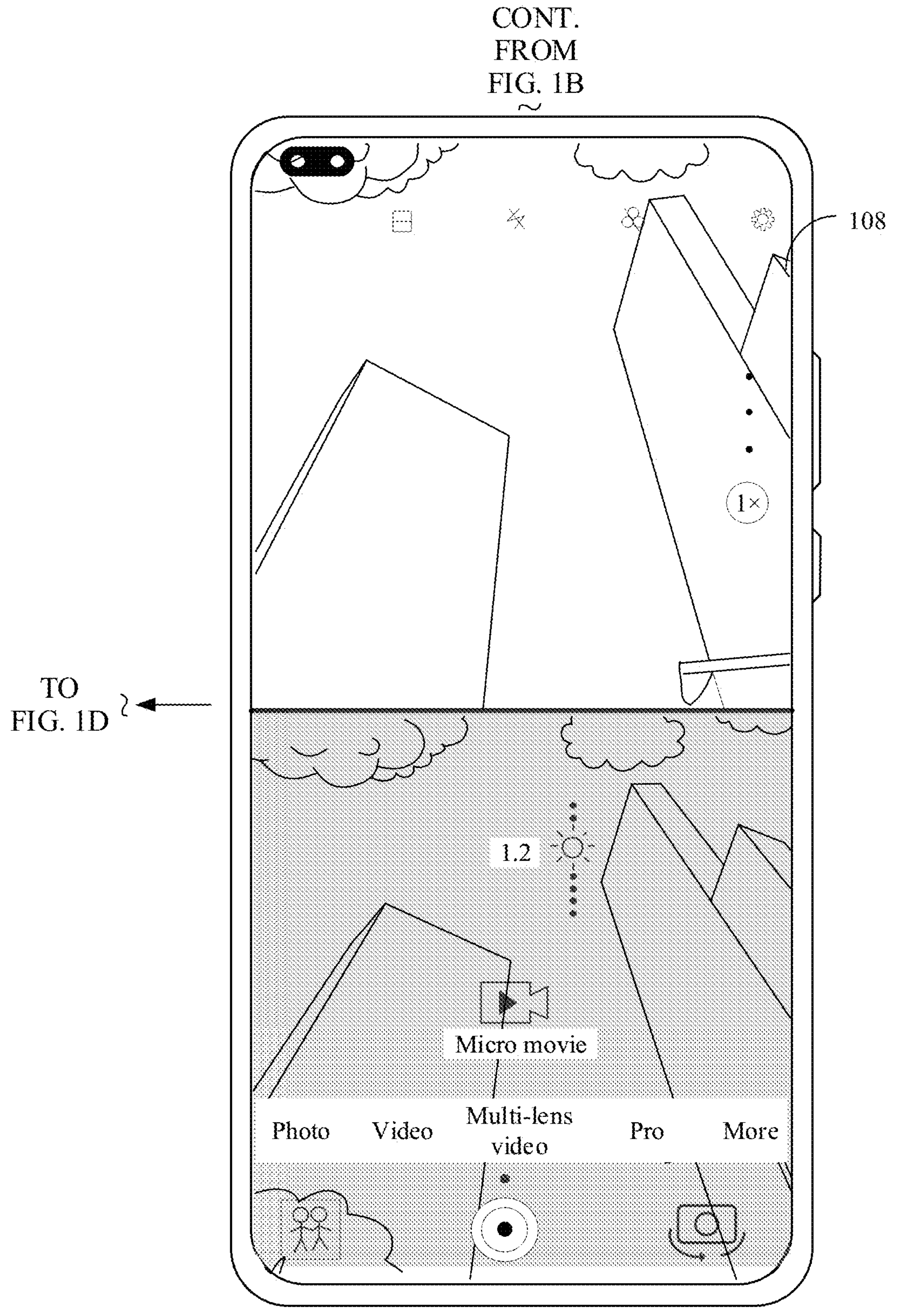

In descriptions of embodiments of this application, unless otherwise specified, "at least one" means one and "a plurality of" means two or more. In addition, for ease of describing the technical solutions in embodiments of this application clearly, in embodiments of this application, words such as "first" and "second" are used for distinguishing between same or similar items with a basically same function and role. A person skilled in the art may understand that the terms "first", "second", and the like, and do not limit a quantity and an execution order, and the terms "first", "second", and the like are not limited to be necessarily different. In addition, in the descriptions of embodiments of this application, unless otherwise specified, all the positions and forms of interface elements in schematic diagrams of interfaces are illustrative, and may be flexibly adjusted according to requirements during actual implementation.

An embodiment of this application provides a shooting method. The method may be applied to an electronic device supporting functions of a camera. For example, the electronic device in embodiments of this application may be devices such as a mobile phone, a tablet computer, a desktop computer, a laptop computer, a handheld computer, a notebook computer, an ultra-mobile personal computer (ultra-mobile personal computer, UMPC), a netbook, or an augmented reality (augmented reality, AR) or virtual reality (virtual reality, VR) device. A specific form of the electronic device is not specifically limited in embodiments of this application. The following mainly describes embodiments of this application by using an example in which the electronic device is a mobile phone.

The shooting method provided in embodiments of this application is mainly applied to a scenario (hereinafter briefly referred to as a multi-lens shooting scenario) in which the mobile phone simultaneously shoots a photo or a video by using a plurality of camera lenses. In the multi-lens shooting scenario, images captured by the plurality of camera lenses are displayed in a display of the mobile phone.

In some embodiments, in the multi-lens shooting scenario, the mobile phone may independently complete auto exposure (Auto Exposure, AE) and auto white balance (Auto White Balance, AWB) on the plurality of camera lenses. AE may ensure that brightness of an overall image is not excessively dark or not excessively bright. AWB may ensure that white in colors of the image is more accurate.

In some other embodiments, in the multi-lens shooting scenario, the mobile phone may receive an operation a that is performed on an image captured by a user using a specific camera lens. The operation a is used to trigger the mobile phone to perform AE on the camera lens. The operation a may be a tap operation, a long press operation, a sliding operation, or the like. In response to the operation a, the mobile phone may perform AE on the camera lens. If the operation a touches a brighter position in the image, the mobile phone may adjust an exposure parameter of the camera lens, to decrease an exposure and then reduce the brightness of the image. If the operation a touches a darker position in the image, the mobile phone may adjust an exposure parameter of the camera lens, to increase an exposure and then improve the brightness of the image. The exposure parameter may include an exposure time and an exposure gain. A product of the exposure time and the exposure gain is an exposure of the camera lens.

For example, the mobile phone may display an interface 101 shown in FIG. 1A to FIG. 1D. The interface 101 includes an image 102 captured by a rear-facing camera lens 1 and an image 103 captured by a rear-facing camera lens 2. The operation a may be a tap operation performed on a position 104 in the image 102 by the user. To be specific, the operation a triggers the mobile phone to perform AE on the rear-facing camera lens 1. In addition, brightness of the position 104 is high. Therefore, the exposure needs to be decreased. In response to the tap operation performed on the position 104 in the image 102, the mobile phone may display an interface 105 shown in FIG. 1A to FIG. 1D. The interface 105 includes an image 105 captured by the rear-facing camera lens 1 and an image 106 captured by the rear-facing camera lens 2. Apparently, in comparison to the image 102, an exposure of the image 105 is significantly decreased, and the image becomes dark. However, the mobile phone is not triggered to perform AE on the rear-facing camera lens 2. In comparison to the image 103, an exposure of the image 106 is not significantly changed.

Further, in response to the operation a that is performed on the image captured by the user using the specific camera lens, the mobile phone may further display, on the image captured by the camera lens, a control (which may be denoted as a control a) that is used to trigger the mobile phone to perform exposure compensation. For example, the control a is a control 107 in an interface 104 shown in FIG. TA to FIG. 1D. It should be noted that a position of the control a is typically displayed around the touch position of the operation a. In addition, a form of the control a is not limited to the control 107 shown in FIG. TA to FIG. 1D. For example, the control a may alternatively be an option button for a plurality of exposure values (Exposure Values, EV). Alternatively, the control a may be an exposure adjustment bar, and the like.

After completing AE based on the operation a performed by the user, the mobile phone may further receive an operation b performed on the control a by the user. The operation b is used to trigger the mobile phone to determine an EV for performing exposure compensation on the camera lens. The operation b is a tap operation, a long press operation, a sliding operation, or the like. In response to the operation b, the mobile phone may perform exposure compensation based on the determined EV. If the EV is a positive value, the exposure needs to be increased, to improve the brightness of the image. If the EV is a negative value, the exposure needs to be decreased, to reduce the brightness of the image. Therefore, exposure compensation may be more accurately performed based on the AE.

Figure 1D:
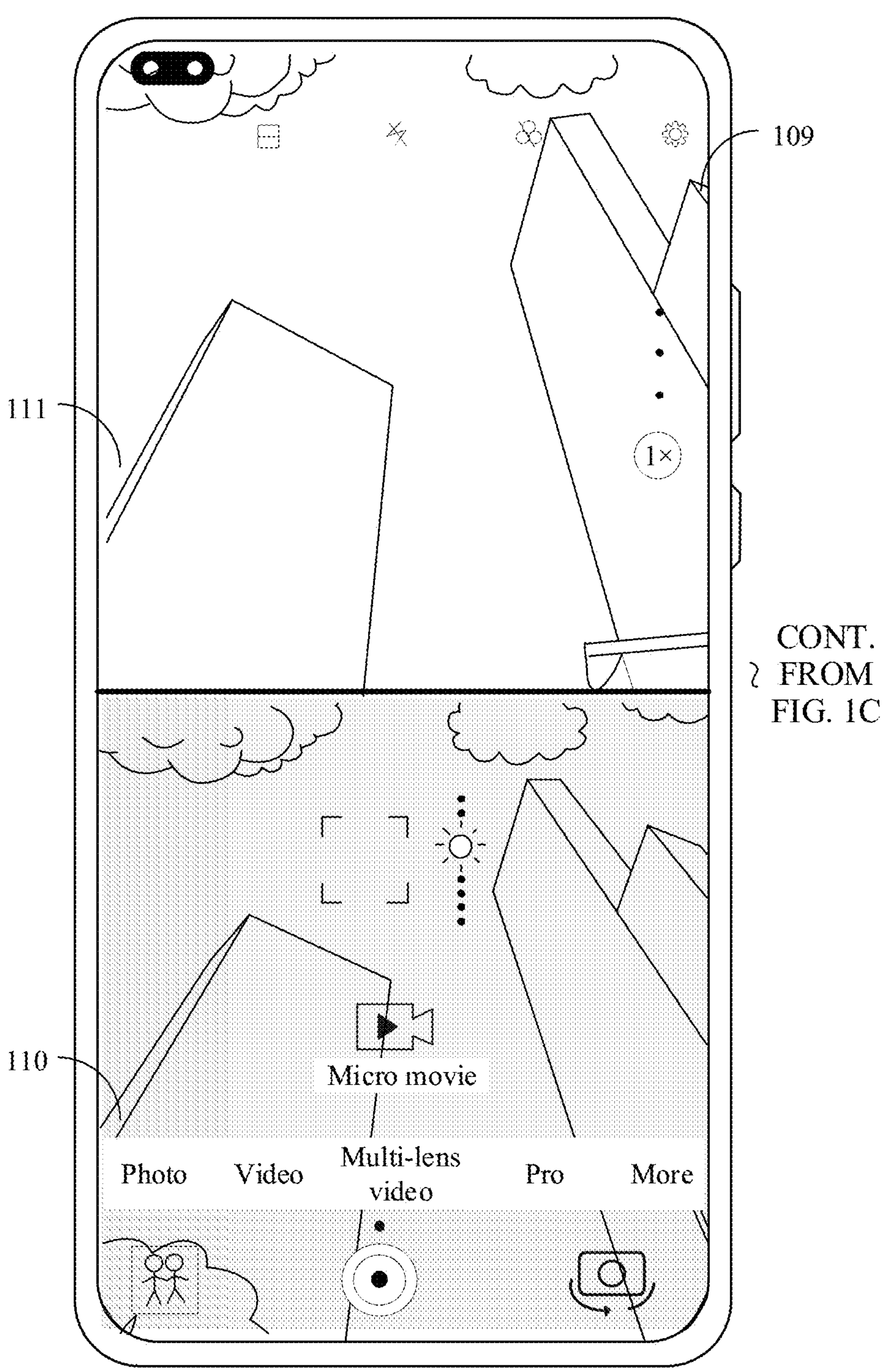

The following is an example in which the control a is the control 107 on the image 105 captured by the rear-facing camera lens 1 in the interface 104 shown in FIG. 1A to FIG. 1D, the operation b is the sliding operation, and an EV corresponding to the operation b is 1.2 in an interface 108 shown in FIG. TA to FIG. 1D. To be specific, the operation b triggers the mobile phone to perform exposure compensation on the rear-facing camera lens 1. Because the EV is a positive value, that is, the exposure needs to be increased, in response to the sliding operation performed on the control 107 by the user, the mobile phone may display an interface 109 shown in FIG. 1A to FIG. 1D. The interface 109 includes an image 110 captured by the rear-facing camera lens 1 and an image 111 captured by the rear-facing camera lens 2. Apparently, in comparison to the image 105, an exposure of the image 110 is significantly increased, and the image becomes bright. However, the mobile phone is not triggered to perform exposure compensation on the rear-facing camera lens 2. In comparison to the image 106, an exposure of the image 111 is not significantly changed.

In the foregoing descriptions of AE, AWB, and exposure compensation in the multi-lens shooting scenario, the following should be noted:

Firstly, the foregoing descriptions are mainly illustrated by using an example in which the plurality of camera lenses are two rear-facing camera lenses. During actual implementation, the plurality of camera lenses may be a combination of at least two of front-facing camera lenses and/or rear-facing camera lenses. This is not specifically limited in embodiments of this application.

Secondly, a viewfinder interface (for example, the interface 101, the interface 104, or the like) shown in FIG. TA to FIG. 1D is a viewfinder interface before a video is shot. In other words, FIG. TA to FIG. 1D are illustrated by using the AE, AWB, and exposure compensation before the video is shot as an example. During actual implementation, AE, AWB, and exposure compensation may alternatively be performed when the video is shot. Alternatively, AE, AWB, and exposure compensation may alternatively be performed in a viewfinder process before a photo is shot. This is not specifically limited in this embodiment of this application. It should be understood that, a difference from the video shooting is that photo shooting is an instantaneous action. Therefore, AE, AWB, and exposure compensation may not be performed after a photo is shot, but may be performed during viewing only before the photo is shot.

Thirdly, the foregoing is mainly illustrated by using an example in which the images captured by the plurality of camera lenses are displayed in a display through split-screens. During actual implementation, the images captured by the plurality of camera lenses may alternatively be displayed through picture-in-picture or another irregular layout. This is not specifically limited in this embodiment of this application.

In the foregoing embodiments of AE, AWB, and exposure compensation, the mobile phone may only implement AE, AWB, and exposure compensation on each camera lens separately. As a result, the images captured by the plurality of camera lenses are not coordinated, which is particularly prominent when the plurality of camera lenses are at least two front-facing camera lenses or at least two rear-facing camera lenses. In the interface 109 shown in FIG. 1A to FIG. 1D, the image 110 captured by the rear-facing camera lens 1 is significantly darker, while the image 111 captured by the rear-facing camera lens 2 is significantly brighter.

Based on this, the shooting method provided in embodiments of this application may be applied to the mobile phone. In a case in which the mobile phone uses the plurality of camera lenses to perform shooting, the mobile phone may display the images captured by the plurality of camera lenses. In addition, the exposures and/or white balances of the images captured by the plurality of camera lenses may be synchronously changed. For example, the exposure is synchronously increased or decreased. Therefore, the exposures and/or the white balances of the images captured by the plurality of camera lenses are more coordinated.

Figure 2:
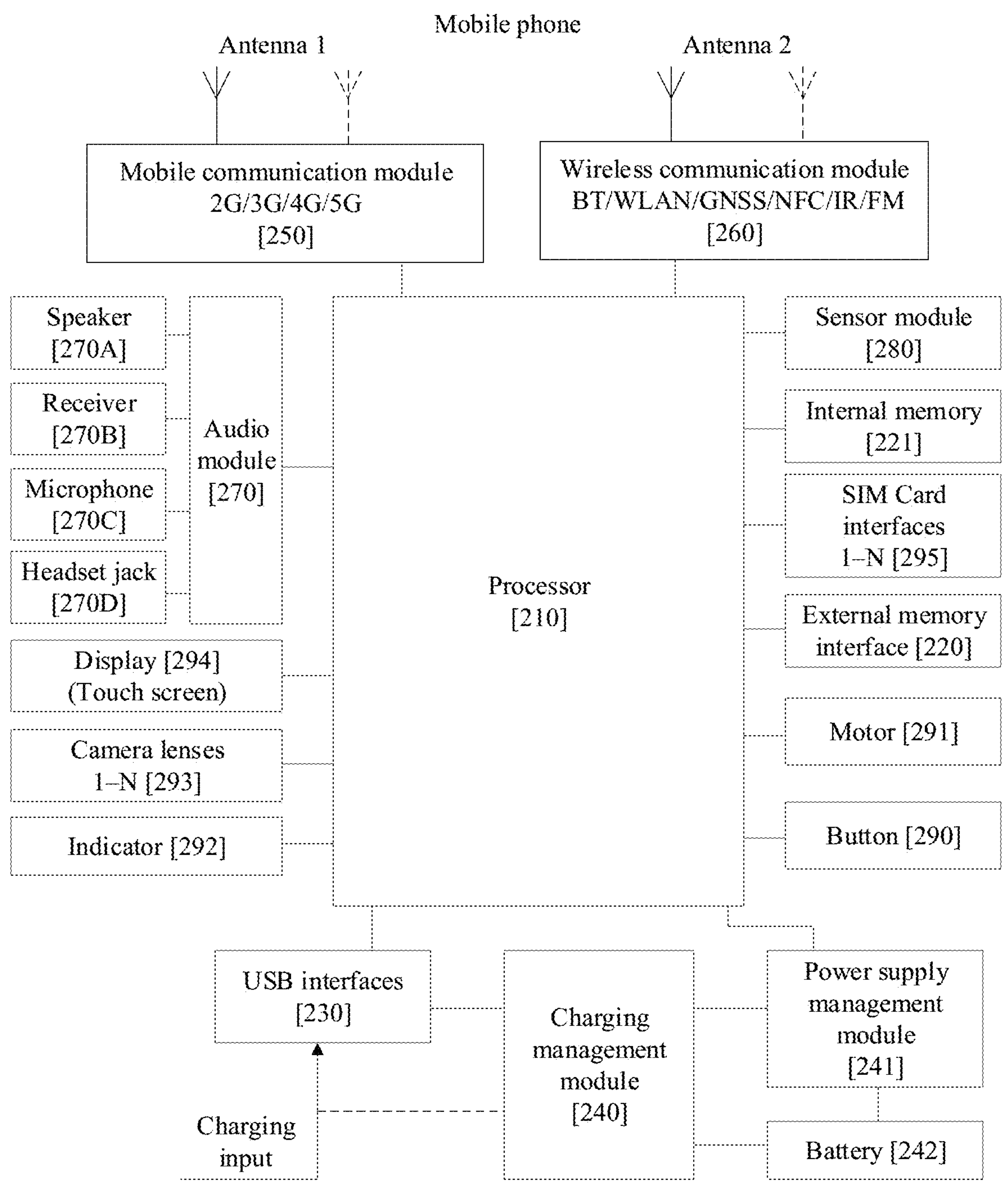
FIG. 2 is a diagram of a hardware structure of a mobile phone according to an embodiment of this application.

FIG. 2 is a diagram of a hardware structure of a mobile phone according to an embodiment of this application. As shown in FIG. 2, the mobile phone may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera lens 293, a display 294, a subscriber identification module (subscriber identification module, SIM) card interface 295, and the like.

It may be understood that the structure illustrated in this embodiment does not constitute a specific limitation on the mobile phone. In some other embodiments, the mobile phone may include more or fewer components than those shown in the figure, or some components may be combined, or some components may be split, or components are arranged in different manners. The components in the portrait may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video encoder and decoder, a digital signal processor (digital signal processor, DSP), a baseband processor, and/or a neural-network processing unit (neural-network processing unit, NPU). Different processing units may be separate devices, or may be integrated into one or more processors.

The charging management module 240 is configured to receive charging input from a charger. The charger may be a wireless charger, or may be a wired charger. The power management module 241 is configured to connect the battery 242 and the charging management module 240 to the processor 210. The power management module 241 receives an input from the battery 242 and/or an input from the charging management module 240, to supply power to the processor 210, the internal memory 221, an external memory, the display 294, the camera lens 293, the wireless communication module 260, and the like.

A wireless communication function of the mobile phone can be implemented by the antenna 1, the antenna 2, the mobile communication module 250, the wireless communication module 260, the modem processor, the baseband processor, and the like.

The mobile communication module 250 can provide a wireless communication solution including 2G/3G/4G/5G and the like to be applied to the mobile phone. The mobile communication module 250 may include at least one filter, a switch, a power amplifier, a low noise amplifier (low noise amplifier, LNA), and the like.

The wireless communication module 260 may provide a solution for wireless communication including a wireless local area network (wireless local area network, WLAN) (such as a wireless fidelity (wireless fidelity, Wi-Fi) network), Bluetooth (bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the mobile phone.

The mobile phone implements a display function by using the GPU, a display 294, the application processor, and the like. The GPU is a microprocessor for image processing and connects the display 294 and the application processor. The GPU is configured to perform mathematical and geometric calculations and graphics rendering. The processor 210 may include one or more GPUs to execute program instructions to generate or change display information.

The display 294 is configured to display an image and a video. In some embodiments, the display 294 may display images of a plurality of camera lenses.

The mobile phone may implement a shooting function by using the ISP, the camera lens 293, the video encoder and decoder, the GPU, the display 294, the application processor, and the like. The camera lens 293 is configured to capture a still image or a video. An optical image of an object is generated through a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV.

In some embodiments, the mobile phone may include 1 or N camera lenses 293, and N is a positive integer greater than 1, for example, a rear-facing ultra-wide-angle camera lens, a rear-facing wide-angle camera lens, a rear-facing master camera lens, a rear-facing long-focus camera lens, a front-facing camera lens, and the like.

The external memory interface 220 may be configured to connect to an external storage card such as a Micro SD card, to extend a storage capability of the mobile phone. The external storage card communicates with the processor 210 through the external memory interface 220 to implement a data storage function, for example, music files, video files, and other files are stored in the external memory card.

The internal memory (memory for short) 221 may be configured to store computer executable program code. The executable program code includes instructions. The processor 210 runs the instructions stored in the internal memory 221, to perform various function applications and data processing of the mobile phone.

The mobile phone may implement, through the audio module 270, loudspeaker 270A, receiver 270B, microphone 270C, headset jack 270D, and application processor, audio functions such as music playing and sound recording.

The button 290 includes a power on/off button, a volume button, and the like. The button 290 may be a mechanical button, or a touch button. The mobile phone may receive a button-based input, and generate a button signal input related to a user setting and function control of the mobile phone.

The motor 291 may generate a vibration prompt. The motor 291 may be configured to provide a vibration prompt for an incoming call, and may also be configured to provide vibration feedback for touch. The indicator 292 may be an indicator light, and may be configured to indicate a charging state and a power change, or may be configured to indicate a message, a missed incoming call, a notification, or the like.

The SIM card interface 295 is configured to be connected to an SIM card. The SIM card may be inserted into the SIM card interface 295 or removed from the SIM card interface 295 to touch or separate from the mobile phone. The mobile phone may support 1 or N SIM card interfaces, where N is a positive integer greater than 1.

Figure 3:
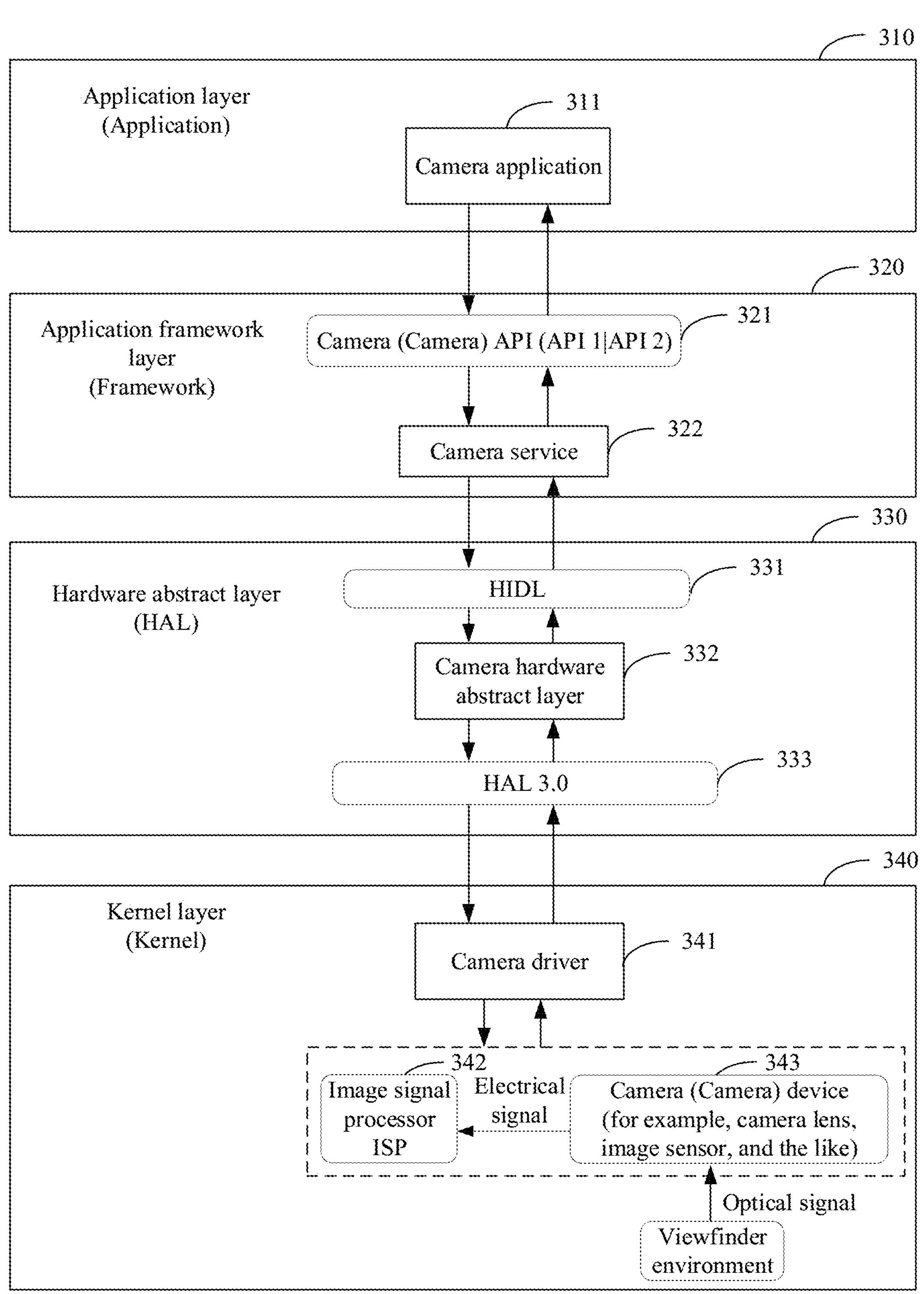
FIG. 3 is a diagram of a software architecture of a mobile phone according to an embodiment of this application.

FIG. 3 is a diagram of a software architecture of a mobile phone according to an embodiment of this application. A software system of the mobile phone may use a layered architecture, an event driven architecture, a micro core architecture, a micro service architecture, or a cloud architecture. In this embodiment of this application, an Android system with a layered architecture is used as an example to describe a software architecture of the mobile phone.

As shown in FIG. 3, in a hierarchical architecture, software may be divided into several layers, and each layer has a clear role and task. Layers communicate with each other through a software interface. In some embodiments, the Android system is divided into four layers: an application layer (briefly referred to as an application layer) 310, an application framework layer (briefly referred to as a framework layer) 320, a hardware abstraction layer (hardware abstraction layer, HAL) layer 330, and a kernel layer (Kernel, also referred to as a driver layer) 340 from top to bottom.

The application layer (Application) 310 may include a series of application packages. The application packages may be applications such as camera, gallery, calendar, phone, map, navigation, WLAN, Bluetooth, music, videos, messaging, home screen launcher (Launcher).

In embodiments of this application, the application layer 310 may include applications that support photo or video shooting, such as a system camera application (also referred to as a camera application 311), or third-party applications such as WeChat™, Beauty Camera™, Taobao™, and the like. The following is an example of the camera application 311.

The camera application 311 may send a frame request to an underlying layer (for example, a kernel layer 340), to indicate the camera lens to capture a new image. In addition, the camera application 311 may display each frame image, that is, images captured by a plurality of camera lenses, in a viewfinder interface (for example, the interface 101, interface 104, interface 108, and the like shown in FIG. 1A to FIG. 1D).

The camera application 311 may receive an operation a performed on the viewfinder interface by a user, and may further receive an operation b performed on a control a in the viewfinder interface by the user. In response to the operation a or the operation b, the camera application 311 may send, to the underlying layer (for example, the kernel layer 340), a request for performing AE or a request for performing exposure compensation.

The framework layer (Framework) 320 provides an application programming interface (application programming interface, API) and a programming framework for the application layer. The framework layer 320 includes some predefined functions. As shown in FIG. 3, the framework layer 320 may provide a camera API, for example, Camera API (API 1|API 2) 321.

The Camera API (API 1|API 2) 321 is an interface for interaction between the underlying layer (for example, the hardware abstract layer 330) and the application layer 310. Specifically, the Camera API (API 1 API 2) 321 may receive a request from an upper layer (for example, the application layer 310), for example, a frame request, an AE request, an exposure compensation request, and the like, and send the request to the HAL layer 330 through a camera service 322.

The HAL layer 330 is used to connect the framework layer 320 and the kernel layer 340. For example, the HAL layer 330 may transfer data between the framework layer 320 and the kernel layer 340. Certainly, the HAL layer 330 may further process data from the underlying layer (for example, the kernel layer 340), and transfer the data to the framework layer 320.

As shown in FIG. 3, the HAL layer 430 may include a HAL interface definition language (HAL interface definition language, HIDL) interface 331, a camera hardware abstract layer (hardware abstract layer) 332, and a HAL interface. The camera hardware abstract layer 332 maintains normal communication with the upper layer (for example, the camera service 322) by providing a standard HIDL interface for the upper layer for invoking. In addition, the camera hardware abstract layer 332 controls the kernel layer 340 downwardly through a standard HAL interface, for example, a HAL 3.0, and obtains image frame data reported by the kernel layer 340.

In some embodiments, the camera hardware abstract layer 332 may process the frame request, the AE request, the exposure compensation request, and the like from the upper layer (for example, the camera application 311), and send the processed request to the underlying layer (for example, the kernel layer 340). This facilitates synchronization of exposures and white balances of the images captured by the plurality of camera lenses.

The camera hardware abstract layer 332 may further report the image data reported by the underlying layer (for example, the kernel layer 340) to the upper layer (for example, the camera service 322) for display.

The kernel layer 340 includes a camera driver 341, an image signal processor ISP 342, and a camera (Camera) device 343. The camera device 343 may include a plurality of camera lenses. Each camera lens includes a lens of a camera, an image sensor, and the like. The ISP 342 is configured to process data fed back by the camera device 343. For example, when shooting is performed, a shutter is pressed, and light is transmitted to a photosensitive element of the camera lens through a lens. An optical signal is converted into an electrical signal. The photosensitive element of the camera transmits the electrical signal to the ISP for processing, to convert the electrical signal into an image visible to naked eyes. The ISP 342 may further perform algorithm optimization on noise, brightness, and a skin tone of the image.

It should be understood that the image signal processor ISP 342 and the camera device 343 are master devices for shooting a video or a photo. An optical signal reflected from a viewfinder environment may irradiate on the image sensor through the lens of the camera, and then may be converted into an electrical signal. The electrical signal may be processed by the image signal processor ISP 342, used as a raw parameter stream (for example, a video stream), and transmitted to the upper layer by using the camera driver 341. In addition, the camera driver 341 may further receive a notification (for example, a notification indicating to open or close the camera lens) from the upper layer, and send, to the camera device 343 based on the notification, a function processing parameter stream.

In some embodiments, the ISP 342 may further optimize an exposure parameter and a white balance parameter in a multi-lens shooting scenario, to synchronously adjust exposure parameters and white balance parameters of the plurality of camera lenses. For example, the ISP 342 may determine the exposure parameter and the white balance parameter according to a 3A algorithm. 3A includes automatic focus (Automatic Focus, AF), AE, and AWB. The 3A algorithm is not described in detail in this specification. In addition, the determined exposure parameter and white balance parameter are sent to the camera device 343 by using the camera driver 341.

The following is an example in which each camera lens completes processing on an image corresponding to the camera lens by using an ISP 342 (or an ISP module) corresponding to each camera lens. For example, in the following descriptions, a first ISP is configured for a first camera lens, and a second ISP is configured for a second camera lens. It should be noted that the ISP 342 and a corresponding camera lens (for example, the camera device 343) may be separately disposed. Alternatively, the ISP 342 may be disposed in a corresponding camera lens (for example, the camera device 343). This is not limited in this application.

The shooting method provided in embodiments of this application may be implemented in a mobile phone having the foregoing hardware structure and software structure.

In this embodiment, in the multi-lens shooting scenario, the mobile phone may first determine a master synchronization camera lens and a slave synchronization camera lens in a plurality of currently used camera lenses. Subsequently, when the plurality of camera lenses capture images, synchronously changing an exposure parameter of an image captured by the slave synchronization camera lens and an exposure parameter of an image captured by the master synchronization camera lens is maintained, and synchronously changing a white balance parameter of an image captured by the slave synchronization camera lens and a white balance parameter of an image captured by the master synchronization camera lens is maintained. Corresponding, when the mobile phone displays the images captured by the plurality of camera lenses in the viewfinder interface, effect on a synchronous change in the exposures and white balances of the images captured by the plurality of camera lenses may be presented.

The following describes a specific implementation in which the mobile phone determines the master camera lens and the slave camera lens in the multi-lens shooting scenario.

In the multi-lens shooting scenario, the plurality of currently used camera lenses may be a combination of at least two camera lenses in front-facing camera lenses and/or rear-facing camera lenses. Each camera lens has a corresponding field of view (Field of view, FOV). The FOV means a range of an angle at which a camera lens may receive an image. The FOV may also be referred to as a field of vision. Generally, the camera lenses may be sorted in a sequence from a large FOV to a small FOV: an ultra-wide-angle camera lens, a wide-angle camera lens, a master camera lens, and a long-focus camera lens. For the long-focus camera lens, if a zoom magnification is higher, the FOV is smaller. For example, a FOV of a 10× long-focus camera lens is smaller than a FOV of a 2× long-focus camera lens.

If the FOV of the camera lens is larger, that is, the field of vision is larger, the camera lens may perform shooting on a view within a wider range of an angle, and an image with richer content and colors may be obtained. On the contrary, if the FOV of the camera lens is smaller, that is, the field of version is smaller, the camera lens may only perform shooting on a view within a smaller range of an angle, and an image with simpler content and color may be obtained.

Figure 4A:
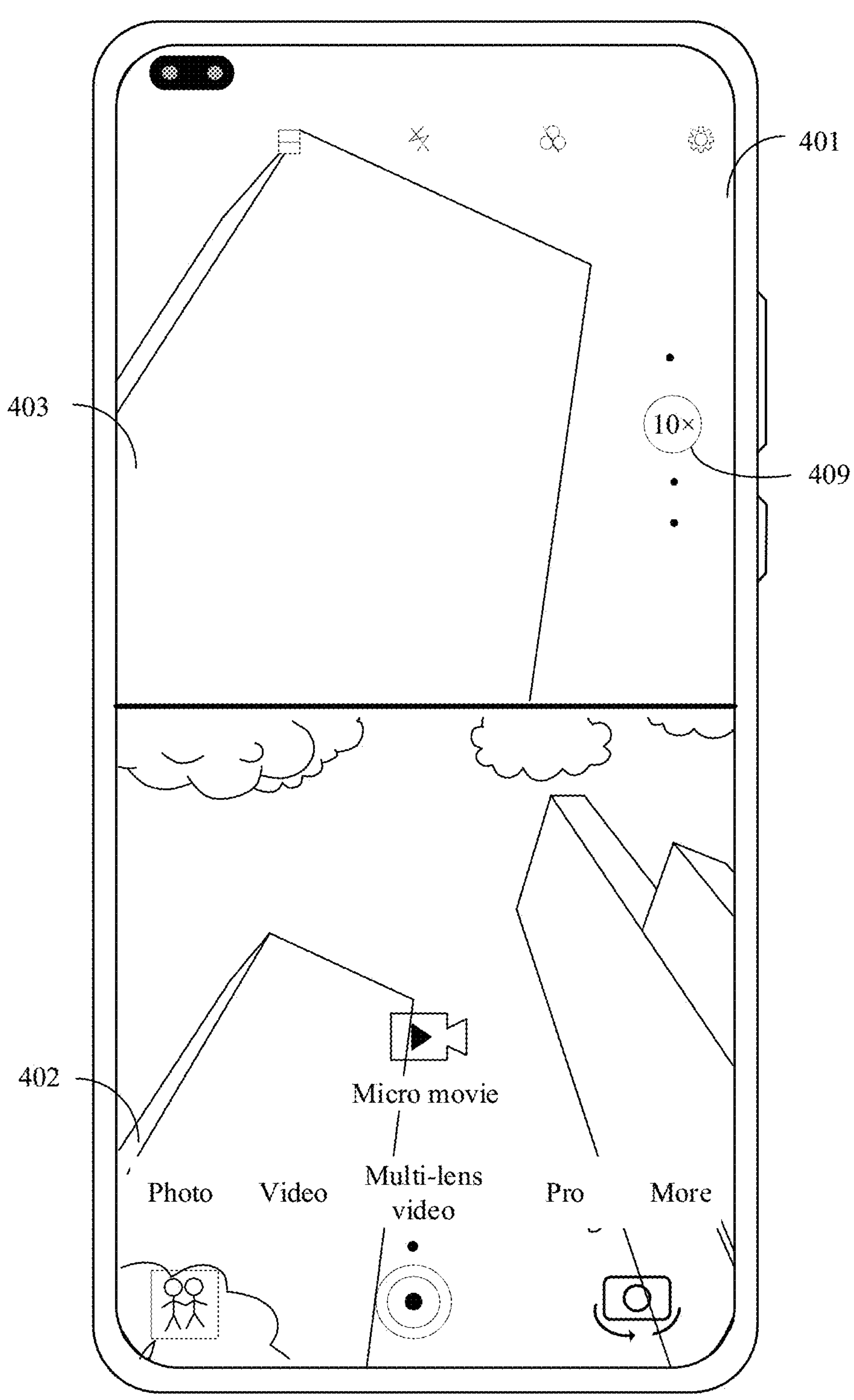
FIG. 4A and FIG. 4B are diagrams 2 of an interface of a mobile phone according to an embodiment of this application.
Figure 4B:
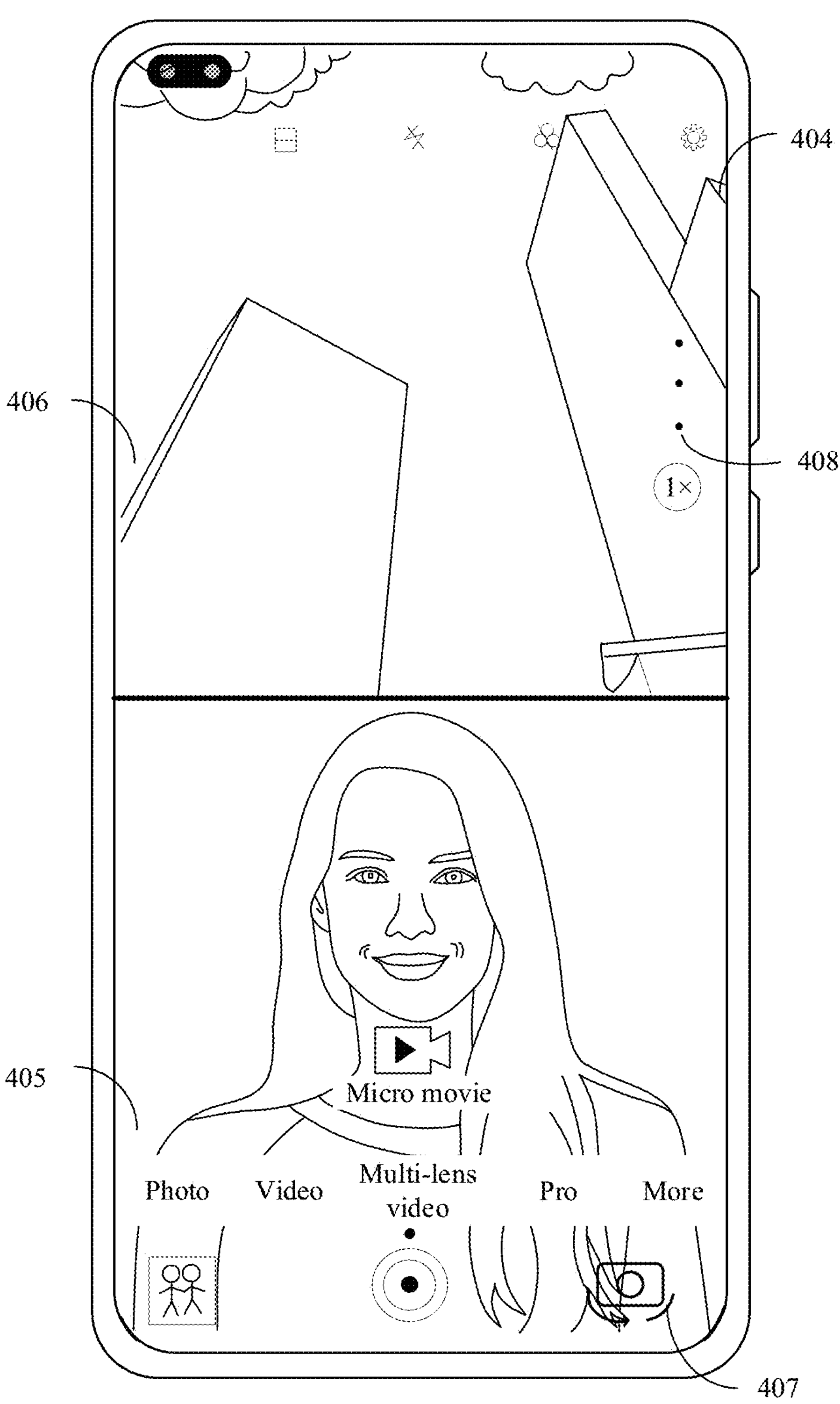

For example, the mobile phone may display an interface 401 shown in FIG. 4A and FIG. 4B. The interface 401 includes an image 402 captured by a rear-facing ultra-wide-angle camera lens through performing shooting on a building and an image 403 captured by a rear-facing 10× long-focus camera lens through performing shooting on the same building. Apparently, because a FOV of the rear-facing ultra-wide-angle camera lens is larger, the image 402 captured by the rear-facing ultra-wide-angle camera lens includes a whole building relatively, and further includes clouds over the building, street lamps next to the building, and the like. Correspondingly, the image 402 includes colors of the building, the sky, the clouds, the street lamps, and the like. Because a FOV of the rear-facing 10× long-focus camera lens is smaller, the image 403 captured by the rear-facing 10× long-focus camera lens includes a part of the building, and does not include the clouds, the street lamps, and the like. Correspondingly, colors in the image 403 are simple.

It should be understood that the mobile phone determines, based on brightness, colors, and the like in a current frame of the image, an exposure parameter and a white balance parameter for the camera lens capturing a next frame of the image. Therefore, if content and the colors in the current frame of the image are richer, an exposure parameter and a white balance parameter of the next frame of the image are more appropriately determined. Then, the exposure parameter and the white balance parameter are more appropriately synchronized to another camera lens.

Based on this, in some embodiments, the mobile phone may determine a camera lens with a largest FOV in the plurality of currently used camera lenses as the master synchronization camera lens, and determine the remaining camera lenses as the slave synchronization camera lenses. In this way, synchronously changing an exposure parameter of the slave synchronization camera lens with a smaller FOV and an exposure parameter of an image captured by a master synchronization camera lens with a largest FOV is maintained, and synchronously changing a white balance parameter of an image captured by the slave synchronization camera lens with a smaller FOV and a white balance parameter of an image captured by the master synchronization camera lens with the largest FOV is maintained. This can improve appropriateness of synchronously changing the exposure parameter and the white balance parameter.

Although, the plurality of camera lenses may be the combination of at least two camera lenses in front-facing camera lenses and/or rear-facing camera lenses, in a case in which the plurality of camera lenses include the front-facing camera lens and the rear-facing camera lens, the front-facing camera lens performs shooting on a view on a front side of the mobile phone, while the rear-facing camera lens performs shooting on a view on a back side of the mobile phone. In other words, the views shot by the two camera lenses are completely different. Therefore, synchronously changing an exposure parameter or a white balance parameter of the front-facing camera lens and an exposure parameter or a white balance parameter of the rear-facing camera lens does not need to be maintained.

For example, the mobile phone may display an interface 404 shown in FIG. 4A and FIG. 4B. The interface 404 includes an image 405 captured by the front-facing camera lens and an image 406 captured by the rear-facing camera lens. Apparently, the front-facing camera lens mainly captures a portrait, while the rear-facing camera lens mainly captures a building. The two images are completely different. Therefore, it is not necessary to synchronously change exposure parameters or the white balance parameters of the front-facing camera lens and the rear-facing camera lens.

When the plurality of camera lenses include at least two front-facing camera lenses or at least two rear-facing camera lenses, the at least two front-facing camera lenses or the at least two rear-facing camera lenses usually perform shooting on a same view. However, only FOVs of different camera lenses are different. As a result, images corresponding to the different FOVs that are the same may be captured. For example, the interface 401 shown in FIG. 4A and FIG. 4B includes an image 402 captured by the rear-facing ultra-wide-angle camera lens through performing shooting on the building and an image 403 captured by the rear-facing 10× long-focus camera lens through performing shooting on the same building. Apparently, the image 402 and the image 403 mainly include the building. It can be learned from that, to ensure that images that are captured by the at least two front-facing camera lenses or the at least two rear-facing camera lenses by performing shooting on the same view at the different FOVs are coordinated, synchronously changing exposure parameters of the at least two front-facing camera lenses or the at least two rear-facing camera lenses needs to be maintained, and synchronously changing white balance parameters of the at least two front-facing camera lenses or the at least two rear-facing camera lenses needs to be maintained.

Based on this, in some embodiments, in a case in which the plurality of camera lenses include at least two rear-facing camera lenses, for example, the plurality of camera lenses are rear-facing ultra-wide-angle camera lenses, rear-facing long-focus camera lenses, and front-facing camera lenses, the mobile phone may determine a rear-facing camera lens with a largest FOV in the at least two rear-facing camera lenses as the master synchronization camera lens, and determine the remaining rear-facing camera lenses in the at least two rear-facing camera lenses as the slave synchronization camera lenses. In this way, an exposure parameter and a white balance parameter of the slave synchronization camera lens in the rear-facing camera lenses may be synchronously changed while an exposure parameter and a white balance parameter of the master synchronization camera lens are changed.

In some other embodiments, in a case in which the plurality of camera lenses include at least two front-facing camera lenses, the mobile phone may determine a front-facing camera lens with a largest FOV in the at least two front-facing camera lenses as the master synchronization camera lenses, and determine the remaining front-facing camera lenses in the at least two front-facing camera lenses as the slave synchronization camera lenses. In this way, the exposure parameter and the white balance parameter of the slave synchronization camera lens in the front-facing camera lenses may be synchronously changed while the exposure parameter and the white balance parameter of the master synchronization camera lens are changed.

Further, in the multi-lens shooting process, the mobile phone may switch one or more camera lenses in the plurality of currently used camera lenses. For example, the viewfinder interface includes a switching control (for example, a button 407 in the interface 404 shown in FIG. 4A and FIG. 4B) of front-facing and rear-facing camera lenses. In response to a tap operation performed on the switching control of the front-facing and rear-facing camera lenses by the user, the mobile phone may perform a switch between the front-facing camera lens and the rear-facing camera lens. For another example, the viewfinder interface includes a zoom adjustment control (for example, a zoom bar 408 in the interface 404 shown in FIG. 4A and FIG. 4B). In response to a sliding operation performed on the zoom adjustment control by the user, the mobile phone may perform a switch between the rear-facing long-focus camera lens with a plurality of zoom magnifications. For still another example, in response to a preset gesture performed on the viewfinder interface by the user, the mobile phone may further switch camera lenses. A manner of triggering to switch the camera lenses is not specifically limited in this embodiment. After the camera lenses are switched, a quantity of front-facing camera lenses, a quantity of rear-facing camera lenses, and/or a FOV of the camera lens included in the plurality of camera lenses are changed.

Based on this, in some embodiments, after switching the camera lens, the mobile phone re-determines the master synchronization camera lens and the slave synchronization camera lens in the plurality of switched camera lenses based on a specific manner in the foregoing embodiment. In this way, the determined master synchronization camera lens may be the currently used camera lens.

In some mobile phones, when a plurality of camera lenses are rear-facing camera lenses, one of the rear-facing camera lenses needs to be a rear-facing ultra-wide-angle camera lens. In addition, the rear-facing ultra-wide-angle camera lens may not be switched to another rear-facing camera lens. However, other rear-facing camera lenses may be switched.

An example in which the plurality of camera lenses are a rear-facing ultra-wide-angle camera lens and a rear-facing 10× long-focus camera lens is used for illustration. The mobile phone may display the interface 401 shown in FIG. 4A and FIG. 4B. The interface 410 includes an image 402 captured by the rear-facing ultra-wide-angle camera lens and an image 403 captured by the rear-facing 10× long-focus camera lens. A display region corresponding to the image 403 includes a zoom bar 409, that is, the camera lens may be switched. In response to a sliding operation performed on the zoom bar 409 by the user, the mobile phone may switch the camera lens to a rear-facing long-focus camera lens with a different zoom magnification. For example, by sliding from "10×" to "1×", a rear-facing camera lens with a zoom magnification of 10 may be switched to a rear-facing camera lens with a zoom magnification of 1. However, there is no zoom bar in the display region corresponding to the image 402. Therefore, the rear-facing ultra-wide-angle camera lens may not be switched to another rear-facing camera lens.

Therefore, the rear-facing ultra-wide-angle camera lens is always a camera lens with a largest FOV. Therefore, in the mobile phones, in a scenario in which a plurality of rear-facing camera lenses are used for performing shooting, a rear-facing ultra-wide-angle camera lens may be directly determined as the master synchronization camera lens, and all camera lenses other than the ultra-wide-angle camera lens in the plurality of rear-facing camera lenses may be determined as the slave camera lenses.

It should be noted that in the mobile phone, the foregoing operation of determining the master synchronization camera lens and the slave synchronization camera lens may be performed by modules such as a camera service in a framework layer, a camera hardware abstract layer, or a camera driver in a kernel layer. This is not limited in embodiments of this application.

In some embodiments, after determining the master synchronization camera lens and the slave synchronization camera lens, the mobile phone may correspondingly store an identifier (which may be denoted as a first preset identifier) of the master synchronization camera lens and an identifier (which may be denoted as a second preset identifier) of the slave synchronization camera lens in a camera hardware abstract layer of the mobile phone. Therefore, after a frame request from a camera application is subsequently received, the camera hardware abstract layer processes the frame request based on the first preset identifier and the second preset identifier.

Subsequently, the shooting method provided in embodiments of this application is implemented through the described master synchronization camera lens and slave synchronization camera lens. The following describes in detail a specific implementation in which synchronously changing the exposure parameter of the master synchronization camera lens and the exposure parameter of the slave synchronization camera lens is maintained, and synchronously changing the white balance parameter of the master synchronization camera lens and the white balance parameter of the slave synchronization camera lens (denoted as a second aspect) is maintained In addition, an example in which a first camera lens is the master synchronization camera lens and a second camera lens is a slave synchronization camera lens of the first camera lens is used for illustration. The first camera lens and the second camera lens are any two different camera lenses in the plurality of currently used camera lenses.

After determining an exposure parameter (which may be denoted as a first exposure parameter) of the first camera lens, the mobile phone may determine an exposure parameter (which may be denoted as a second exposure parameter) of the second camera lens based on the first exposure parameter, to enable the second exposure parameter to be synchronously changed while the first exposure parameter is changed. Correspondingly, an exposure of an image captured by the first camera lens and an exposure of an image captured by the second camera lens that are displayed by the mobile phone may be synchronously increased or decreased.

Refer to FIG. 5A to FIG. 5C, FIG. 6A, and FIG. 6B. In some embodiments, in combination with a hardware structure and a software structure of a mobile phone, this embodiment may include the following steps.

S501: A camera application displays a first interface, and the first interface includes a first image captured by a first camera lens and a second image captured by a second camera lens.

Figure 6A:
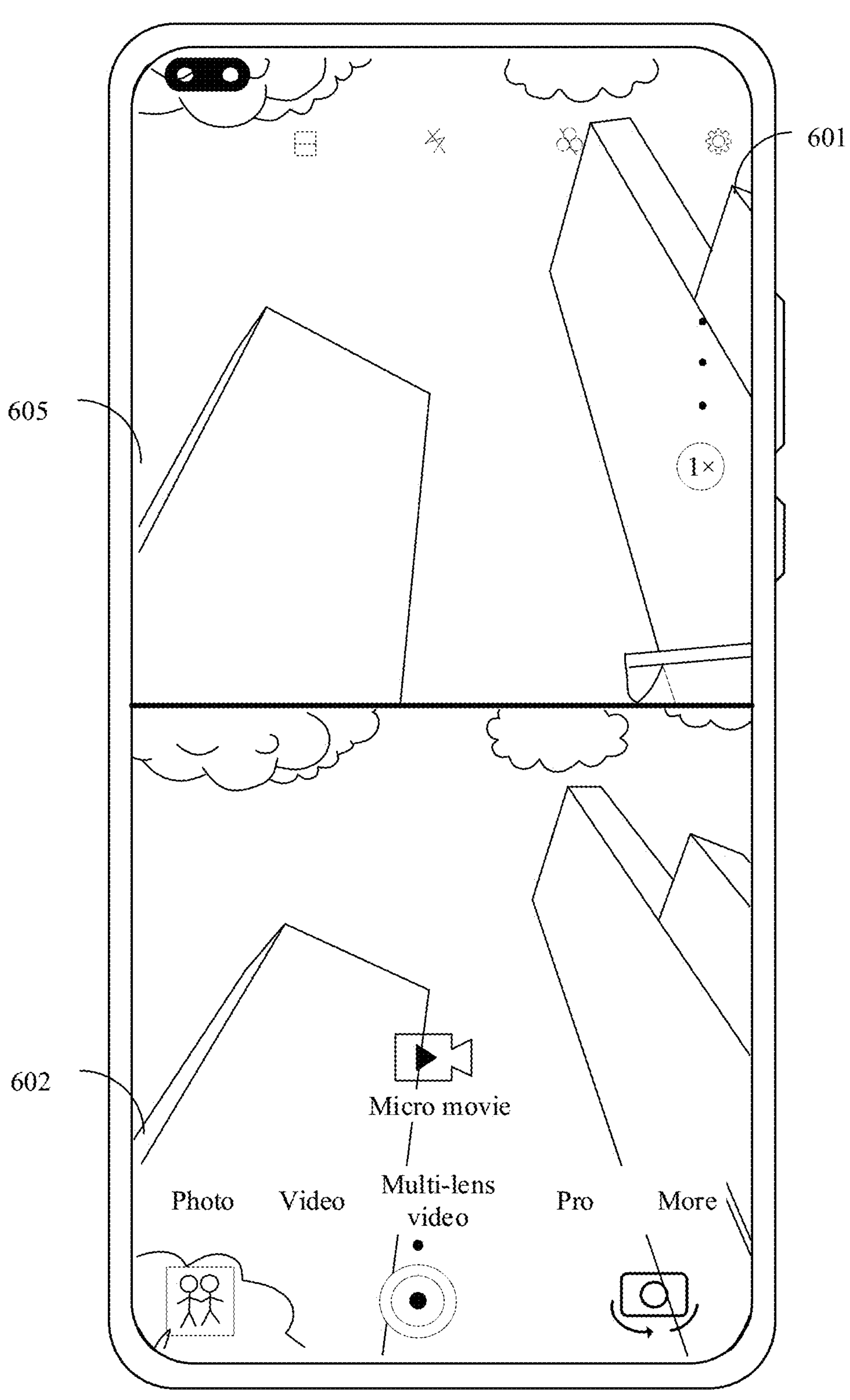
FIG. 6 is a diagram 3 of an interface of a mobile phone according to an embodiment of this application.
Figure 6B:
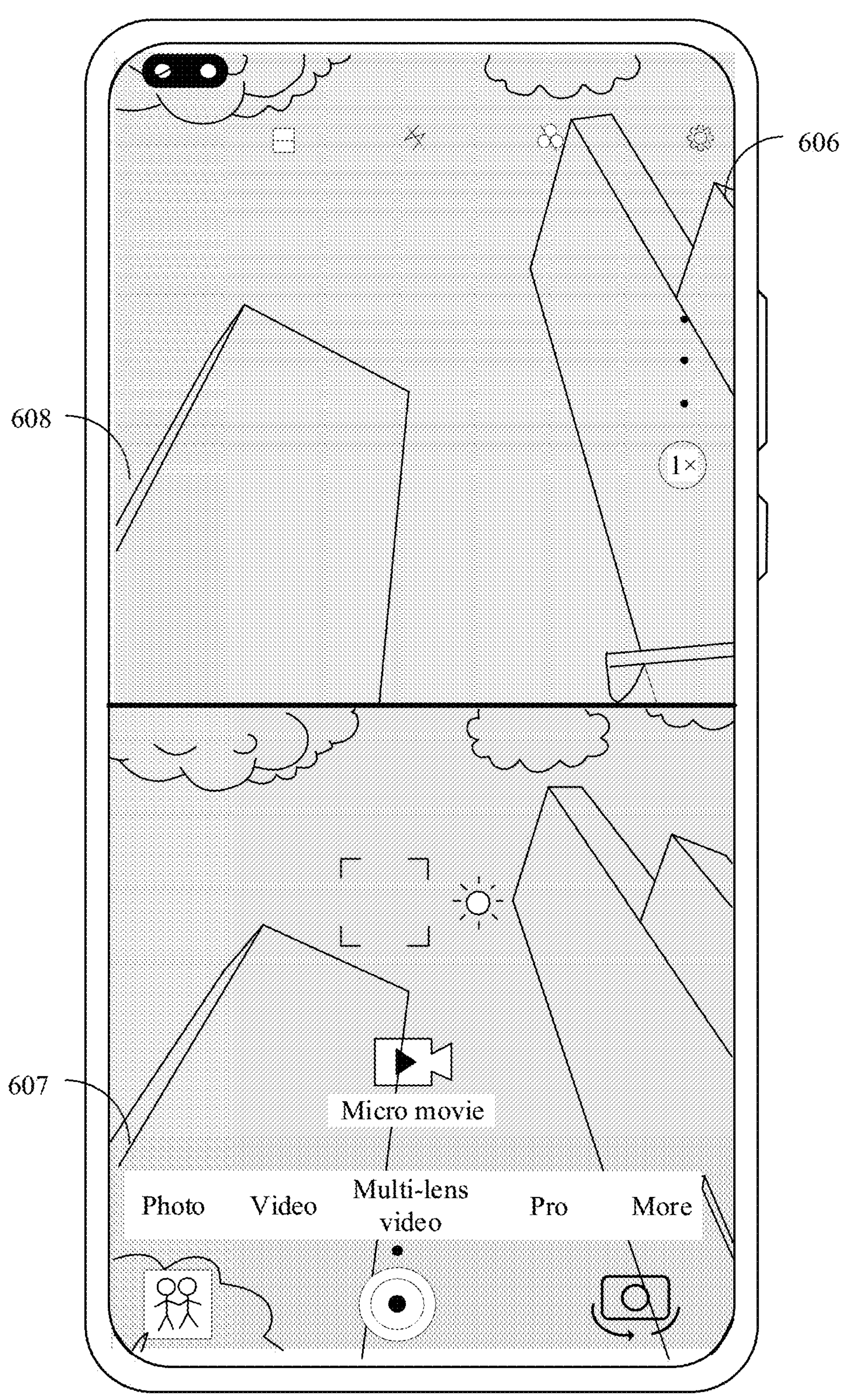
Figure 7A:
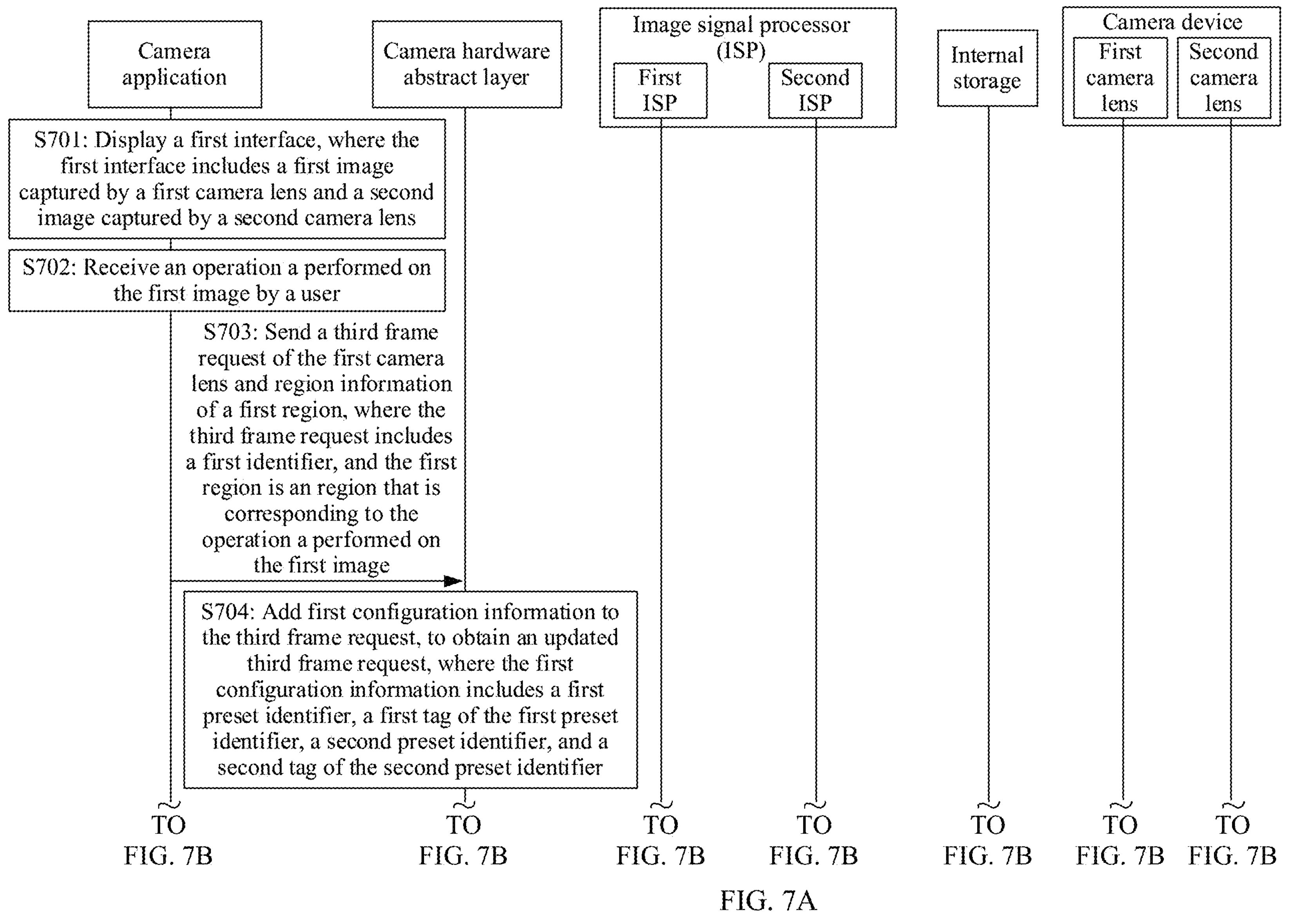
FIG. 7A to FIG. 7C are interaction diagrams 2 of an implementation of a shooting method according to an embodiment of this application.
Figure 7B:
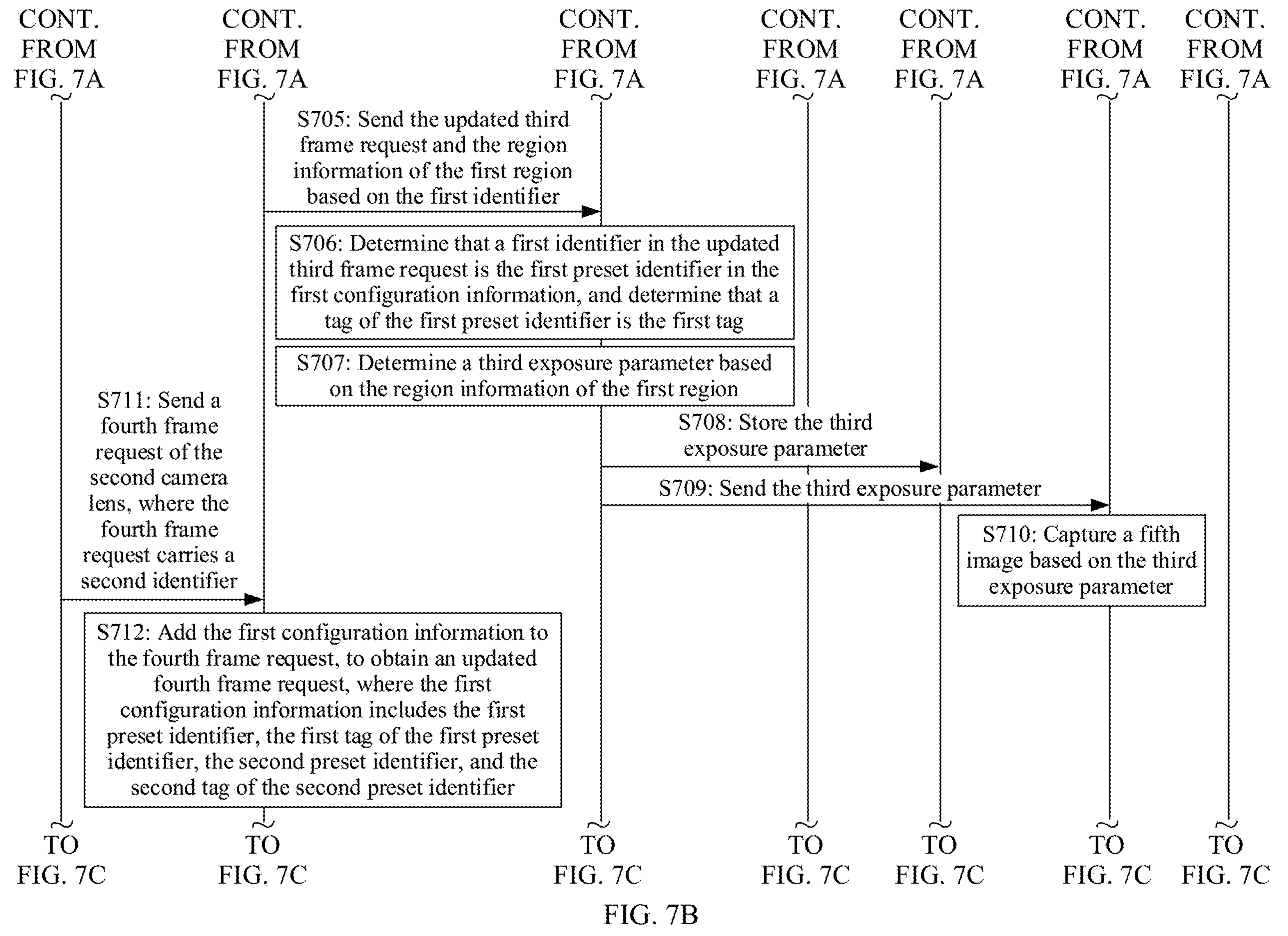
Figure 7C:
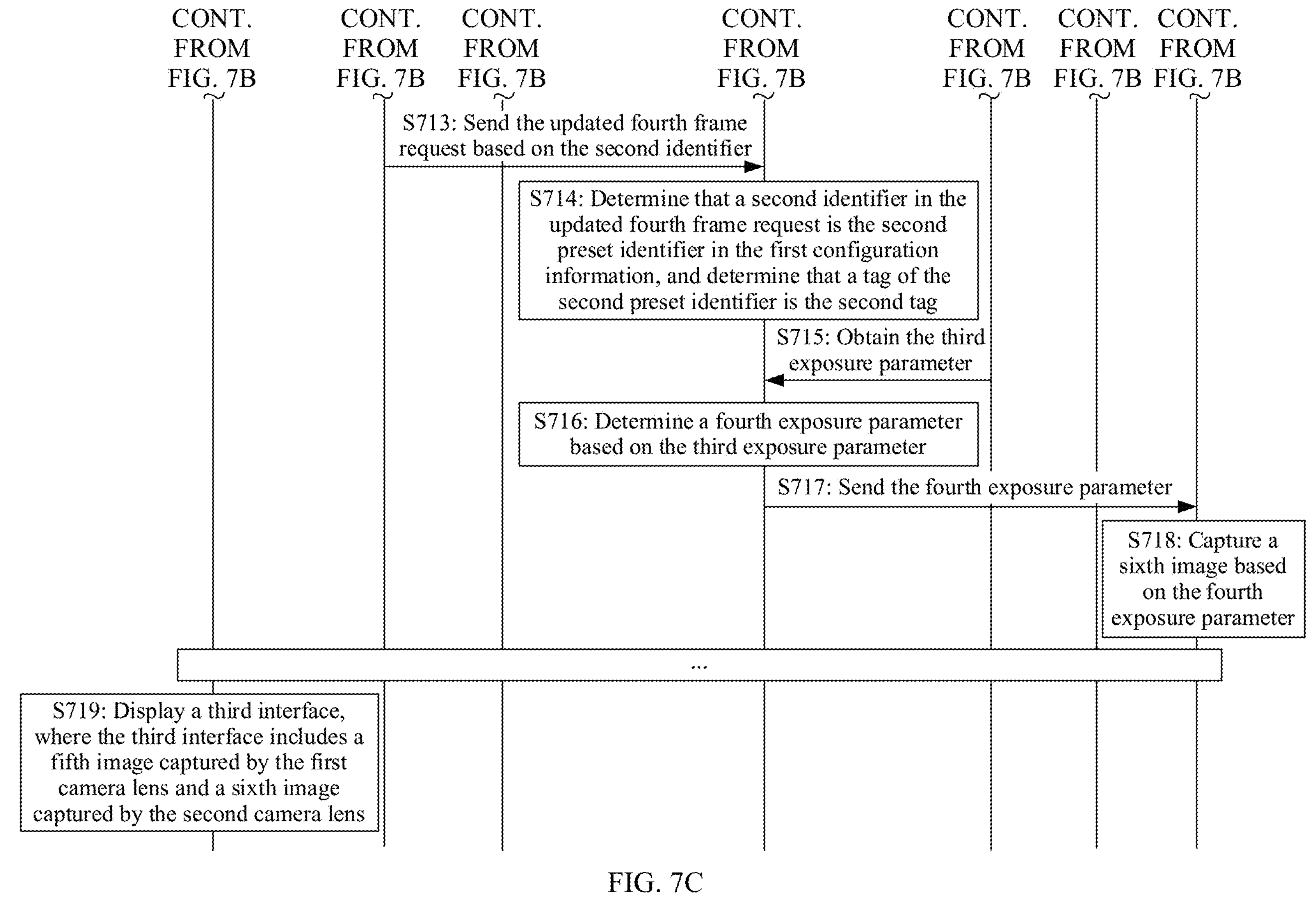

For example, the first interface is an interface 601 shown in FIG. 6A and FIG. 6B, the first image is an image 602 in the interface 601, and the second image is an image 605 in the interface 601.

In a process in which the camera application runs in the foreground, the camera application needs to continuously send a frame request based on a frame rate. The frame request carries an identifier of a camera lens, to indicate the camera lens to capture a new frame of an image. It should be noted that in a multi-lens shooting scenario, the camera application needs to separately send the frame request for each camera lens, for example, a frame request of the first camera lens and a frame request of the second camera lens, to indicate a corresponding camera lens to capture a new frame of the image. It should be noted that the camera application may send the frame request of each camera lens separately or successively. This is not limited in this embodiment of this application. In this specification, for each frame, an example in which the frame request of the first camera lens is sent first and then the frame request of the second camera lens is sent is used for illustration.

S502: The camera application sends a first frame request of the first camera lens to a camera hardware abstract layer, and the first frame request carries a first identifier.

The first identifier is an identifier of the first camera lens.

After the first interface is displayed, if the first camera lens is required to continuously capture anew frame of the image, the camera application may send the frame request (denoted as the first frame request) of the first camera lens.

In this embodiment of this application, firstly, processing of images of different camera lenses needs to be completed by a corresponding ISP, for example, processing of an image of the first camera lens is completed by a first ISP, and processing of an image of the second camera lens is completed by a second ISP. Correspondingly, after receiving any frame request, the camera hardware abstract layer needs to determine, based on an identifier of a camera lens carried by the frame request, a camera lens targeted by the frame request, and then distribute the frame request to the corresponding ISP for processing.

Secondly, because a procedure of determining an exposure parameter of a slave synchronization camera lens needs to be synchronously changed while an exposure parameter (a principle for the white balance parameter is the same, the same below) of a master synchronization camera lens is changed, the procedure for determining an exposure parameter of the master synchronization camera lens is different from a procedure for determining an exposure parameter of the slave synchronization camera lens. Correspondingly, after receiving the any frame request, the camera hardware abstract layer needs to add configuration information of the master synchronization camera lens and the slave synchronization camera lens to the frame request, and then send the configuration information to the corresponding ISP, to enable the ISP to determine a processing procedure based on preset information.

Therefore, after receiving the first frame request, the camera hardware abstract layer needs to perform S503 and S504 below.

S503: The camera hardware abstract layer adds first configuration information to the first frame request, to obtain an updated first frame request, where the first configuration information includes a first preset identifier, a first tag of the first preset identifier, a second preset identifier, and a second tag of the second preset identifier.

The first preset identifier is an identifier of the master synchronization camera lens, and the first tag indicates an attribute of a camera lens indicated by the first preset identifier. The second preset identifier is an identifier of the slave synchronization camera lens, and the second tag indicates an attribute of a camera lens indicated by the second preset identifier.

If AE in a shooting process, rather than exposure compensation based on a user request, is mainly involved in this embodiment, the attribute of the camera lens indicated by the first preset identifier is to synchronously perform AE on a master synchronization camera lens, and accordingly, the first tag may be AE-SYNC-TAG-MASTER. The attribute of the camera lens indicated by the second preset identifier is to synchronously perform AE on the slave synchronization camera lens, and accordingly, the second tag may be AE-SYNC-TAG-SLAVE.

For example, the first configuration information may be {1, AE-SYNC-TAG-MASTER; 2, AE-SYNC-TAG-SLAVE}, indicating that the camera lens of which the identifier is 1 is the master synchronization camera lens on which AE is synchronously performed, and the camera lens of which the identifier is 2 is the master synchronization camera lens on which AE is synchronously performed.

Especially, in a plurality of currently used camera lenses, some camera lenses (which may be denoted as third camera lenses) may be neither the master synchronization camera lens nor the slave synchronization camera lens. For example, if the plurality of currently used camera lenses include a rear-facing ultra-wide-angle camera lens, a rear-facing 10× long-focus camera lens, and a front-facing camera lens, the rear-facing ultra-wide-angle camera lens may be the master synchronization camera lens, the rear-facing 10× long-focus camera lens is the slave camera lens, and the front-facing camera lens is the third camera lens. For the third camera lens, the ISP needs to independently perform processing based on another procedure, which bears no relationship to synchronization. Based on this, in a specific implementation, after receiving the any frame request, the camera hardware abstract layer may further determine whether the identifier carried by the frame request is the first preset identifier or the second preset identifier before S503. If the identifier is neither the first preset identifier nor the second preset identifier, S503 is not performed, and the frame request may be directly distributed, based on the identifier carried in the frame request, to the corresponding ISP for processing. This situation is not much described in this specification.

S504: The camera hardware abstract layer sends the updated first frame request to the first ISP based on the first identifier.

If processing of the image of the first camera lens is completed by the first ISP, after obtaining the first identifier, the camera hardware abstract layer may determine a target ISP as the first ISP.

S505: The first ISP determines that a first identifier in the updated first frame request is the first preset identifier in the first configuration information, and determines that a tag of the first preset identifier is the first tag.

After receiving the updated first frame request, the first ISP may match the first identifier carried in the updated first frame request with the first preset identifier and the second preset identifier in the first configuration information, to determine that the first identifier is the same as the first preset identifier. The first ISP further queries the tag, that is, the first tag, of the first preset identifier in the first configuration information, to determine that a camera lens (that is, the first camera lens) targeted by the updated first frame request is the master synchronization camera lens on which AE is synchronously performed. Then, processing of synchronously performing AE is completed based on a procedure that corresponds to a procedure (that is, S506 and S507 below) for synchronously performing AE on the master synchronization camera lens.

S506: The first ISP determines a first exposure parameter.

For example, the first ISP may determine an exposure parameter (for example, the first exposure parameter) of the first camera lens based on the exposure parameter of the first image based on an AE algorithm in a 3A algorithm. Details are not described herein.

S507: The first ISP stores the first exposure parameter.

In the process of synchronously performing AE, the master synchronization camera lens needs to store the first exposure parameter in a common storage area that is accessible to ISPs, so that another ISP may subsequently read the first exposure parameter from the common storage area and obtain the exposure parameter of the slave synchronization camera lens.

S508: The first ISP sends the first exposure parameter to the first camera lens.

After receiving the first exposure parameter, the first camera lens may capture the image after the exposure parameter of the first camera lens is adjusted to the first exposure parameter.

S509: The first camera lens captures a third image based on the first exposure parameter.

S510: The camera application sends the second frame request of the second camera lens to the camera hardware abstract layer. The second frame request includes a second identifier.

The second identifier is an identifier of the second camera lens.

After the first interface is displayed, if the second camera lens is required to continuously capture a new frame of the image, the camera application may send the frame request (denoted as the second frame request) of the second camera lens.

S511: The camera hardware abstract layer adds the first configuration information to the second frame request, to obtain an updated second frame request, where the first configuration information includes the first preset identifier, the first tag of the first preset identifier, the second preset identifier, and the second tag of the first preset identifier.

For specific implementation of S511, reference may be made to related description in S503 above, and details are not described herein.

S512: The camera hardware abstract layer sends the updated second frame request to the second ISP based on the second identifier.

If processing of the image of the second camera lens is completed by the second ISP, after obtaining the second identifier, the camera hardware abstract layer determines the target ISP as the second ISP.

S513: The second ISP determines that a second identifier in the updated second frame request is the second preset identifier in the first configuration information, and determines that a tag of the second preset identifier is the second tag.

After receiving the updated second frame request, the second ISP may match the second identifier carried in the updated second frame request with the first preset identifier and the second preset identifier in the first configuration information, to determine that the second identifier is the same as the second preset identifier. The second ISP may further query the first configuration information to obtain the tag of the second preset identifier, that is, the second tag, that is, to determine that a camera lens (that is, the second camera lens) targeted by the updated second frame request is the slave synchronization camera lens on which AE is synchronously performed. Then, processing of synchronously performing AE is completed according to a procedure that corresponds to a procedure (that is, S514 and S515 below) for synchronously performing AE on the slave synchronization camera lens.

S514: The second ISP obtains the first exposure parameter.

In the process of synchronously performing AE, the slave synchronization camera lens needs to read the exposure parameter of the master synchronization camera lens (that is, the first exposure parameter) from the common storage area.

S515: The second ISP determines a second exposure parameter based on the first exposure parameter.

In a specific implementation, the second ISP may directly take the first exposure parameter as the exposure parameter of the second camera lens, to quickly and synchronously obtain the exposure parameter (that, the second exposure parameter) of the second camera lens.

In practice, hardware of different camera lenses may be different. As a result, brightness effect of images captured by the two camera lenses based on a same exposure parameter may be different. Therefore, in another specific implementation, the second ISP may query a preset mapping meter. The preset mapping meter is stored in the common storage area that is accessible to ISPs. The preset mapping meter stores a correspondence between the exposure parameter of the first camera lens and the exposure parameter of the second camera lens. When the images captured by the two camera lenses may achieve same brightness effect, the exposure parameters used separately constitute a group of corresponding exposure parameters in the preset mapping meter. The second ISP queries the preset mapping meter to obtain an exposure parameter (that is, the second exposure parameter) of a second camera lens corresponding to the first exposure parameter of the first camera lens. In this way, it may ensure that brightness effect of an image captured by the slave synchronization camera lens is consistent with that of an image captured by the master synchronization camera lens.

It should be understood that the implementation of determining the exposure parameter of the slave synchronization camera lens based on the exposure parameter of the master synchronization camera lens as set forth in S515 is only an example, and an actual implementation is not limited thereto.

S516: The second ISP sends the second exposure parameter to the second camera lens.

After receiving the second exposure parameter, the second camera lens may capture the image after the second exposure parameter of the second camera lens is adjusted to the second exposure parameter.

S517: The second camera lens captures a fourth image based on the second exposure parameter.

The image captured by the first camera lens and the image captured by the second camera lens pass through the kernel layer, the hardware abstract layer, and the application framework layer, and finally is transmitted to a camera application in an application layer. This process is not much described in detail in this specification.

S518: A second interface is displayed. The second interface includes the third image captured by the first camera lens and the fourth image captured by the second camera lens.

As an example, the first interface is the interface 601 shown in FIG. 6A and FIG. 6B, the first image is an image 602 in the interface 601, and the second image is an image 605 in the interface 601. Therefore, the second interface may be an interface 606 shown in FIG. 6A and FIG. 6B, the third image may be an image 607 in the interface 606, and the fourth image may be an image 608 in the interface 606. Apparently, in comparison to the image 602, the image 607 becomes dark. In comparison to the image 605, the image 608 becomes bright. In other words, an exposure of the image captured by the first camera lens and an exposure of the image captured by the second camera lens are simultaneously decreased.

It can be learned from that, in the method provided in this embodiment, the camera hardware abstract layer sends, to the ISP, configuration information for synchronously performing AE, to enable the ISP to determine, based on the configuration information, a specific procedure for synchronously performing AE. In this way, the master synchronization camera lens and the slave synchronization camera lens may be flexibly configured at the camera hardware abstract layer. For example, when the master synchronization camera lens and a slave synchronization camera lens are changed, provided that the camera hardware abstract layer adds only new configuration information to the frame request. In addition, the exposure parameter of the master synchronization camera lens is stored in the common storage area. Therefore, the exposure parameter of the master synchronization camera lens may be obtained from the common storage area and used to determine the exposure parameter of the slave synchronization camera lens. In this way, synchronously changing the exposure parameters of the slave synchronization camera lens and the exposure parameter of the master synchronization camera lens is maintained. Finally, an exposure of the image captured by the master synchronization camera lens and an exposure of the image captured by the slave synchronization camera lens are synchronously increased or decreased, and brightness of the images is synchronously changed.

Embodiments of FIG. 5A to FIG. 5C, FIG. 6A, and FIG. 6B mainly illustrate a specific implementation of triggering to synchronously perform AE based on a demand to capture a new frame of the image by using the camera lens. In some other embodiments, after receiving an operation a performed on the image captured by the first camera lens in the viewfinder interface by a user, the mobile phone may also trigger to synchronously performing AE, to enable the exposure of the image captured by the second camera lens to be synchronously changed while the exposure of the image captured by the first camera lens is changed.

Refer to FIG. 7A to FIG. 7C, FIG. 8A, and FIG. 8B. Specifically, in combination with a hardware structure and a software structure of a mobile phone, a shooting method provided in this embodiment may include the following steps.

S701: A camera application displays a first interface, and the first interface includes a first image captured by a first camera lens and a second image captured by a second camera lens.

S702: The camera application receives an operation a performed on the first image by a user.

For the operation a, reference may be made to related description above, and details are not described herein.

If the operation a is specific to the first image, the operation a is to request to perform AE on a master synchronization camera lens.

Figure 8A:
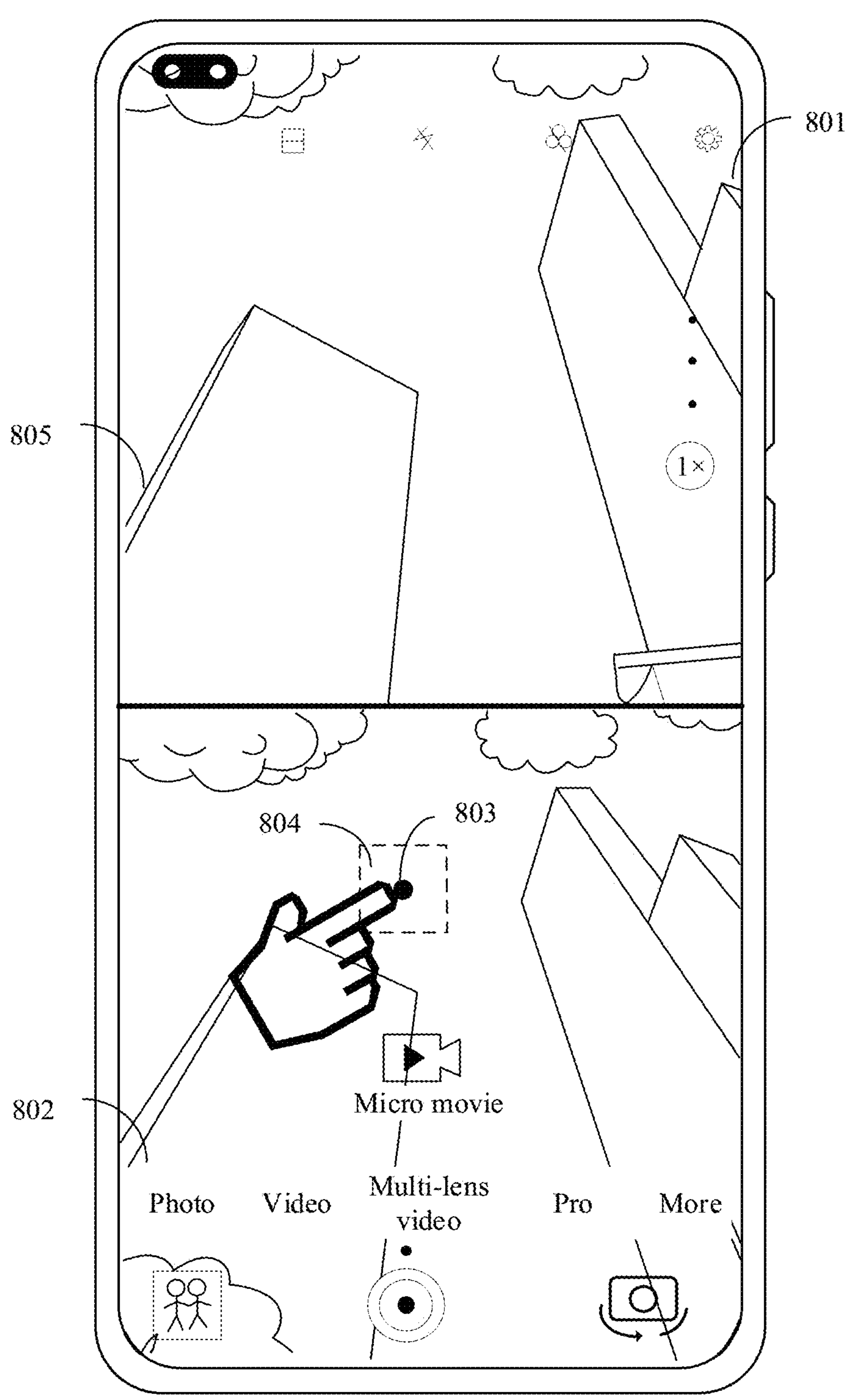
FIG. 8A, and FIG. 8B are diagrams 4 of an interface of a mobile phone according to an embodiment of this application.
Figure 8B:
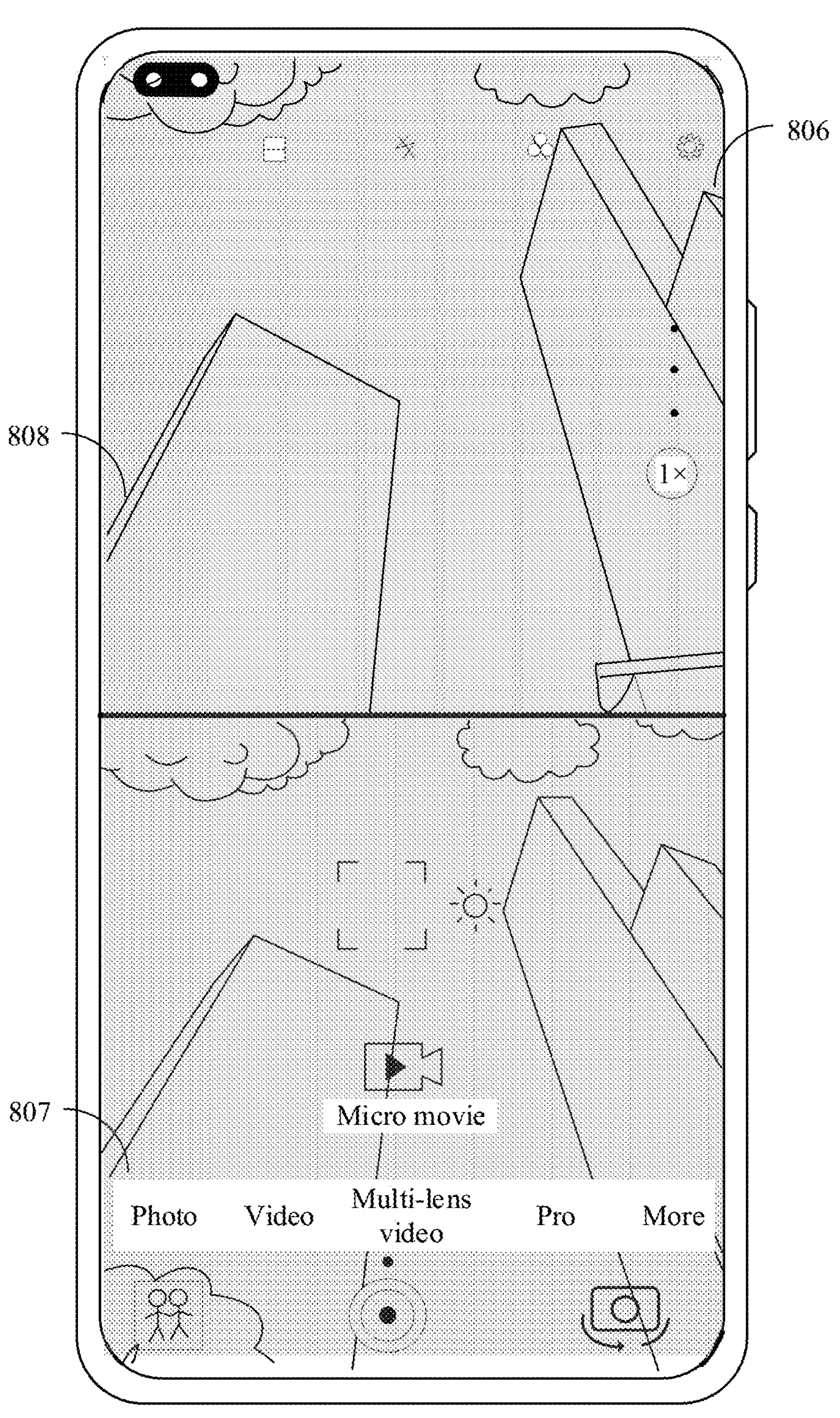

An example in which the first image is an image 802 in an interface 801 shown in FIG. 8A and FIG. 8B and the operation a is a tap operation is used for illustration. The camera application may receive a tap operation performed on a position 803 in the image 802.

S703: The camera application sends a third frame request of the first camera lens and region information of the first region to a camera hardware abstract layer. The third frame request includes a first identifier. The first region is a region corresponding to the operation a performed on the first image.

The first identifier is an identifier of the first camera lens.

In this embodiment, after the camera application receives the operation a performed on the first image by the user, if the first camera lens is required to continuously capture a new frame of the image, the camera application may send a frame request (denoted as the third frame request) of the first camera lens and subsequently send the region information of the first region (region). The region information of the first region may indicate a range of a position of the first region on the first image. The region information of the first region is used to subsequently determine an exposure parameter by an ISP.

The region corresponding to the operation a performed on the first image may be a region that is preset and that includes a touch point of the operation a performed on the first image. For example, the operation a is a tap operation performed at the position 803 on the image 802 in the interface 801 shown in FIG. 8A and FIG. 8B, and the first region may be a region 804 (for example, a region shown in a dashed-line box). The region information of the first region may be a range of a position of the region 804 on the image 802. It should be understood that the first region shown in FIG. 8A and FIG. 8B is rectangular. During actual implementation, the first region may alternately be circular, elliptical, and the like. This is not specifically limited in this embodiment of this application.

S704: The camera hardware abstract layer adds first configuration information to the third frame request, to obtain an updated third frame request, where the first configuration information includes a first preset identifier, a first tag of the first preset identifier, a second preset identifier, and a second tag of the first preset identifier.

S705: The camera hardware abstract layer sends the updated third frame request and the region information of the first region to a first ISP based on the first identifier.

In this embodiment, the camera hardware abstract layer needs to send the region information of the first region to the ISP.

S706: The first ISP determines that a first identifier in the updated third frame request is the first preset identifier in the first configuration information, and determines that a tag of the first preset identifier is the first tag.

S707: The first ISP determines a third exposure parameter based on the region information of the first region.

Similarly, the first ISP may determine, based on the region information of the first region, an exposure parameter (which may be denoted as the third exposure parameter) of the first camera lens based on an AE algorithm in a 3A algorithm. Details are not described herein. If an exposure in the first region in the first image is high, for example, exceeds a first preset exposure, the exposure may be decreased based on the 3A algorithm. If an exposure in the first region in the first image is low, for example, lower than a second preset exposure, the exposure may be increased based on the 3A algorithm.

S708: The first ISP stores the third exposure parameter.

S709: The first ISP sends the third exposure parameter to the first camera lens.

S710: The first camera lens captures a fifth image based on the third exposure parameter.

S711: The camera application sends a fourth frame request of the second camera lens to the camera hardware abstract layer, where the fourth frame request includes a second identifier.

If the second camera lens is required to continuously capture a new frame of the image, the camera application may send a frame request (denoted as the fourth frame request) of the second camera lens.

S712: The camera hardware abstract layer adds the first configuration information to the fourth frame request, to obtain an updated fourth frame request, where the first configuration information includes the first preset identifier, the first tag of the first preset identifier, the second preset identifier, and the second tag of the second preset identifier.

S713: The camera hardware abstract layer sends the updated fourth frame request to a second ISP based on the second identifier.

S714: The second ISP determines that a second identifier in the updated fourth frame request is the second preset identifier in the first configuration information, and determines that a tag of the second preset identifier is the second tag.

S715: The second ISP obtains the third exposure parameter.

S716: The second ISP determines a fourth exposure parameter based on the third exposure parameter.

S717: The second ISP sends the fourth exposure parameter to the second camera lens.

S718: The second camera lens captures a sixth image based on the fourth exposure parameter.

S719: The camera application displays a third interface, and the third interface includes the fifth image captured by the first camera lens and the sixth image captured by the second camera lens.

An example in which the second interface is the interface 801 shown in FIG. 8A and FIG. 8B, the third image is an image 802 in the interface 801, and the fourth image is an image 805 in the interface 801 is used for illustration. The third interface may be an interface 806 shown in FIG. 8A and FIG. 8B, the fifth image may be an image 807 in the interface 806, and the sixth image may be an image 808 in the interface 806. Apparently, in comparison to the image 802, the image 807 becomes dark. In comparison to the image 805, the image 808 becomes bright. In other words, although AE is requested to be performed on the first camera lens, an exposure of the image captured by the first camera lens and an exposure of the image captured by the second camera lens are simultaneously decreased.

It should be noted that, for a part that is not described in detail in embodiments in FIG. 7A to FIG. 7C, FIG. 8A, and FIG. 8B, reference may be made to related description in embodiments in FIG. 5A to FIG. 5C, FIG. 6A, and FIG. 6B.

It can be learned from that, in the solution in this embodiment, the master synchronization camera lens and the slave synchronization camera lens may be flexibly configured at the camera hardware abstract layer. In addition, an exposure parameter of the master synchronization camera lens that is determined based on the operation a performed by the user is stored in a common storage area. Therefore, the exposure parameter of the master synchronization camera lens may be obtained from the common storage area and used to determine an exposure parameter of the slave synchronization camera lens. In this way, in a case in which AE is requested to be performed on the master synchronization camera lens, synchronously changing the exposure parameters of the slave synchronization camera lens and the exposure parameter of the master synchronization camera lens is maintained. Finally, an exposure of the image captured by the master synchronization camera lens and an exposure of the image captured by the slave synchronization camera lens are synchronously increased or decreased, and brightness of the images is synchronously changed.

In some other embodiments, in embodiments in FIG. 7A to FIG. 7C, FIG. 8A, and FIG. 8B, after AE is triggered to be synchronously completed, based on the operation a performed by the user, on the first camera lens and the second camera lens, exposure compensation may further be synchronously performed on the second camera lens while exposure compensation is performed on the first camera lens.

Figure 9A:
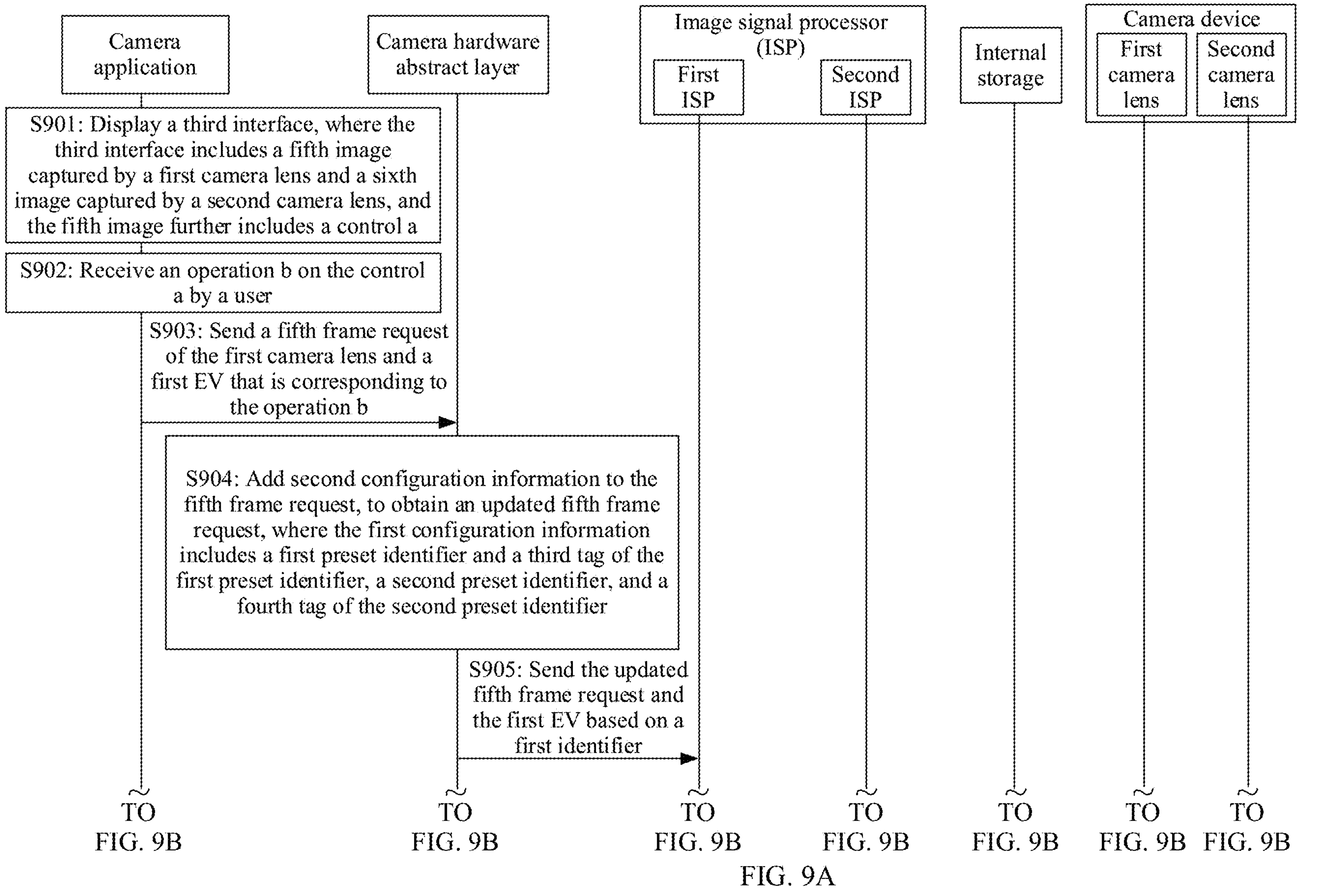
FIG. 9A to FIG. 9C are interaction diagrams 3 of an implementation of a shooting method according to an embodiment of this application.
Figure 9B:
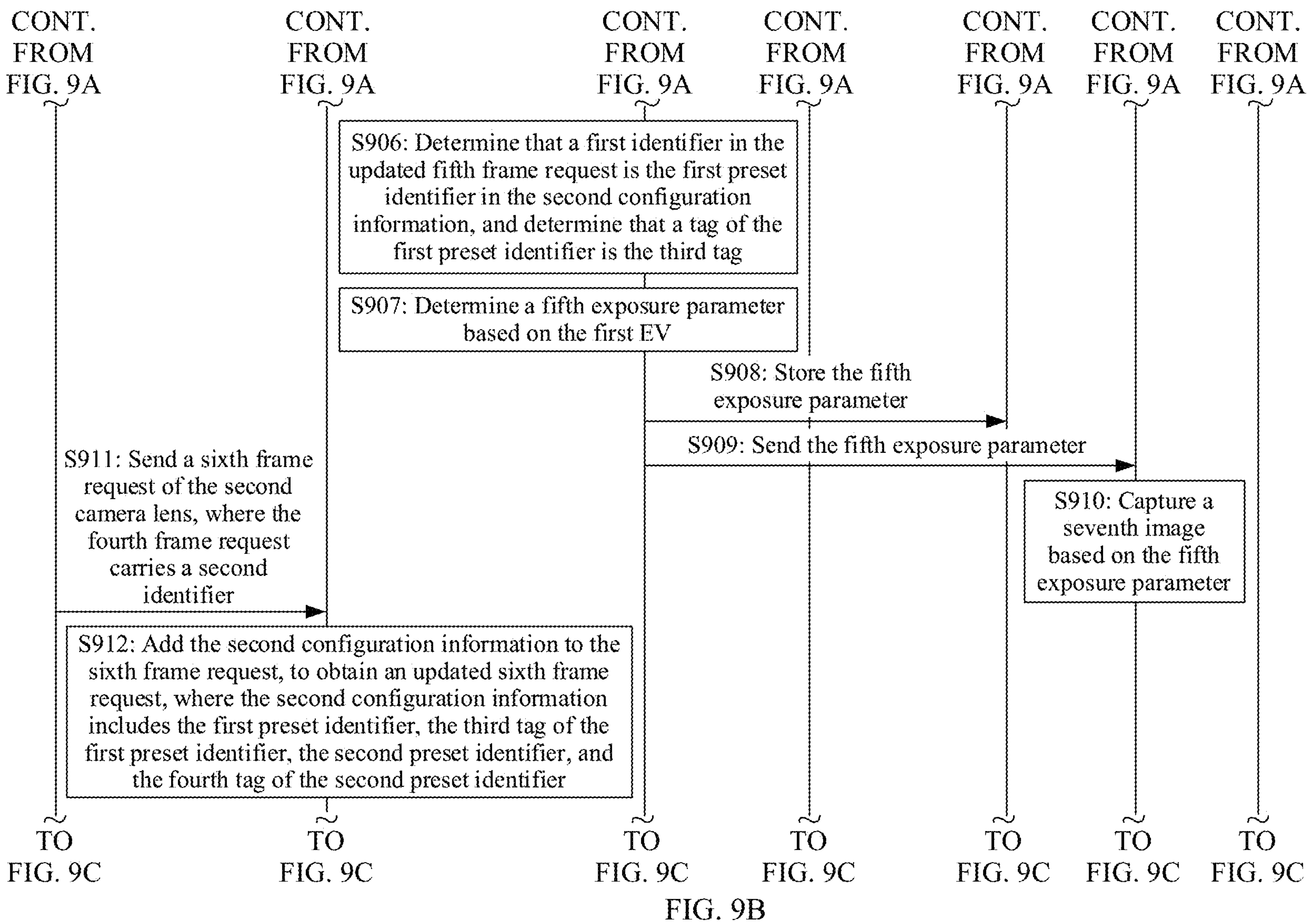
Figure 9C:
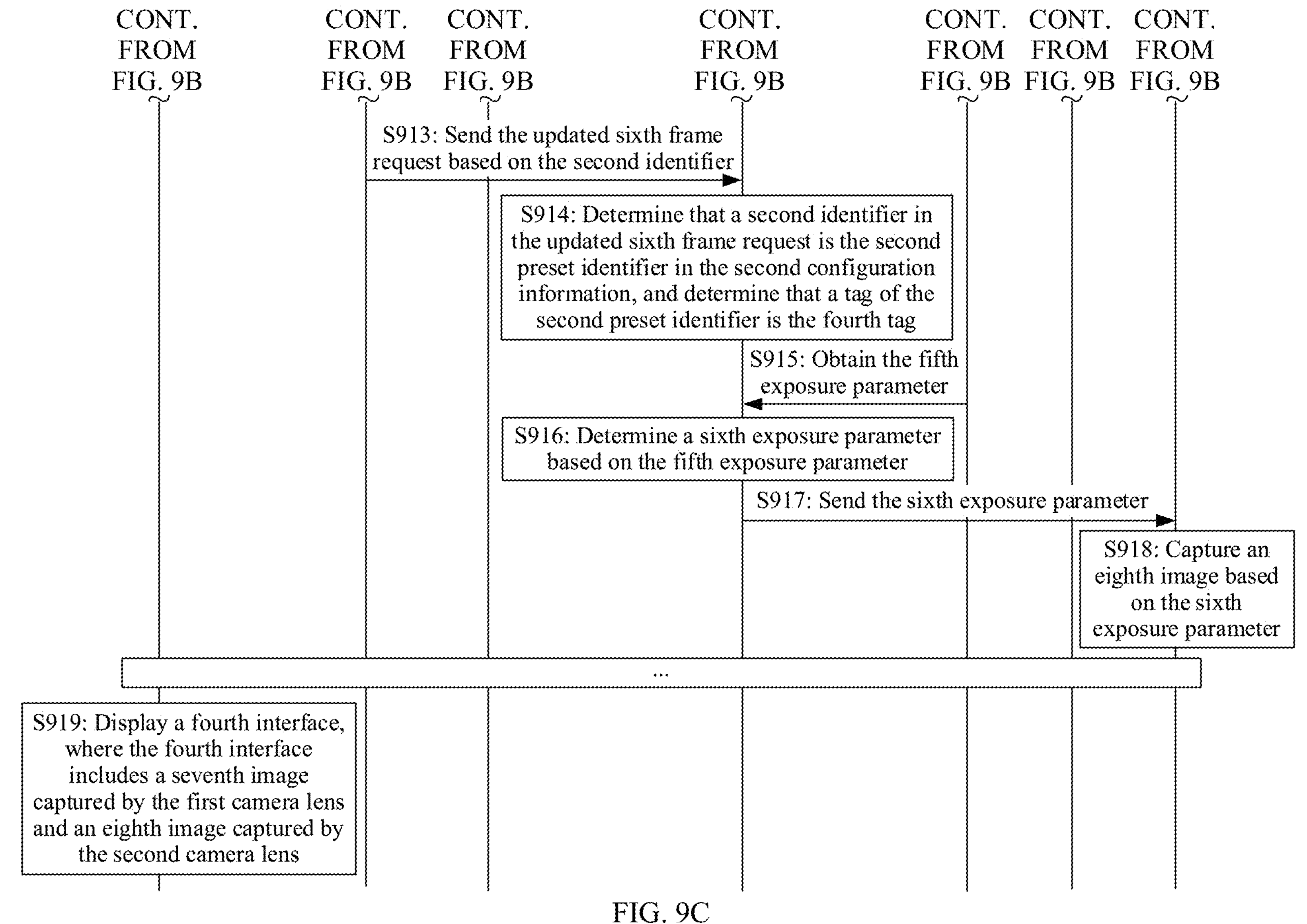
Figure 10A:
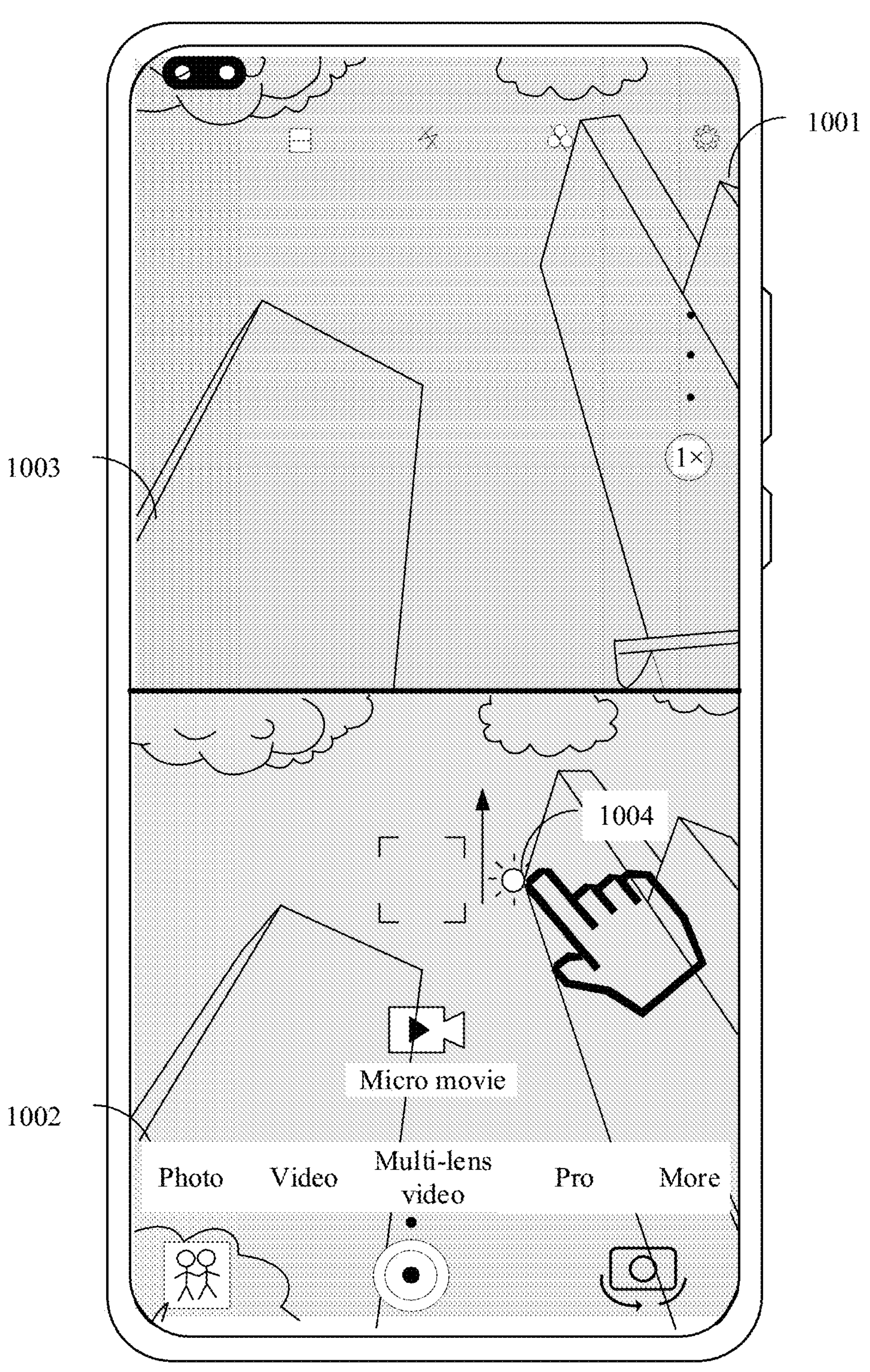
FIG. 10A to FIG. 10C are diagrams 5 of an interface of a mobile phone according to an embodiment of this application.
Figure 10B:
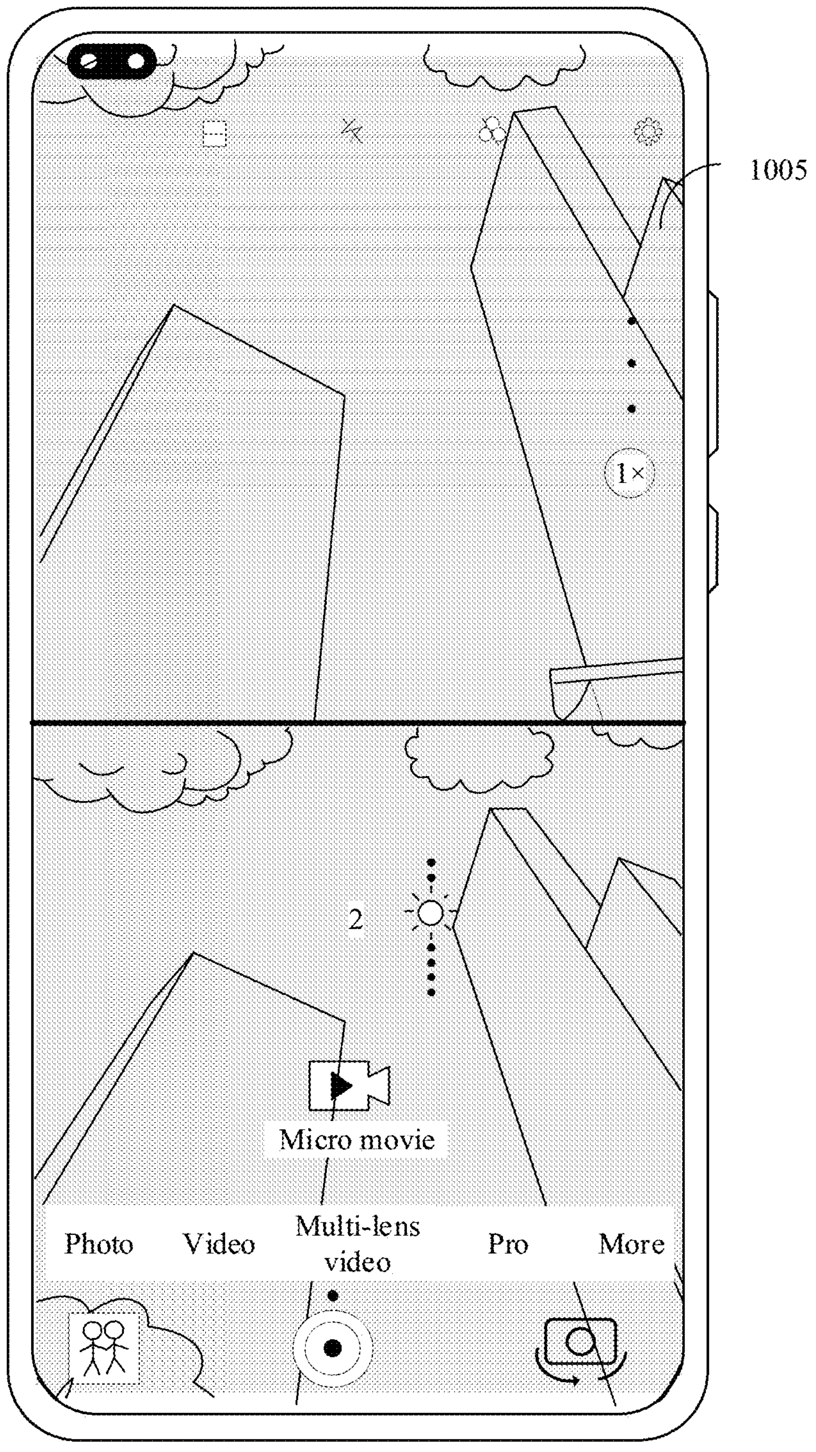
Figure 10C:
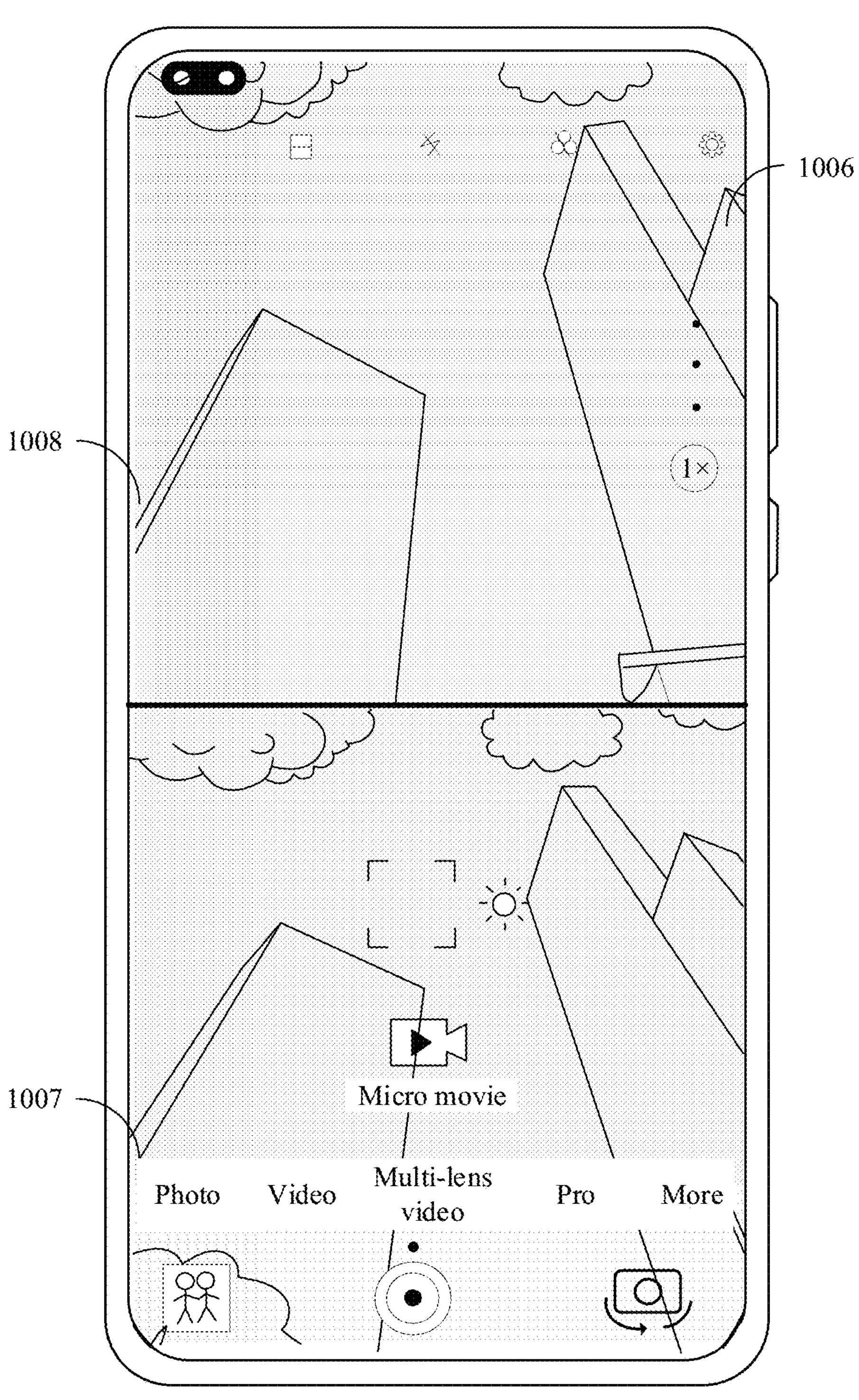

Refer to FIG. 9A to FIG. 9C and FIG. TOA to FIG. 10C. Specifically, in combination with a hardware structure and a software structure of a mobile phone, a shooting method provided in this embodiment may include the following steps.

S901: A camera application displays a third interface, and the third interface includes a fifth image captured by a first camera lens and a sixth image captured by a second camera lens. The fifth image includes a control a.

For the control a, reference may be made to related description above, and details are not described herein.

For example, the third interface is an interface 1001 shown in FIG. 10A to FIG. 10C, the fifth image is an image 1002 in the interface 1001, the sixth image is an image 1003 in the interface 1001, and the control a is a button 1004 in the image 1002.

S902: The camera application receives an operation b performed on the control a by a user.

For the operation b, reference may be made to related description above, and details are not described herein.

If the control a is located over an image captured by the first camera lens, the operation b performed on the control a by the user is to perform exposure compensation on a master synchronization camera lens.

For example, the operation b may be a sliding operation performed on the button 1004 in interface 1001 shown in FIG. 10A to FIG. 10C. A displacement of upward sliding or downward sliding is different. Therefore, an EV for performing exposure compensation is different. For example, the button 1004 is slid upward (that is, a direction indicated by an arrow in the interface 1001) by a specific displacement, the EV for performing exposure compensation may be adjusted to 2 in an interface 1005 shown in FIG. 10A to FIG. 10C.

S903: The camera application sends, to the camera hardware abstract layer, a fifth frame request of the first camera lens and a first EV corresponding to the operation b.

In this embodiment, after receiving the operation b performed on the control a by the user, if the first camera lens is required to continuously capture a new frame of the image, the camera application may send a frame request (denoted as the fifth frame request) of the first camera lens and subsequently send the first EV The first EV is an EV for performing exposure compensation and is used to subsequently determine an exposure parameter by an ISP.

S904: The camera hardware abstract layer adds second configuration information to the fifth frame request, to obtain an updated fifth frame request, where the second configuration information includes a first preset identifier, a third tag of the first preset identifier, a second preset identifier, and a fourth tag of the second preset identifier.

The first preset identifier is an identifier of the master synchronization camera lens, and the third tag indicates an attribute of a camera lens indicated by the first preset identifier. The second preset identifier is an identifier of the slave synchronization camera lens, and the second tag indicates an attribute of a camera lens indicated by a second preset identifier.

If exposure compensation is mainly involved in this embodiment, the attribute of the camera lens indicated by the first preset identifier is to synchronously perform exposure compensation on the master synchronization camera lens, and accordingly, the first tag may be EV-SYNC-TAG-MASTER. The attribute of the camera lens indicated by the second preset identifier is to synchronously perform exposure compensation on the slave synchronization camera lens, and accordingly, the second tag may be EV-SYNC-TAG-SLAVE.

For example, the second configuration information may be {1, EV-SYNC-TAG-MASTER; 2, EV-SYNC-TAG-SLAVE}, indicating that the camera lens of which the identifier is 1 is the master synchronization camera lens on which exposure compensation is synchronously performed, and the camera lens of which the identifier is 2 is the master synchronization camera lens on which exposure compensation is synchronously performed.

S905: The camera hardware abstract layer sends the updated fifth frame request and the first EV to the first ISP based on the first identifier.

S906: The first ISP determines that a first identifier in the updated fifth frame request is the second preset identifier in the second configuration information, and determines that a tag of the first preset identifier is the third tag.

After receiving the updated fifth frame request, the first ISP may match the first identifier carried in the updated fifth frame request with the first preset identifier and the second preset identifier in the second configuration information, to determine that the first identifier is the same as the first preset identifier. The first ISP further queries the tag, that is, the third tag, of the first preset identifier in the second configuration information, to determine that a camera lens (that is, the first camera lens) specific to the updated fifth frame request is the master synchronization camera lens on which exposure compensation is synchronously performed. Then, processing of synchronously performing exposure compensation is completed according to a procedure that corresponds to a procedure (that is, S907 and S908 below) for synchronously performing exposure compensation on the master synchronization camera lens.

S907: The first ISP determines a fifth exposure parameter based on the first EV.

Similarly, the first ISP may determine, based on the first EV, an exposure parameter (which may be denoted as the fifth exposure parameter) of the first camera lens based on a VE algorithm in a 3A algorithm. Details are not described herein. If the first EV is a positive value, an exposure may be increased according to the 3A algorithm. If the first EV is a negative value, an exposure may be decreased according to the 3A algorithm. For example, if the first EV is 2 in the interface 1005 shown in FIG. 10A to FIG. 10C, the exposure may be adjusted to $2^2=4$ times the current value according to the 3A algorithm.

S908: The first ISP stores the fifth exposure parameter.

S909: The first ISP sends the fifth exposure parameter to the first camera lens.

S910: The first camera lens captures a seventh image based on the fifth exposure parameter.

S911: The camera application sends a sixth frame request of the second camera lens to the camera hardware abstract layer. The sixth frame request includes a second identifier.

S912: The camera hardware abstract layer adds second configuration information to the sixth frame request, to obtain an updated sixth frame request, where the second configuration information includes a first preset identifier, a third tag of the first preset identifier, a second preset identifier, and a fourth tag of the second preset identifier.

S913: The camera hardware abstract layer sends the updated sixth frame request to the second ISP based on the second identifier.

S914: The second ISP determines that a second identifier in the updated sixth frame request is the second preset identifier in the second configuration information, and determines that a tag of the second preset identifier is the fourth tag.

After receiving the updated sixth frame request, the second ISP may match the second identifier carried in the updated sixth frame request with the first preset identifier and the second preset identifier in the second configuration information, to determine that the second identifier is the same as the second preset identifier. The second ISP further queries the tag, that is, the fourth tag, of the second preset identifier in the second configuration information, to determine that a camera lens (that is, the second camera lens) specific to the updated sixth frame request is the slave synchronization camera lens on which exposure compensation is synchronously performed. Then, processing of synchronously performing exposure compensation is completed according to a procedure that corresponds to a procedure (that is, S915 and S916 below) for synchronously performing exposure compensation on the slave synchronization camera lens.

S915: The second ISP obtains the fifth exposure parameter.

S916: The second ISP determines a sixth exposure parameter based on the fifth exposure parameter.

S917: The second ISP sends the sixth exposure parameter to the second camera lens.

S918: The second camera lens captures an eighth image based on the sixth exposure parameter.

S919: The camera application displays a fourth interface, and the fourth interface includes the seventh image captured by the first camera lens and the eighth image captured by the second camera lens.

An example in which the third interface is the interface 1001 shown in FIG. 10A to FIG. 10C, the third image is an image 1002 in the interface 1001, the fourth image is an image 1003 in the interface 1001, and the first EV is 2 in the interface 1005 shown in FIG. 10A to FIG. 10C is used for illustration. The fourth interface may be an interface 1006 shown in FIG. TOA to FIG. 10C, the seventh image may be an image 1007 in the interface 1006, and the eighth image may be an image 1008 in the interface 1006. Because the EV is 2, a positive value, exposure compensation is to increase an exposure. Correspondingly, in comparison to the image 1002, the image 1007 becomes bright. In comparison to the image 1003, the image 1008 becomes bright. In other words, although exposure compensation is requested to be performed on the first camera lens, an exposure of the image captured by the first camera lens and an exposure of the image captured by the second camera lens are simultaneously increased.

It should be noted that, for a part that is not described in detail in embodiments in FIG. 9A to FIG. 9C and FIG. 10A to FIG. 10C, reference may be made to related description in embodiments in FIG. 5A to FIG. 5C to FIG. 8A and FIG. 8B.

It can be learned from that, in the solution in this embodiment, the master synchronization camera lens and the slave synchronization camera lens may be flexibly configured at the camera hardware abstract layer. In addition, an exposure parameter of the master synchronization camera lens that is determined based on the operation b performed by the user is stored in the common storage area. Therefore, the exposure parameter of the master synchronization camera lens may be obtained from the common storage area and used to determine an exposure parameter of the slave synchronization camera lens. In this way, in a case in which exposure compensation is requested to be performed on the master synchronization camera lens, synchronously changing the exposure parameters of the slave synchronization camera lens and the exposure parameter of the master synchronization camera lens is maintained. Finally, an exposure of the image captured by the master synchronization camera lens and an exposure of the image captured by the slave synchronization camera lens are synchronously increased or decreased, and brightness of the images is synchronously changed.

Figure 11:
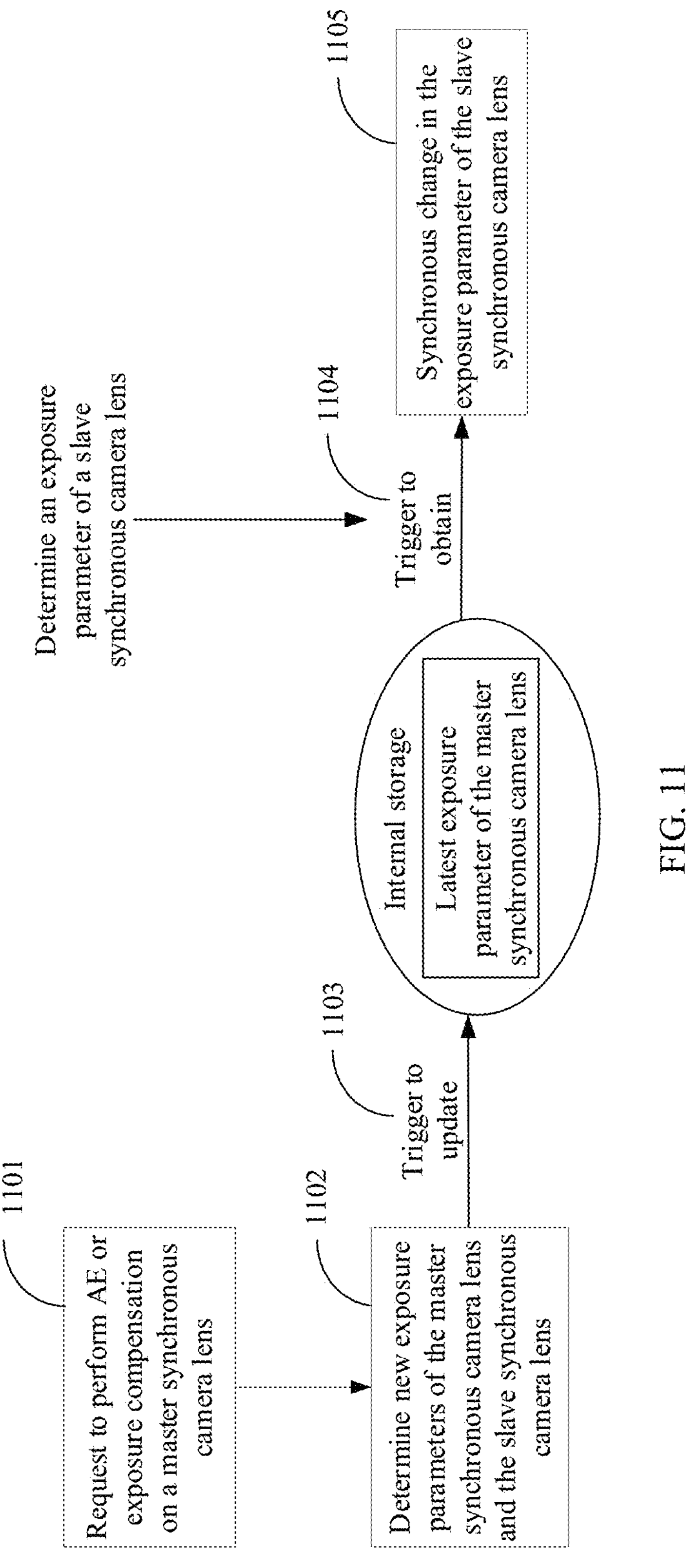
FIG. 11 is a diagram 1 of an implementation principle of a shooting method according to an embodiment of this application.

In conclusion, it can be learned from embodiments in FIG. 7A to FIG. 7C to FIG. 10A to FIG. 10C that: Refer to FIG. 11. In this embodiment of this application, after AE or exposure compensation (for example, 1101 in FIG. 11) is requested to be performed on the master synchronization camera lens each time, a new exposure parameter (for example, 1102 in FIG. 11) of the master synchronization camera lens may be determined. In this way, the exposure parameter of the master synchronization camera lens stored in the memory (for example, 1103 in FIG. 11) may be triggered and updated, to enable the exposure parameter stored in the memory to be a latest exposure parameter of the master synchronization camera lens. Then, when the exposure parameter of the slave synchronization camera lens needs to be determined, obtaining of the latest exposure parameter of the master synchronization camera lens from the memory (for example, 1104 in FIG. 11) is triggered, and accordingly, the exposure parameter of the slave synchronization camera lens is determined. In this way, synchronously changing the exposure parameter of the slave synchronization camera lens and the exposure parameter of the master synchronization camera lens (for example, 1105 in FIG. 11) is maintained.

In some other scenarios, the user may further request to perform AE or exposure compensation on the slave camera lens. For example, if the operation a is specific to the image captured by the second camera lens, the user requests to perform AE on the slave camera lens.

In some embodiments, for a scenario in which AE is requested to be performed on the second camera lens, AE is not synchronously performed on the master synchronization camera lens while AE is performed on the slave synchronization camera lens. Therefore, the exposure of the image captured by the first image lens is not synchronously changed while the exposure of the image captured by the second camera lens is changed. For example, after receiving the frame request and the region information, the camera hardware abstract layer may obtain an identifier carried in the frame request. If the identifier is the same as the first preset identifier, the camera hardware abstract layer adds configuration information to the frame request, an ISP may perform processing according to a related procedure for synchronously performing AE, for example, perform processing according to the procedure of S704 to S719 in FIG. 7A to FIG. 7C. If the identifier is not the same as the first preset identifier, the camera hardware abstract layer does not add configuration information to the frame request, but directly distributes the frame request and the region information to a corresponding ISP for processing. This situation is not much described in this specification.

Similarly, for a scenario in which exposure compensation is requested to be performed on the second camera lens, exposure compensation is not synchronously performed on the master synchronization camera lens while exposure compensation is performed on the slave synchronization camera lens. Therefore, the exposure of the image captured by the first image lens is not synchronously changed while the exposure of the image captured by the second camera lens is changed. For example, after receiving the frame request and the EV, the camera hardware abstract layer may obtain an identifier carried in the frame request. If the identifier is the same as the first preset identifier, the camera hardware abstract layer adds configuration information to the frame request, the ISP may perform processing according to a related procedure for synchronously performing exposure compensation, for example, perform processing according to the procedure of S904 to S919 in FIG. 9A to FIG. 9C. If the identifier is not the same as the first preset identifier, the camera hardware abstract layer does not add configuration information to the frame request, but directly distributes the frame request and the EV to the corresponding ISP for processing. This situation is not much described in this specification.

In this embodiment, the exposure parameter of the slave synchronization camera lens may not be synchronized to the master synchronization camera lens. This improves appropriateness of adjusting the exposure parameter.

In some other embodiments, for a scenario in which AE is requested to be performed on the second camera lens, switching to perform AE on the first camera lens may be performed. After AE performed on the first camera lens is completed, AE is synchronously performed on the second camera lens. In this way, for a scenario in which AE is requested to be performed on the slave synchronization camera lens, synchronously changing the exposure parameter of the master synchronization camera lens and the exposure parameter of the slave synchronization camera lens is maintained. This resolves inappropriateness of exposing caused by directly synchronizing the exposure parameter of the slave synchronization camera lens to the master synchronization camera lens.

Figure 12A:
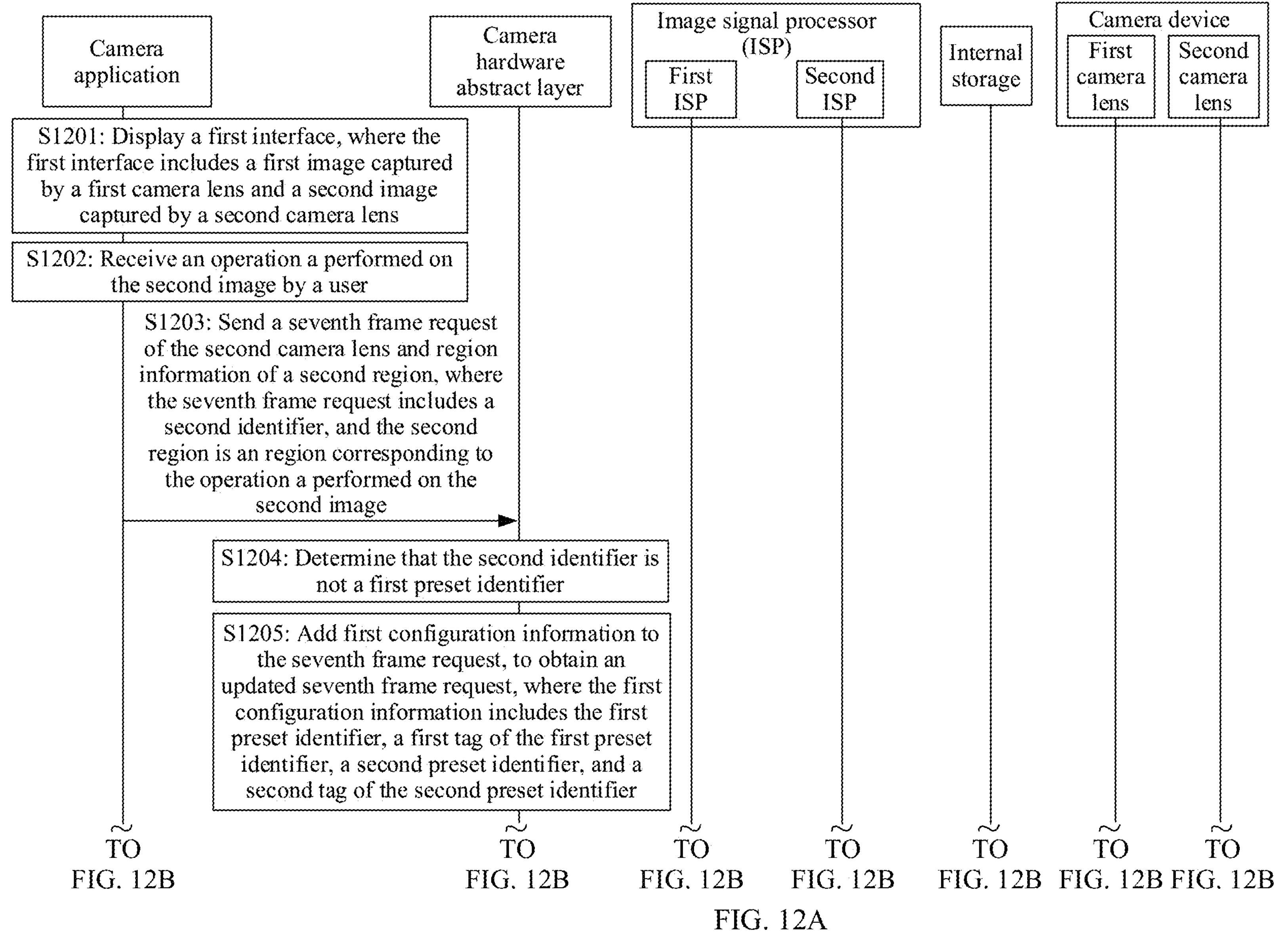
FIG. 12A to FIG. 12C are interaction diagrams 4 of an implementation of a shooting method according to an embodiment of this application.
Figure 12B:
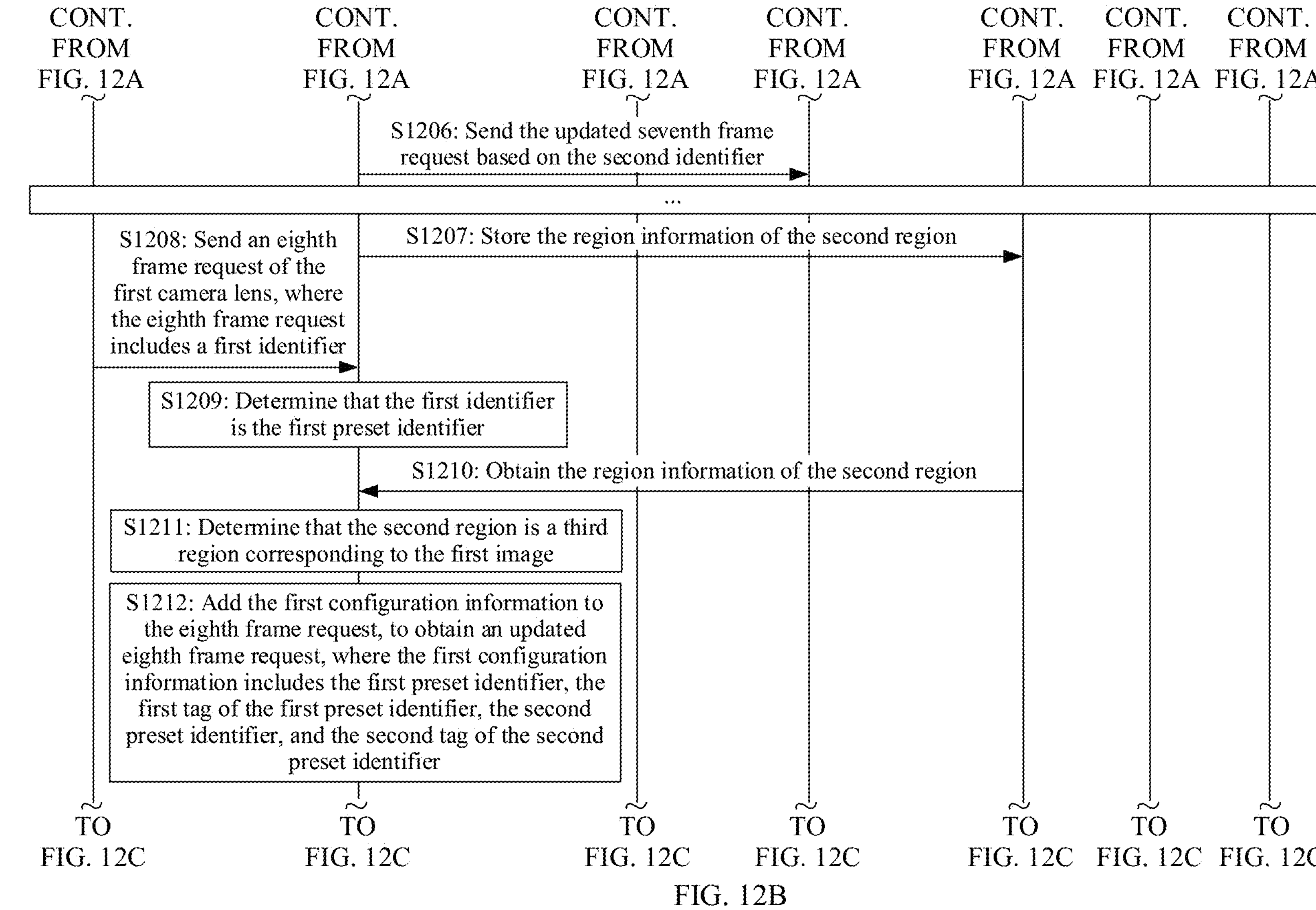
Figure 12C:
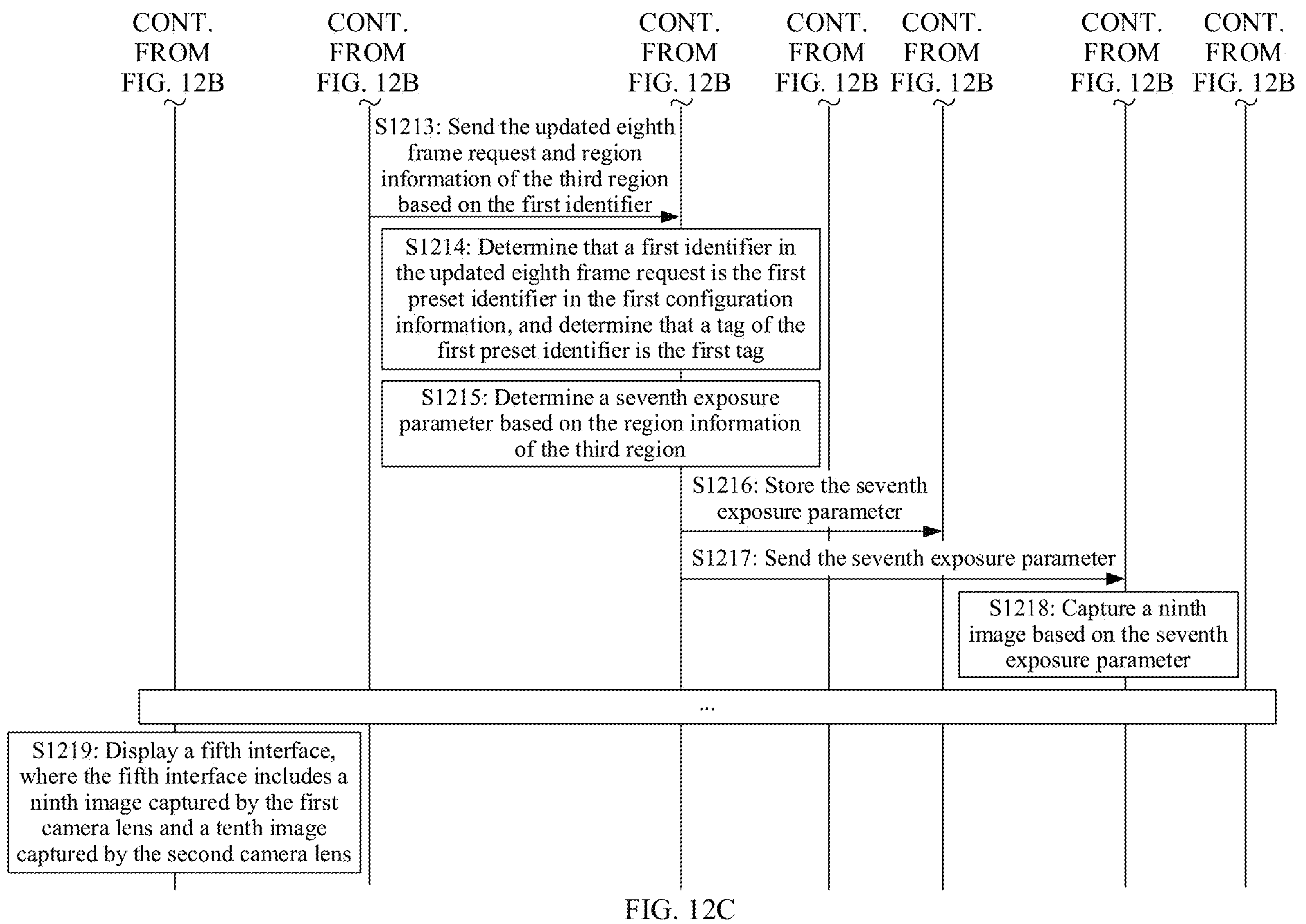

Refer to FIG. 12A to FIG. 12C. Specifically, a shooting method provided in this embodiment may include the following steps.

S1201: A camera application displays a first interface, and the first interface includes a first image captured by a first camera lens and a second image captured by a second camera lens.

S1202: The camera application receives an operation a performed on the second image by a user.

Figure 13A:
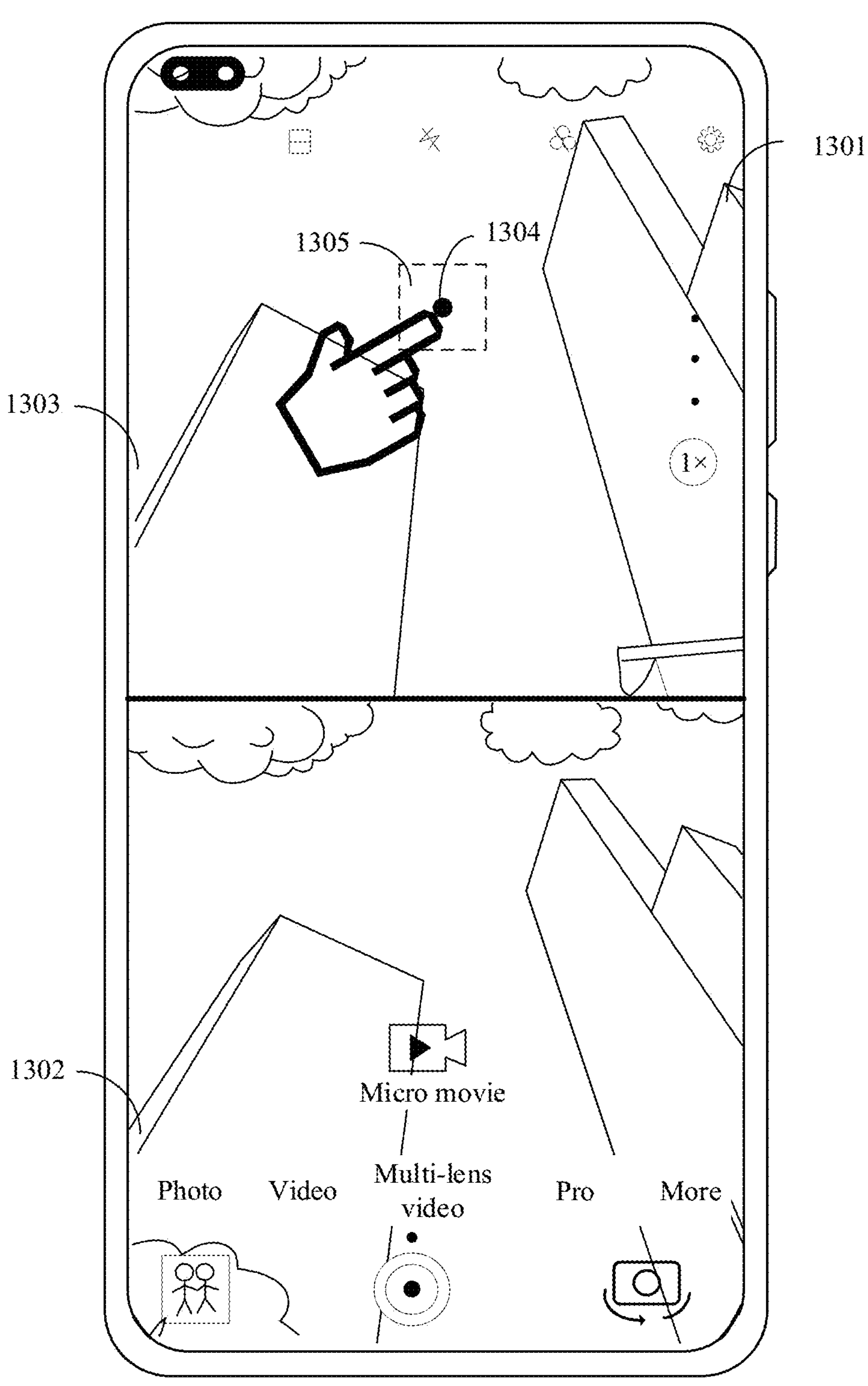
FIG. 13A and FIG. 13B are diagrams 6 of an interface of a mobile phone according to an embodiment of this application.
Figure 13B:
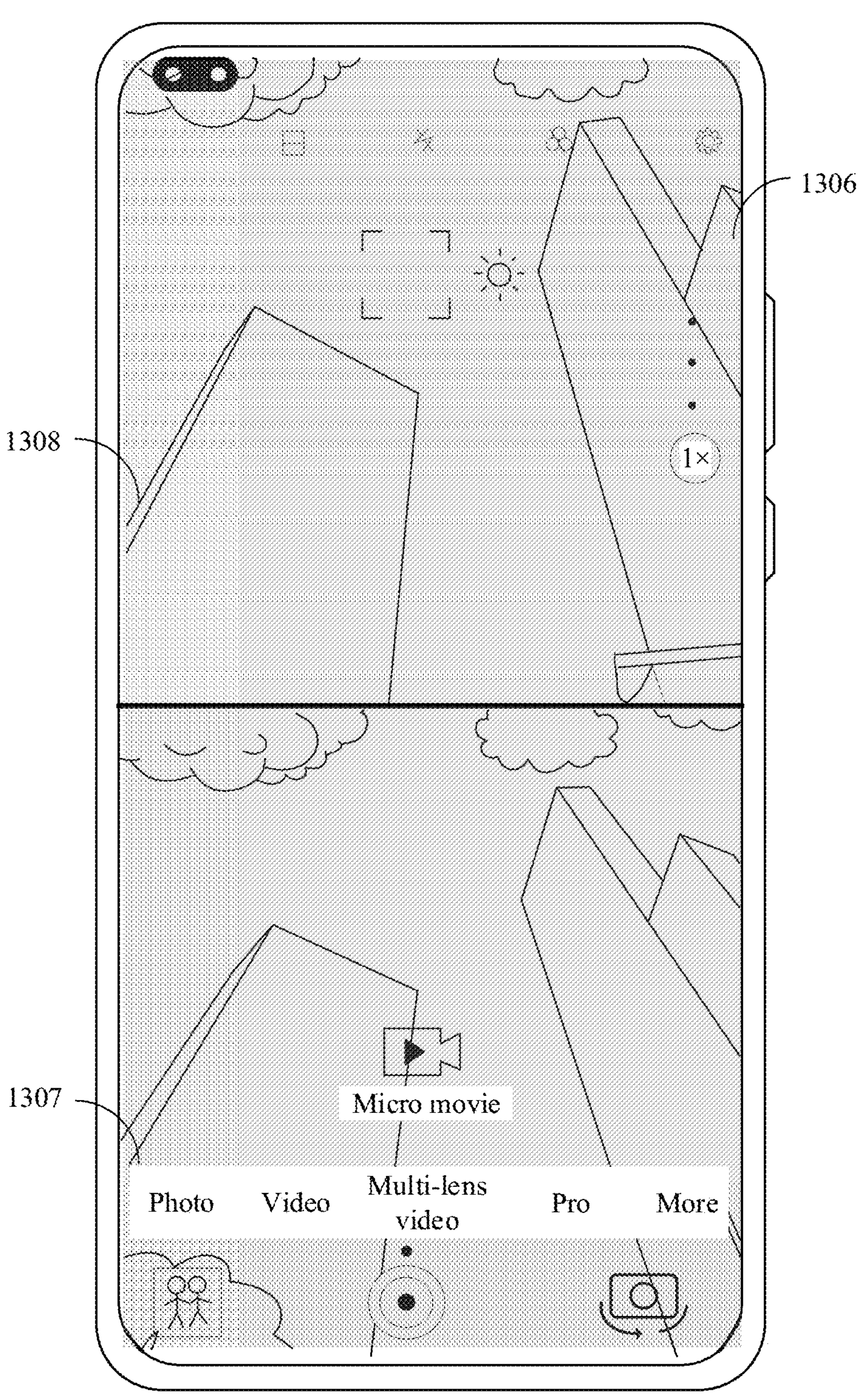
Figure 14A:
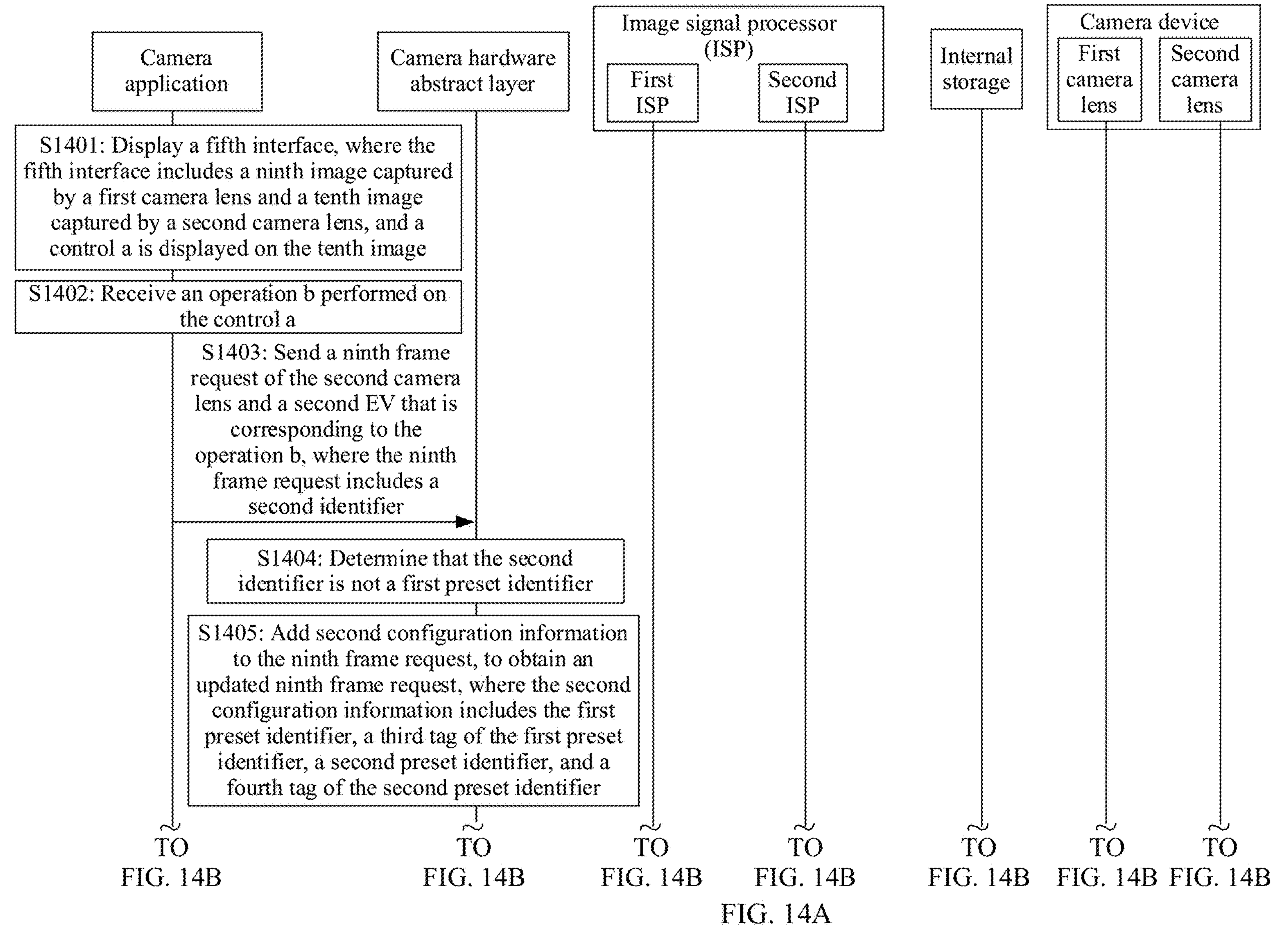
FIG. 14A to FIG. 14C are interaction diagrams 5 of an implementation of a shooting method according to an embodiment of this application.
Figure 14B:
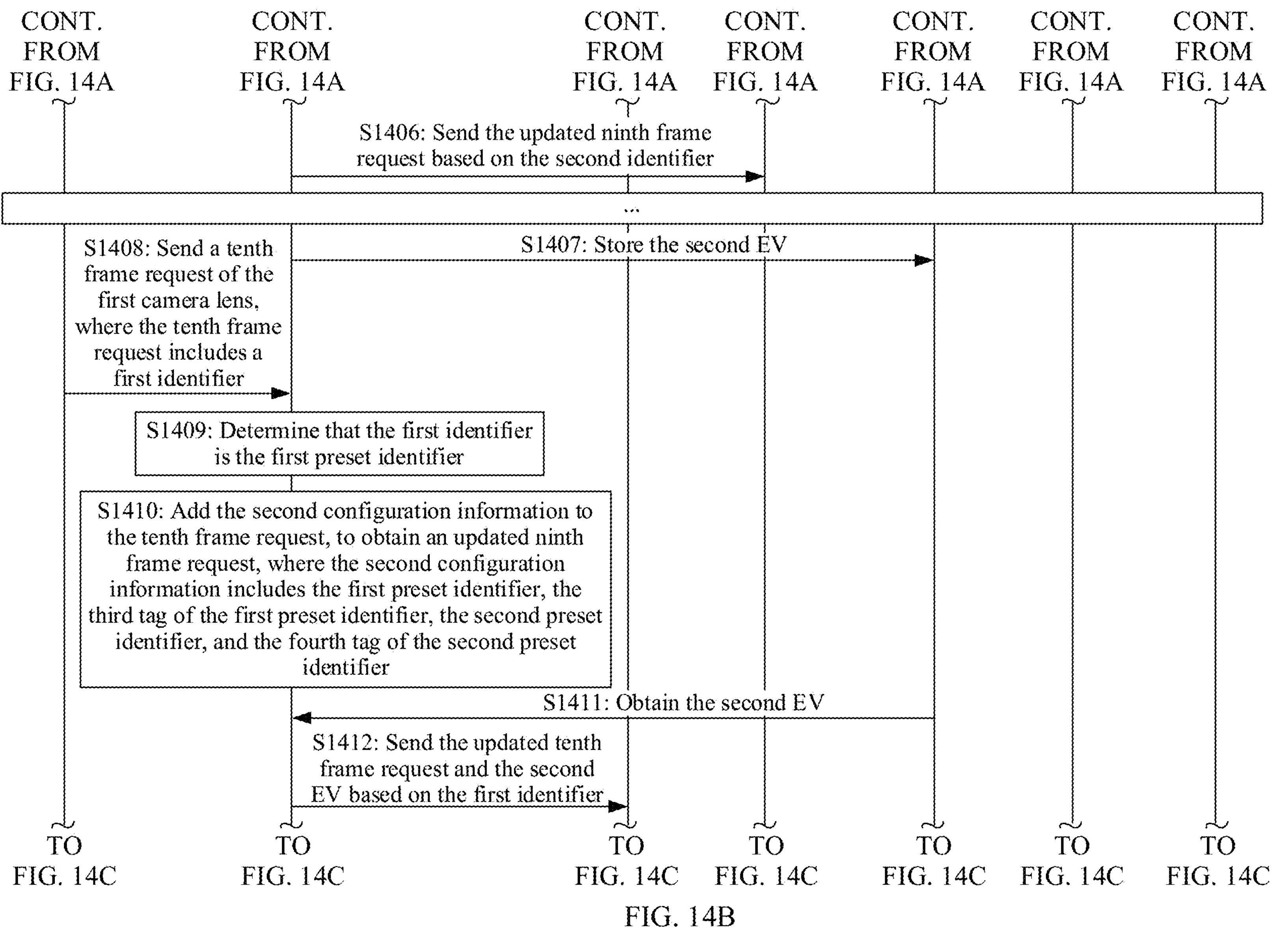
Figure 14C:
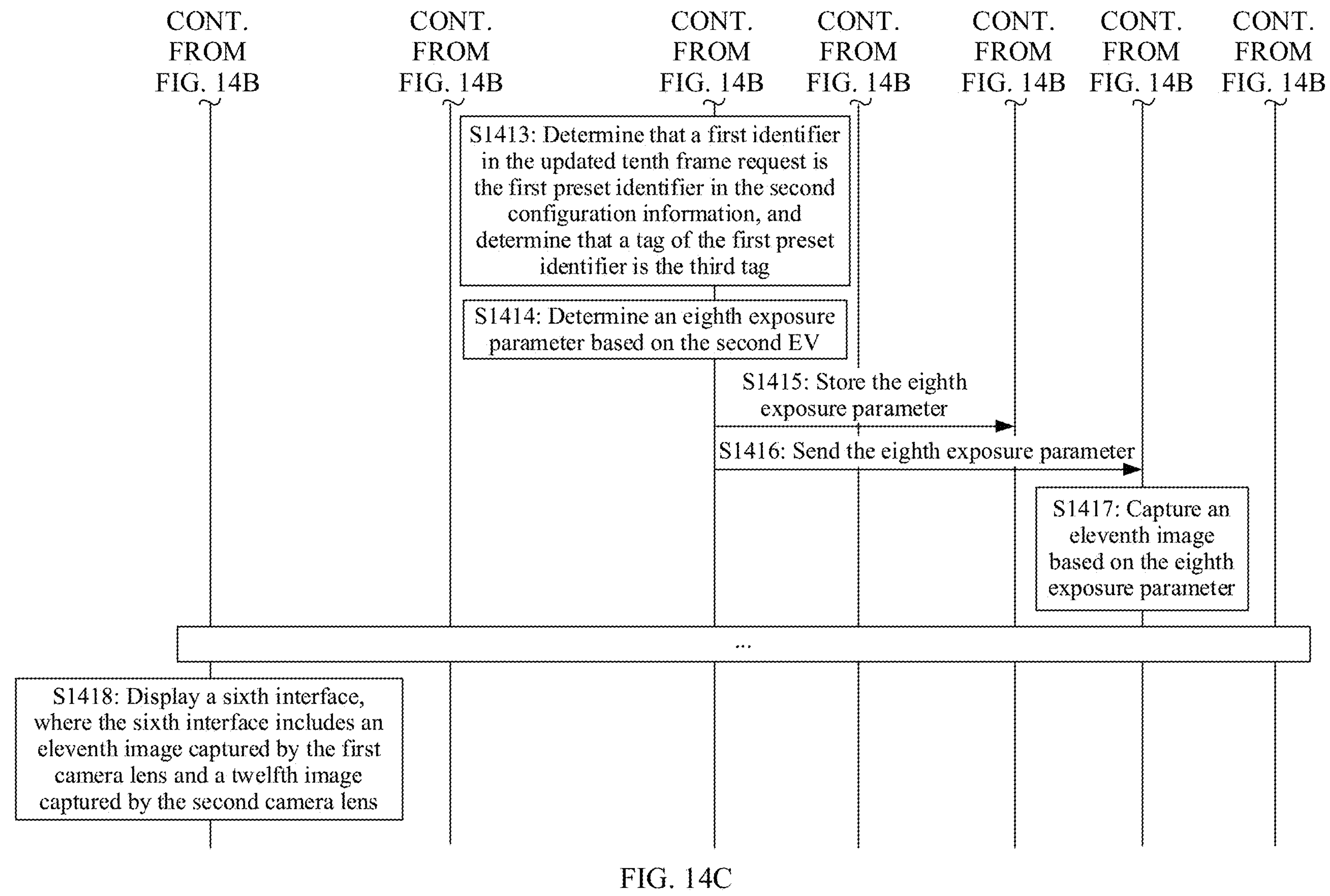

For example, the first interface is an interface 1301 shown in FIG. 13A and FIG. 13B, the first image is an image 1302 in the interface 1301, the second image is an image 1303 in the interface 1301, and the operation a may be a tap operation performed at a position 1304 in image 1303 by the user.

The operation a is specific to the second image, that is, requests to perform AE on the second camera lens.

S1203: The camera application sends a seventh frame request of the second camera lens and region information of the second region to a camera hardware abstract layer. The seventh frame request includes a second identifier. The second region is a region corresponding to the operation a performed on the second image.

The region corresponding to the operation a performed on the second image may be a region that is preset and that includes a touch point of the operation a performed on the second image. For example, the operation a is the tap operation performed at the position 1304 on the image 1303, and the second region may be a region 1304 (for example, a region shown in a dashed-line box). The region information of the second region may be a range of a position of the region 1304 on the image 1303.

S1204: The camera hardware abstract layer determines that the second identifier is not a first preset identifier.

In this embodiment, after receiving the frame request and the region information, the camera hardware abstract layer first needs to determine whether to perform AE on a master synchronization camera lens based on the operation a. Specifically, an identifier (for example, the second identifier) of a camera lens in the frame request is matched with the first preset identifier. If the identifiers are the same, the procedure of S704 to S719 in FIG. 7A to FIG. 7C may be used for processing. If the identifiers are not the same, that is, it is determined that AE is not performed on the master synchronization camera lens, on the one hand, the following S1205 and S1206 are performed.

S1205: The camera hardware abstract layer adds first configuration information to the seventh frame request, to obtain an updated seventh frame request, where the first configuration information includes the first preset identifier, the first tag of the first preset identifier, the second preset identifier, and the second tag of the second preset identifier.

S1206: The camera hardware abstract layer sends the updated seventh frame request to a second ISP based on the second identifier.

In this embodiment, while sending the updated seventh frame request to the second ISP, the camera hardware abstract layer does not send the region information of the second region to the second ISP. Therefore, the second ISP does not complete AE based on the region information of the second region.

In addition, because the updated seventh frame request includes the first configuration information, the second ISP may obtain the exposure parameter from a common storage area and complete AE on the second camera lens, and the second camera lens captures the image. This content is omitted in FIG. 12A to FIG. 12C. For details, reference may be made to related description above, such as description of S714 to S718.

On the other hand, S1207 and subsequent steps are performed.

S1207: The camera hardware abstract layer stores the region information of the second region.

In this embodiment, the camera hardware abstract layer stores the region information of the second region, and subsequently switch, based on the region information of the second region, performing of AE on the slave synchronization camera lens to performing of AE on a master synchronization camera lens.

S1208: The camera application sends an eighth frame request of the first camera lens to the camera hardware abstract layer. The eighth frame request includes a first identifier.

After storing the region information of the second region, the camera hardware abstract layer may switch the request of performing AE on the slave synchronization camera lens to the request of performing AE on the master synchronization camera lens. Therefore, after storing the region information of the second region, when receiving the frame request, the camera hardware abstract layer identifies whether the identifier of the camera lens (for example, the first identifier) carried in the frame request is a first preset identifier, and then determine whether performing switching. If the identifier of the camera lens is the first preset identifier, it is determined that a currently received frame request is the frame request of the master synchronization camera lens, and switching may be performed as shown in S1209 below. If the identifier of the camera lens is not the first preset identifier, switching may not be performed, and AE performed on the slave synchronization camera lens may only be completed according to a procedure of S714 to S718.

S1209: The camera hardware abstract layer determines that the first identifier is the first preset identifier, that is, determines that the currently received frame request is the frame request of the master synchronization camera lens.

S1210: The camera hardware abstract layer obtains the region information of the second region from the memory.

S1211: The camera hardware abstract layer determines that the second region is in a third region corresponding to the first image.

When the first camera lens and the second camera lens are front-facing camera lenses or rear-facing camera lenses, the first camera lens and the second camera lens perform shooting on a same view at different FOVs at a same position. In other words, center points of an image captured by the first camera lens and an image captured by the second camera lens may be approximately a same position at which the same view is shot. Therefore, the camera hardware abstract layer may determine relative positions of center points of the third region and the first image based on relative positions of center points of the second region and the second image, a FOV of the first camera lens, and a FOV of the second camera lens, to determine the third region. For a specific implementation of determining corresponding positions on the two images captured by the two camera lenses based on the FOVs of the two camera lenses, refer to related technical literature, and details are not described in this specification.

S1212: The camera hardware abstract layer adds first configuration information to the eighth frame request, to obtain an updated eighth frame request, where the first configuration information includes the first preset identifier, the first tag of the first preset identifier, the second preset identifier, and the second tag of the second preset identifier.

S1213: The camera hardware abstract layer sends the updated eighth frame request and the region information of the third region to a first ISP based on the first identifier.

In other words, after S1213, the camera hardware abstract layer completes switching the request of performing of AE on the slave synchronization camera lens to the request of performing of AE on the master synchronization camera lens.

It should be noted that performing of S1210 and S1211 is not actually limited to that shown in FIG. 12A to FIG. 12C. During actual implementation, S1210 and S1211 may be performed at any time from S1207 to S1213.

S1214: The first ISP determines that a first identifier in the updated eighth frame request is the first preset identifier in the first configuration information, and determines that a tag of the first preset identifier is the first tag.

S1215: The first ISP determines a seventh exposure parameter based on the region information of the third region.

S1216: The first ISP stores the seventh exposure parameter.

S1217: The first ISP sends the seventh exposure parameter to the first camera lens.

S1218: The first camera lens captures a ninth image based on the seventh exposure parameter.

Then, if the second camera lens is required to continuously capture a new frame of the image, the camera application may continuously send the frame request of the second camera lens. When processing is subsequently performed on the frame request, the seventh exposure parameter stored in the common storage area may be synchronized to the second camera lens. Specifically, AE performed on the second camera lens may be completed according to a procedure similar to S711 to S718, and details are not further described herein. A difference is that the seventh exposure parameter, rather than the third exposure parameter, is obtained from the common storage area. Finally, the second camera lens captures a tenth image.

S1219: The camera application displays a fifth interface, and the fifth interface includes the ninth image captured by the first camera lens and the tenth image captured by the second camera lens.

As an example, the first interface is the interface 1301 shown in FIG. 13A and FIG. 13B, the first image is an image 1302 in the interface 1301, and the second image is an image 1305 in the interface 1301. Therefore, the fifth interface may be an interface 1306 shown in FIG. 13A and FIG. 13B, the ninth image may be an image 1307 in the interface 1306, and the tenth image may be an image 1308 in the interface 1306. Apparently, in comparison to the image 1302, the image 1307 significantly becomes dark. In comparison to the image 1305, the image 1308 significantly becomes bright. In other words, although AE is requested to be performed on the second camera lens, an exposure of the image captured by the first camera lens and an exposure of the image captured by the second camera lens are simultaneously decreased.

In other embodiments, after switching and synchronization of AE are completed in embodiments in FIG. 12A to FIG. 12C FIG. 13A and FIG. 13B, it may further request to perform exposure compensation on the second camera lens. In this embodiment, exposure compensation may be first performed on the first camera lens. After exposure compensation performed on the first camera lens is completed, exposure compensation is synchronously performed on the second camera lens. In this way, in a scenario in which exposure compensation is requested to be performed on the slave synchronization camera lens, synchronously changing an exposure parameter of the master synchronization camera lens and an exposure parameter of the slave synchronization camera lens is maintained. This resolves inappropriateness of exposing caused by directly synchronizing the exposure parameter of the slave synchronization camera lens to the master synchronization camera lens.

Refer to FIG. 14A to FIG. 14C and FIG. 15A to FIG. 15C. Specifically, in combination with a hardware structure and a software structure of a mobile phone, a shooting method provided in this embodiment may include the following steps.

S1401: A camera application displays a fifth interface, and the fifth interface includes a ninth image captured by a first camera lens and a tenth image captured by a second camera lens. The tenth image displays on a control a.

Figure 15A:
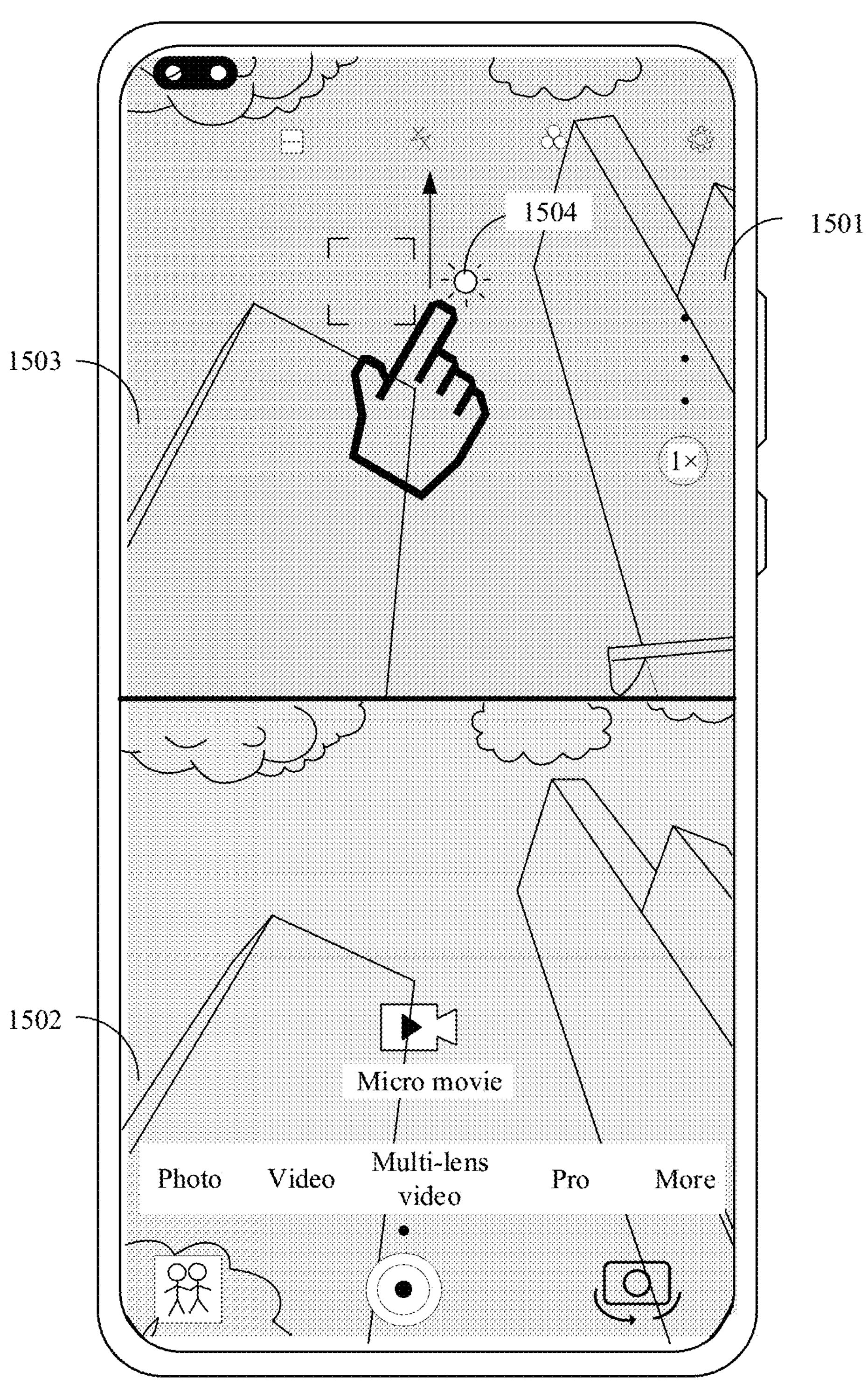
FIG. 15A to FIG. 15C are diagrams 7 of an interface of a mobile phone according to an embodiment of this application.
Figure 15B:
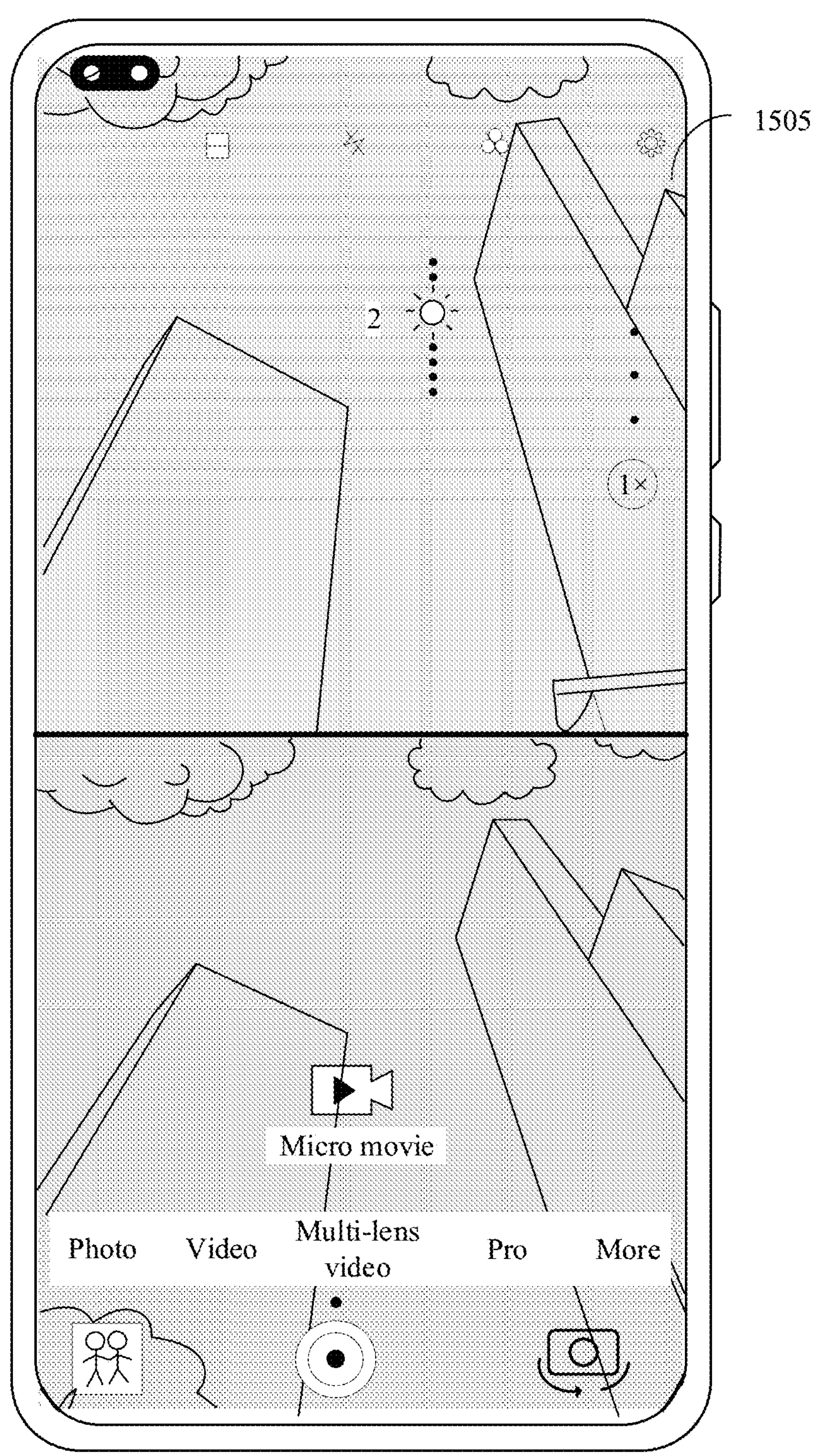
Figure 15C:
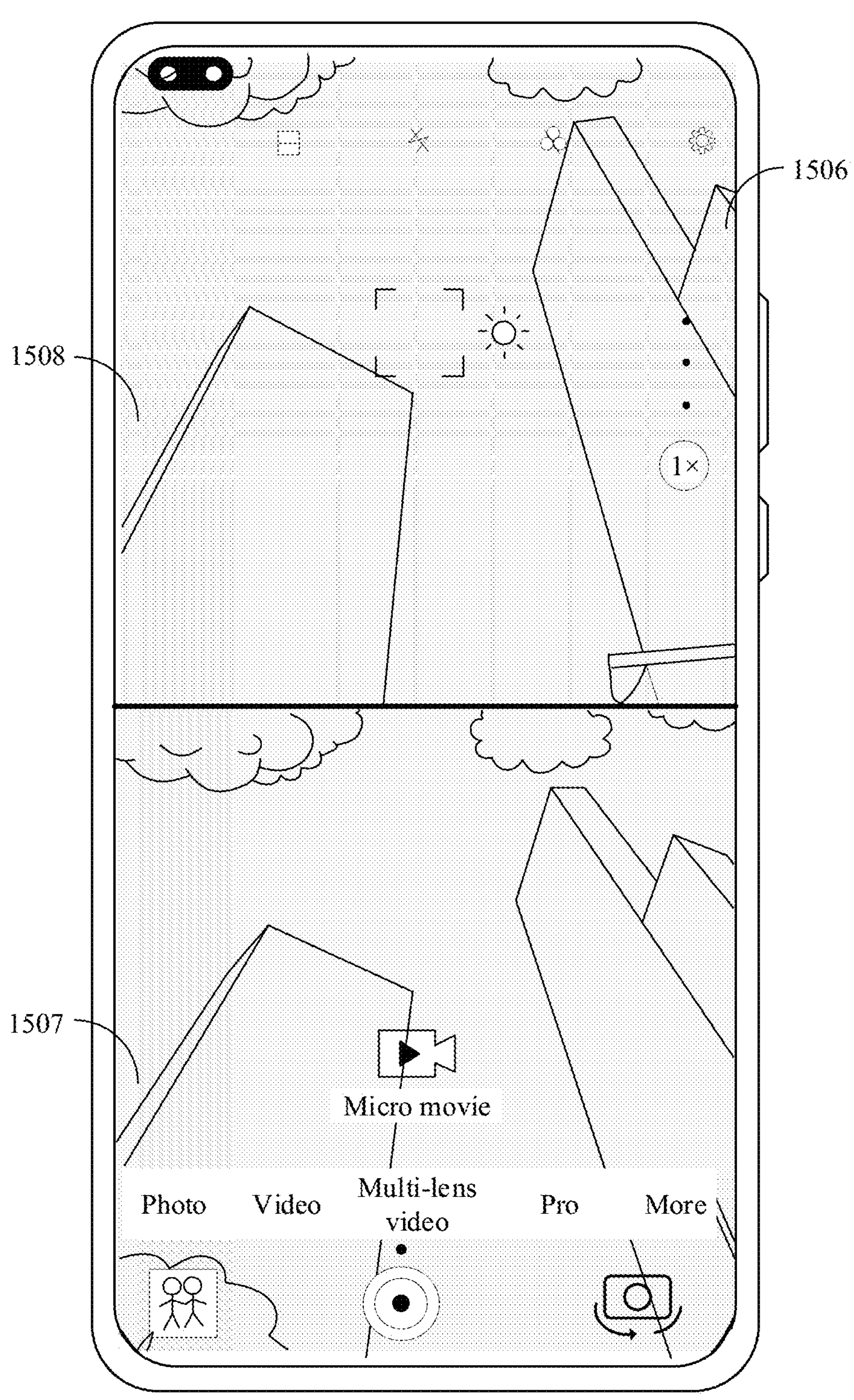

For example, the first interface is an interface 1501 shown in FIG. 15A to FIG. 15C, the first image is an image 1502 in the interface 1501, the second image is an image 1503 in the interface 1501, and the operation a may be a tap operation performed at a position 1504 in image 1503 by a user.

S1402: The camera application receives an operation b performed on the control a by the user.

For example, the control a is a button 1504 on the image 1503 in interface 1501 shown in FIG. 15A to FIG. 15C, and the operation b is a sliding operation. The button 1504 is slid upward (that is, a direction indicated by an arrow in the interface 1501) by a specific displacement, the EV for performing exposure compensation may be adjusted to 2 in an interface 1505 shown in FIG. 15A to FIG. 15C.

If the control a is located over an image captured by the second camera lens, the operation b performed on the control a by the user is to request to perform exposure compensation on a slave synchronization camera lens.

S1403: The camera application sends, to the camera hardware abstract layer, a ninth frame request of the second camera lens and a second EV corresponding to the operation b. The ninth frame request includes a second identifier.

The second EV is an EV for performing exposure compensation, for example, 2 in the interface 1505 shown in FIG. 15A to FIG. 15C, and used to subsequently determine an exposure parameter by an ISP.

S1404: The camera hardware abstract layer determines that the second identifier is not a first preset identifier.

In this embodiment, after receiving the frame request and the EV, the camera hardware abstract layer first needs to determine whether to perform exposure compensation on a master synchronization camera lens based on the operation b. Specifically, an identifier (for example, the second identifier) of a camera lens in the frame request is matched with the first preset identifier. If the identifiers are the same, the procedure of S904 to S919 in FIG. 9A to FIG. 9C may be used for processing. If the identifiers are not the same, that is, it is determined that exposure compensation is not performed on the master synchronization camera lens, on the one hand, the following S1405 and S1406 are performed.

S1405: The camera hardware abstract layer adds second configuration information to the ninth frame request, to obtain an updated ninth frame request, where the second configuration information includes a first preset identifier, a third tag of the first preset identifier, a second preset identifier, and a fourth tag of the second preset identifier.

S1406: The camera hardware abstract layer sends the updated ninth frame request to a second ISP based on the second identifier.

In this embodiment, while sending the updated ninth frame request to the second ISP, the camera hardware abstract layer does not send the second EV to the second ISP. Therefore, the second ISP does not complete AE based on the second EV.

In addition, because the updated ninth frame request includes the second configuration information, the second ISP may obtain the exposure parameter from a common storage area and complete AE on the second camera lens, and the second camera lens captures the image. This content is omitted in FIG. 14A to FIG. 14C. For details, reference may be made to related description above, such as description of S914 to S918.

On the other hand, S1407 and subsequent steps are performed.

S1407: The camera hardware abstract layer stores the second EV.

In this embodiment, the camera hardware abstract layer stores the second EV, and subsequently switches a request of performing exposure compensation on the slave synchronization camera lens to perform exposure compensation on the master synchronization camera lens.

S1408: The camera application sends a tenth frame request of the first camera lens to the camera hardware abstract layer. The tenth frame request includes a first identifier.

S1409: The camera hardware abstract layer determines that the first identifier is the first preset identifier.

After storing the second EV, when receiving the frame request, the camera hardware abstract layer identifies whether the identifier of the camera lens (for example, the first identifier) carried in the frame request is a first preset identifier, and then determines whether to perform exposure compensation on the master synchronization camera lens. If the identifier of the camera lens is the first preset identifier, it is determined that a currently received frame request is the frame request of the master synchronization camera lens, and switching may be performed, and S1410 and subsequent steps may be performed. If the identifier of the camera lens is not the first preset identifier, switching may not be performed, and exposure compensation performed on the slave synchronization camera lens may only be completed according to a procedure of S914 to S918.

S1410: The camera hardware abstract layer adds second configuration information to the tenth frame request, to obtain an updated tenth frame request, where the second configuration information includes a first preset identifier, a third tag of the first preset identifier, a second preset identifier, and a fourth tag of the second preset identifier.

S1411: The camera hardware abstract layer obtains the second EV.

S1412: The camera hardware abstract layer sends the updated tenth frame request and the second EV to the first ISP based on the first identifier.

In other words, after S1412, the camera hardware abstract layer completes switching the request of performing exposure compensation on the master synchronization camera lens to the request of performing exposure compensation on the master synchronization camera lens.

S1413: The first ISP determines that a first identifier in the updated tenth frame request is the second preset identifier in the second configuration information, and determines that a tag of the first preset identifier is the third tag.

S1414: The first ISP determines a ninth exposure parameter based on the second EV.

S1415: The first ISP stores the ninth exposure parameter.

S1416: The first ISP sends the ninth exposure parameter to the first camera lens.

S1417: The first camera lens captures an eleventh image based on the ninth exposure parameter.

Then, if the second camera lens is required to continuously capture a new frame of the image, the camera application may continuously send the frame request of the second camera lens. When processing is subsequently performed on the frame request, the ninth exposure parameter stored in the common storage area may be synchronized to the second camera lens. Specifically, exposure compensation performed on the second camera lens may be completed according to a procedure similar to S911 to S918, and details are not further described herein. A difference is that the ninth exposure parameter, rather than the fifth exposure parameter, is obtained from the common storage area. Finally, the second camera lens captures a twelfth image.

S1418: The camera application displays a sixth interface, and the sixth interface includes the eleventh image captured by the first camera lens and the twelfth image captured by the second camera lens.

An example in which the fifth interface is the interface 1501 shown in FIG. 15A to FIG. 15C, the ninth image is the image 1502 in the interface 1501, and the tenth image is the image 1503 in the interface 1501. The sixth interface may be an interface 1506 shown in FIG. 15A to FIG. 15C, the eleventh image may be an image 1507 in the interface 1506, and the twelfth image may be an image 1508 in the interface 1506. Apparently, in comparison to the image 1502, the image 1507 significantly becomes bright. In comparison to the image 1503, the image 1508 significantly becomes dark. In other words, although exposure compensation is requested to be performed on the second camera lens, an exposure of the image captured by the first camera lens and an exposure of the image captured by the second camera lens are simultaneously increased.

Figure 16:
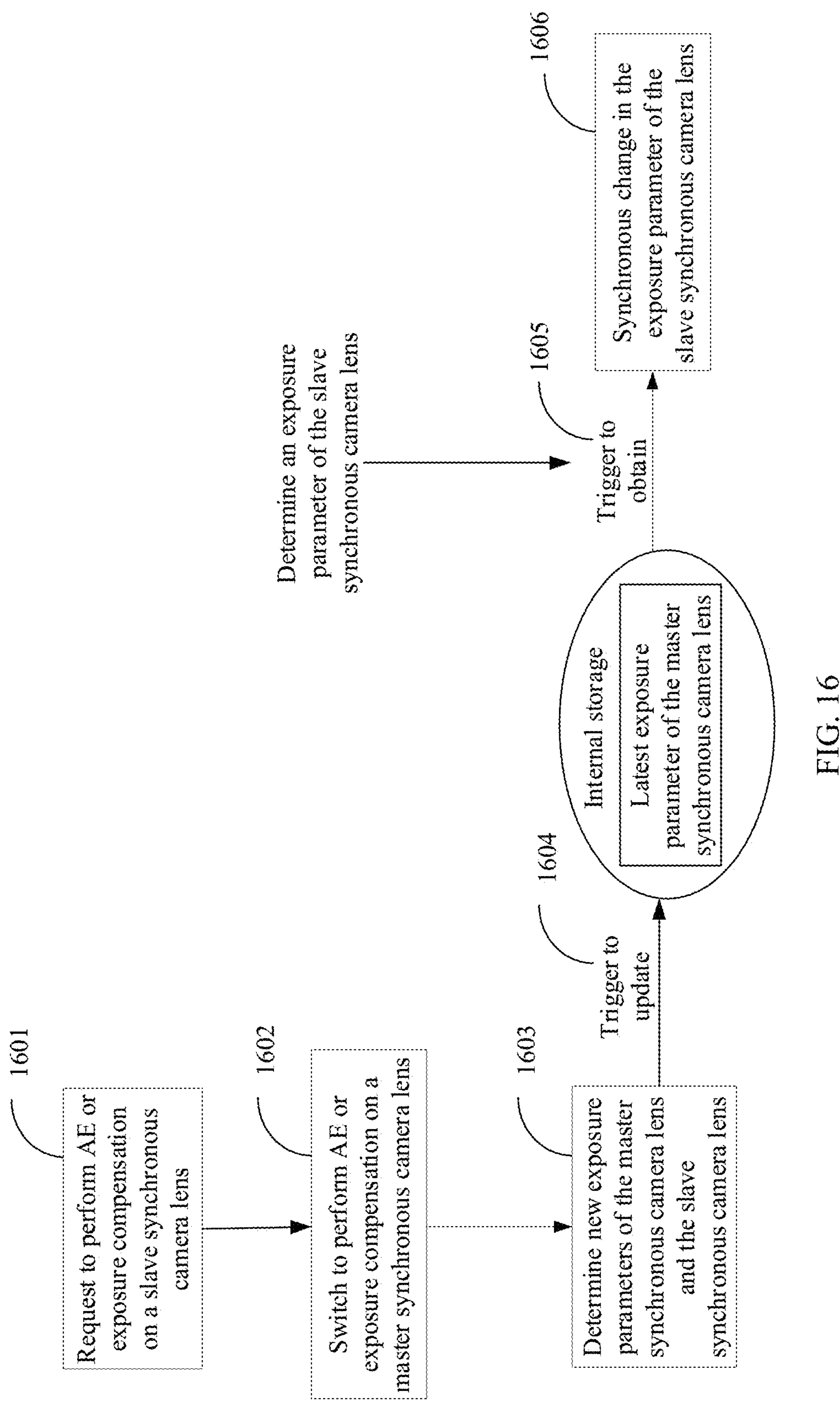
FIG. 16 is a diagram 2 of an implementation principle of a shooting method according to an embodiment of this application.

In conclusion, it can be learned from embodiments in FIG. 12A to FIG. 12C and FIG. 15A to FIG. 15C that: Refer to FIG. 16. In this embodiment of this application, after AE or exposure compensation (for example, 1601 in FIG. 16) is requested to be performed on the slave synchronization camera lens each time, switching to perform AE or exposure compensation (for example, 1602 in FIG. 16) on the master camera lens may be performed. Then, a new exposure parameter (for example, 1603 in FIG. 16) of the master synchronization camera lens may be determined. In this way, an exposure parameter of the master synchronization camera lens stored in the memory (for example, 1604 in FIG. 16) may be triggered and updated, to enable the exposure parameter stored in the memory to be a latest exposure parameter of the master synchronization camera lens. Then, when an exposure parameter of the slave synchronization camera lens needs to be determined, obtaining the latest exposure parameter of the master synchronization camera lens from the memory (for example, 1605 in FIG. 16) is triggered, and accordingly, the exposure parameter of the slave synchronization camera lens is determined. In this way, synchronously changing the exposure parameter of the slave synchronization camera lens and the exposure parameter of the master synchronization camera lens (for example, 1606 in FIG. 16) is maintained.

In some scenarios, the user may have a special requirement for exposure compensation, and perform exposure compensation on a single camera lens, without simultaneously performing exposure compensation on another camera lens. For example, the user may perform exposure compensation on only the first camera lens, or may perform exposure compensation on only the second camera lens. Based on this, in some other embodiments, when exposure compensation is requested to be performed on any camera lens (for example, the first camera lens or the second camera lens) (for example, the operation b performed on the control a by the user is received), it is first determined whether exposure compensation is currently performed on only the any camera lens. If it is determined that exposure compensation is currently performed on only the any camera lens, exposure compensation is performed on only the any camera lens. If it is determined that exposure compensation is not currently performed on only the any camera lens, exposure compensation is synchronously performed on the first camera lens and the second camera lens according to the foregoing embodiment shown in FIG. 9A to FIG. 9C or FIG. 14A to FIG. 14C.

Figure 17A:
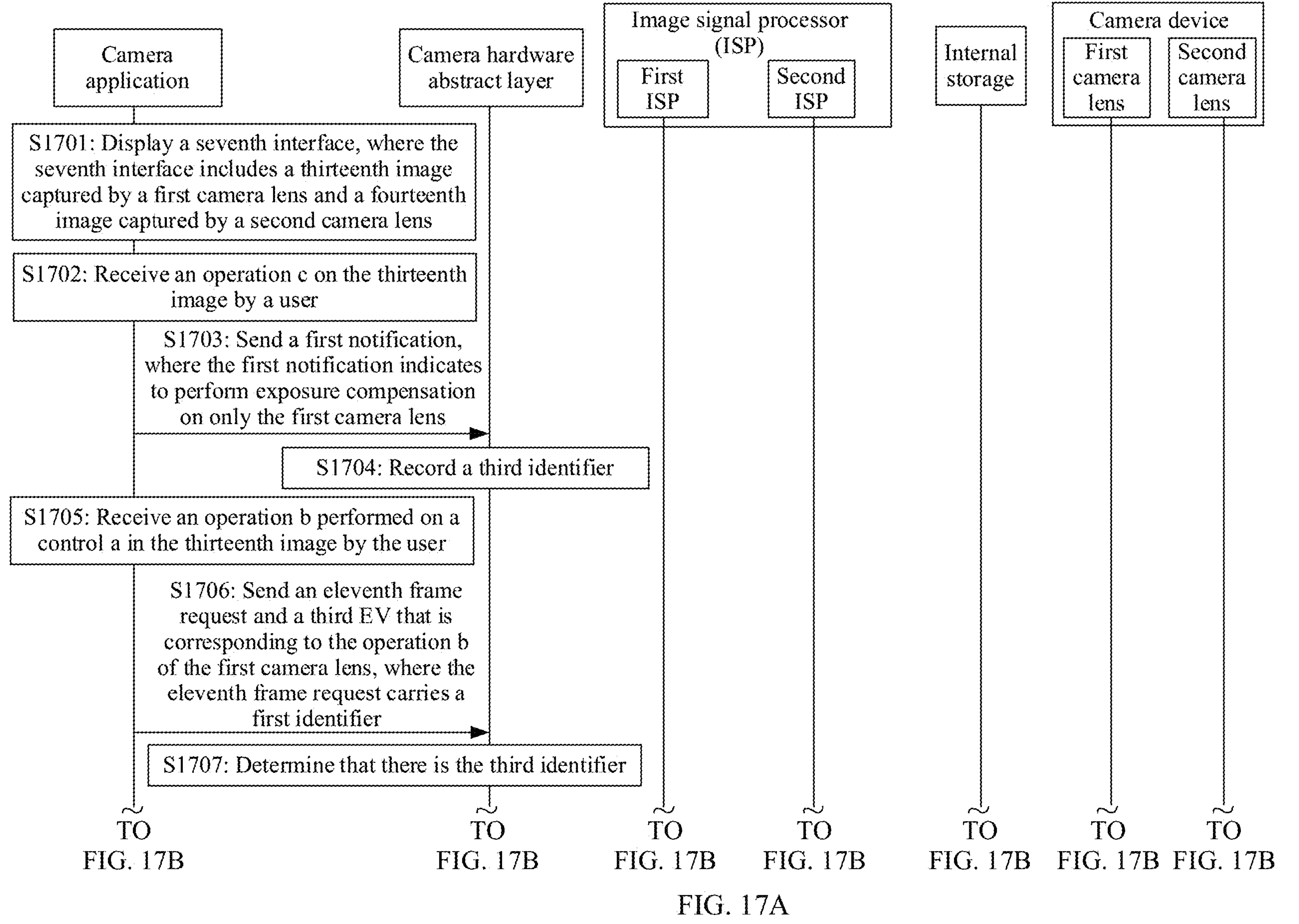
FIG. 17A to FIG. 17C are interaction diagrams 6 of an implementation of a shooting method according to an embodiment of this application.
Figure 17B:
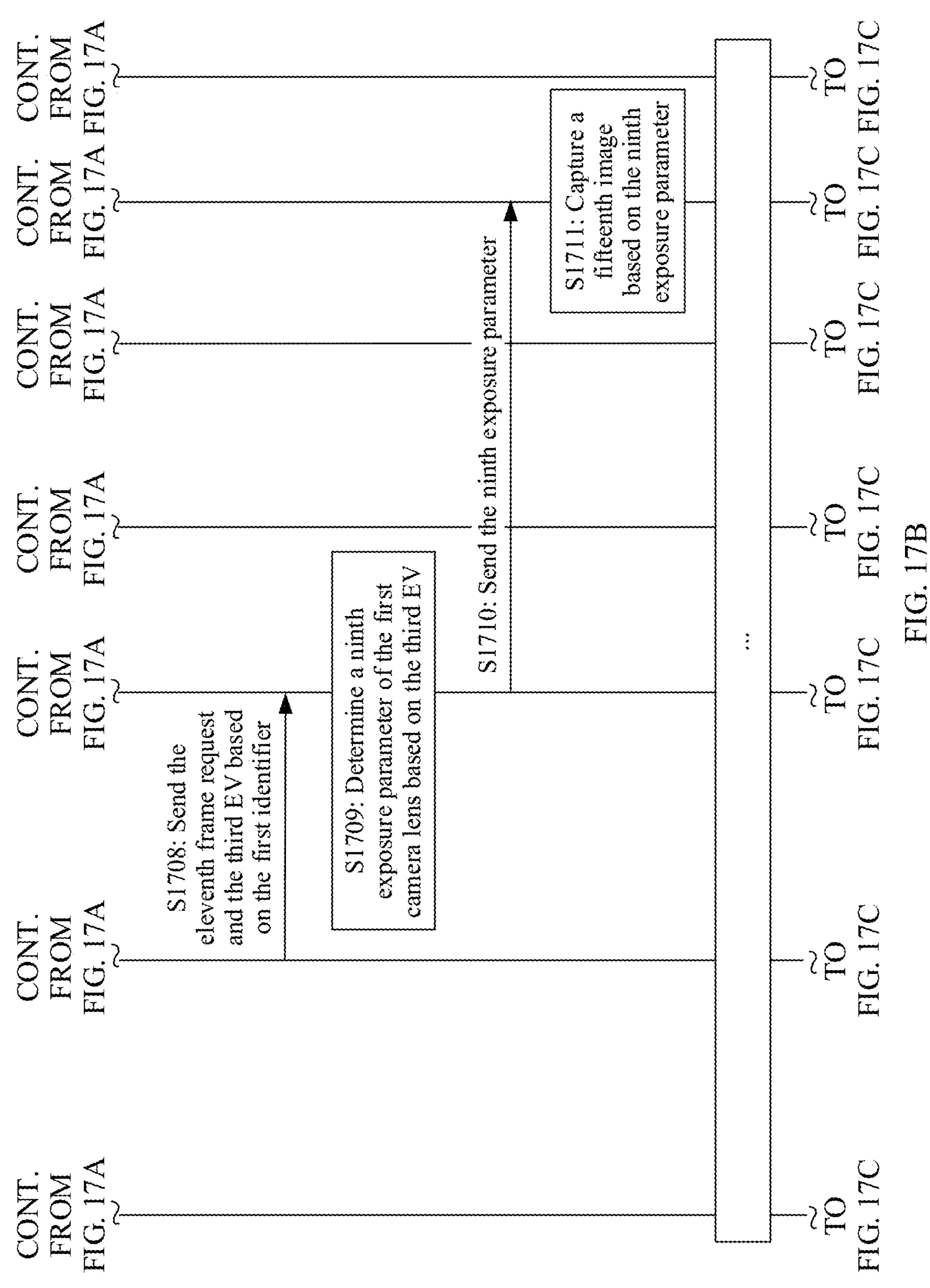
Figure 17C:
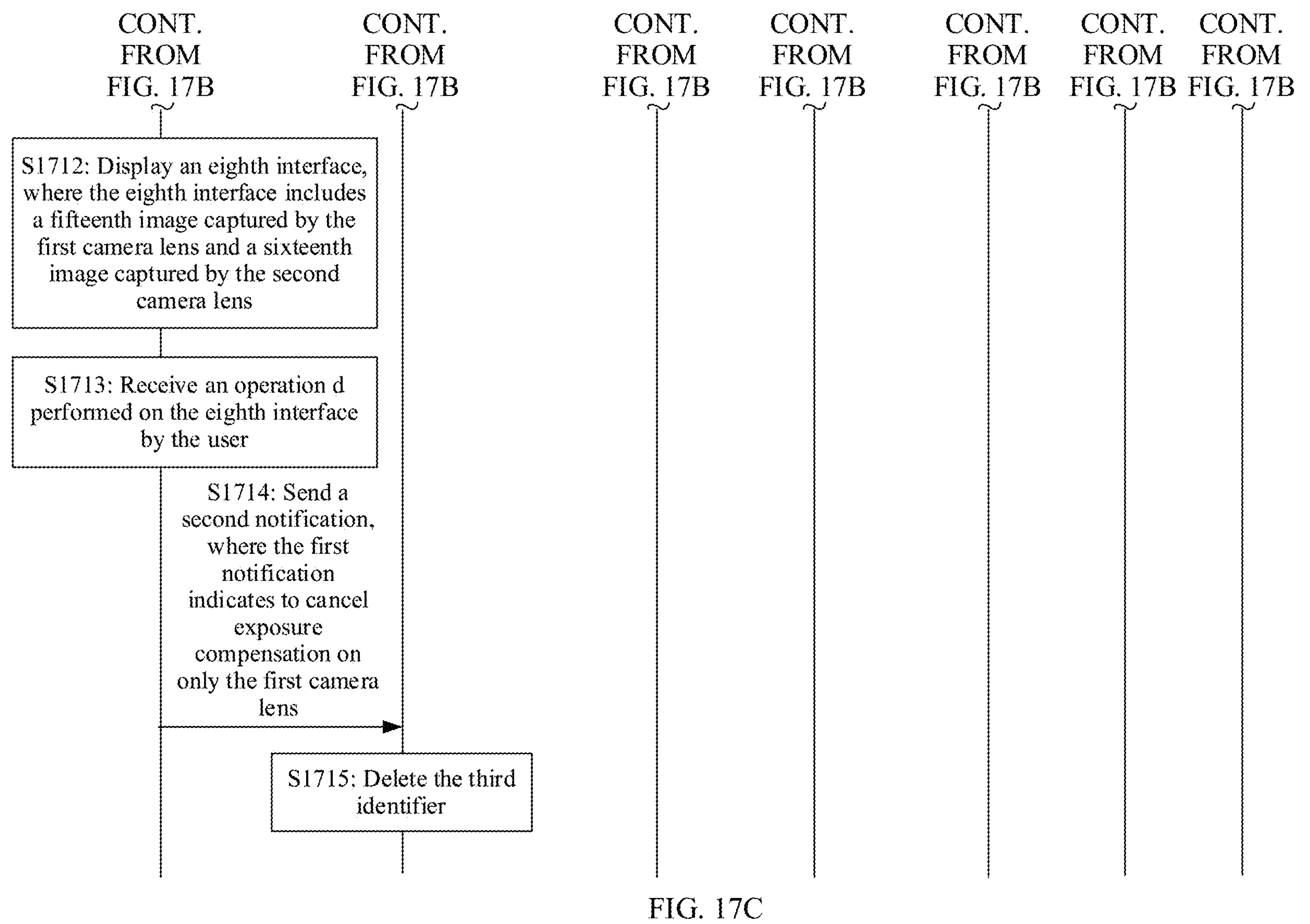
Figure 18A:
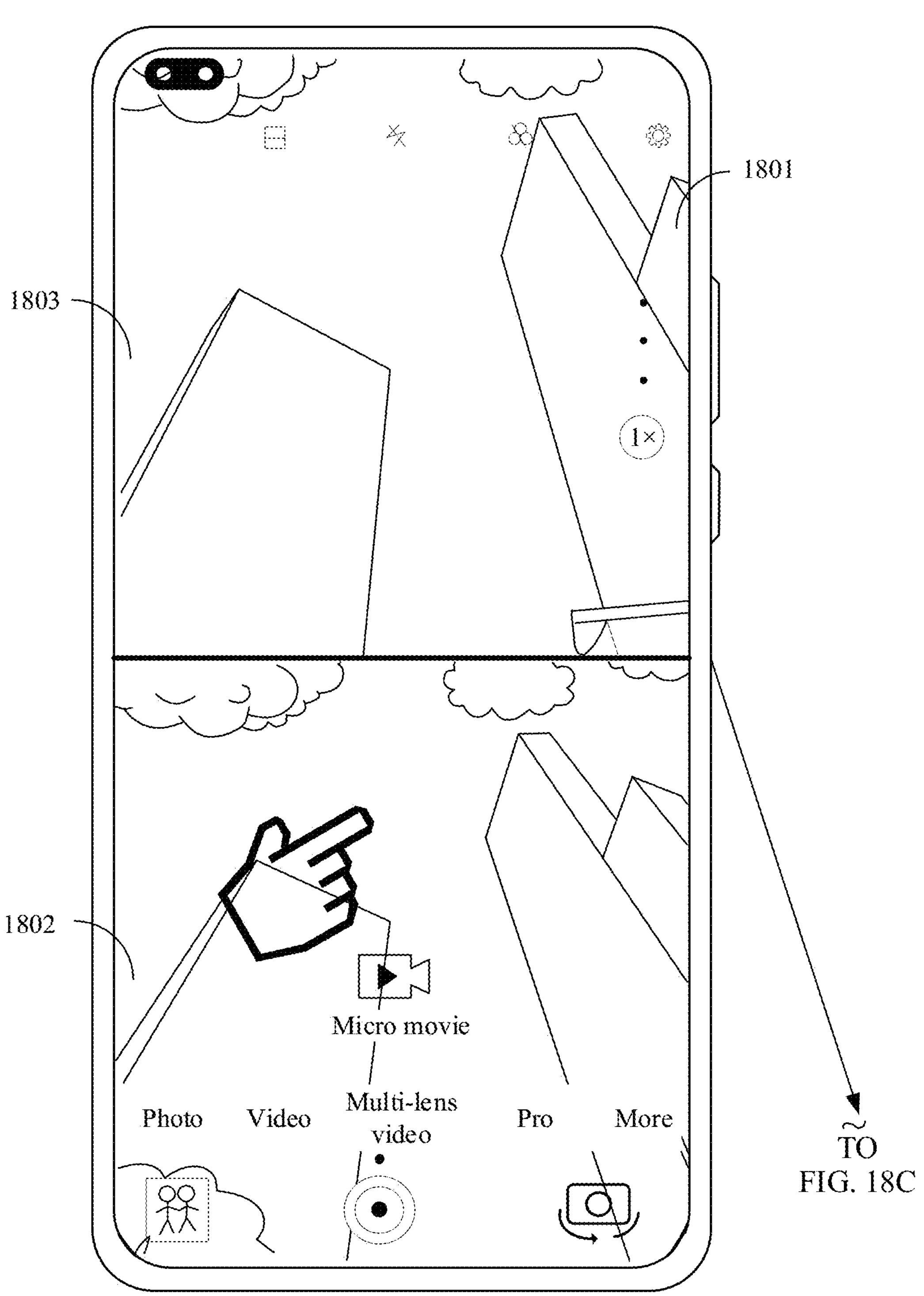
FIG. 18A to FIG. 18E are diagrams 8 of an interface of a mobile phone according to an embodiment of this application.
Figure 18B:
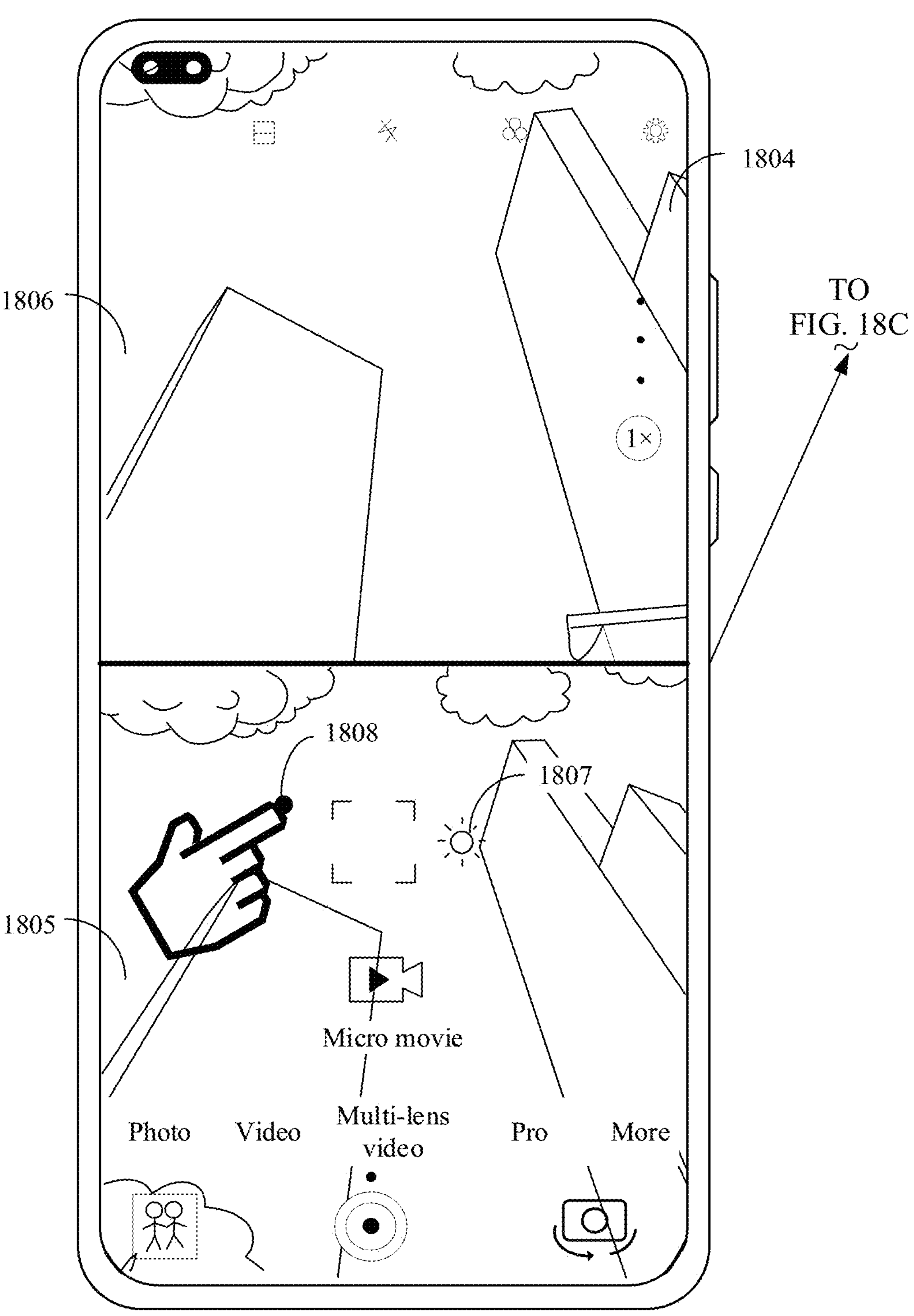
Figure 18C:
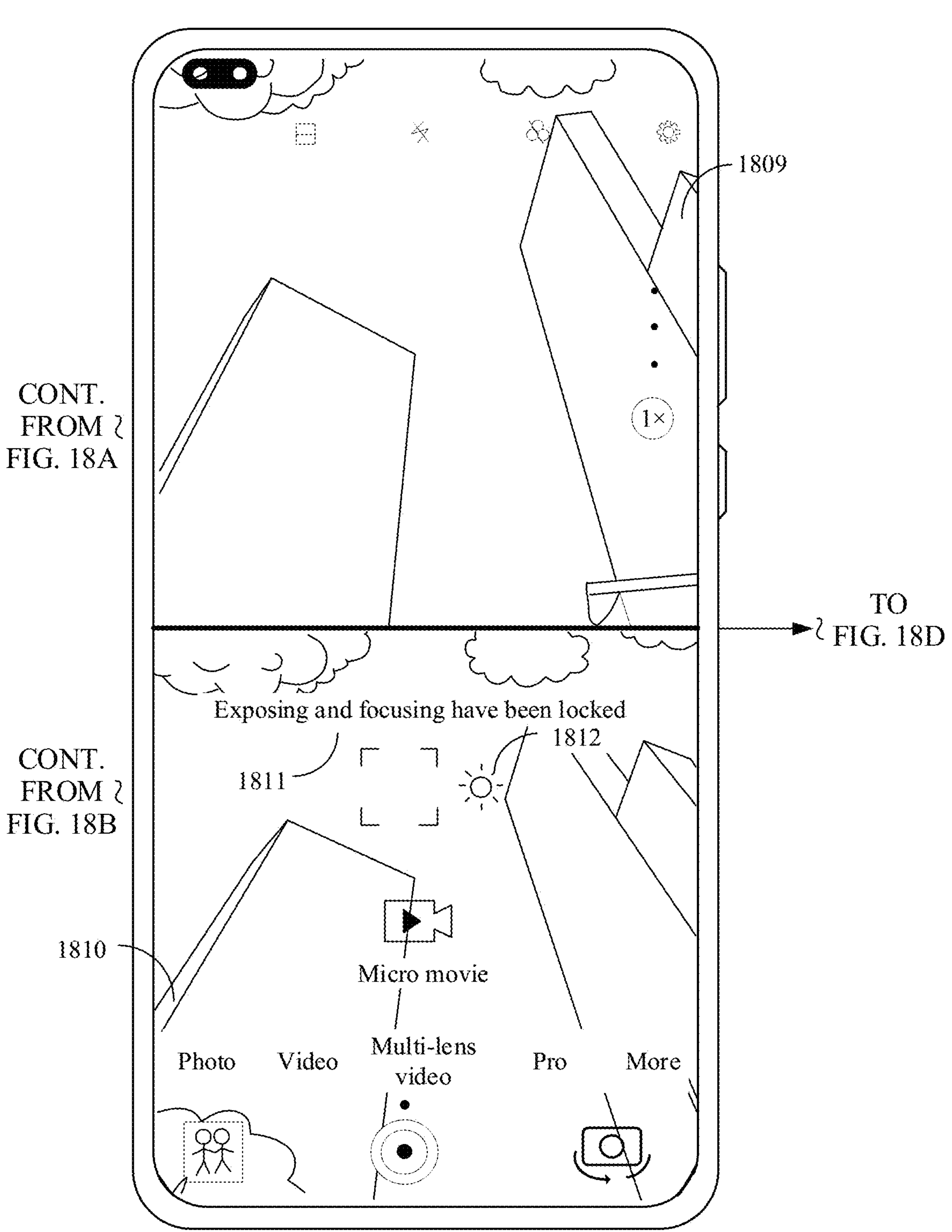
Figure 18D:
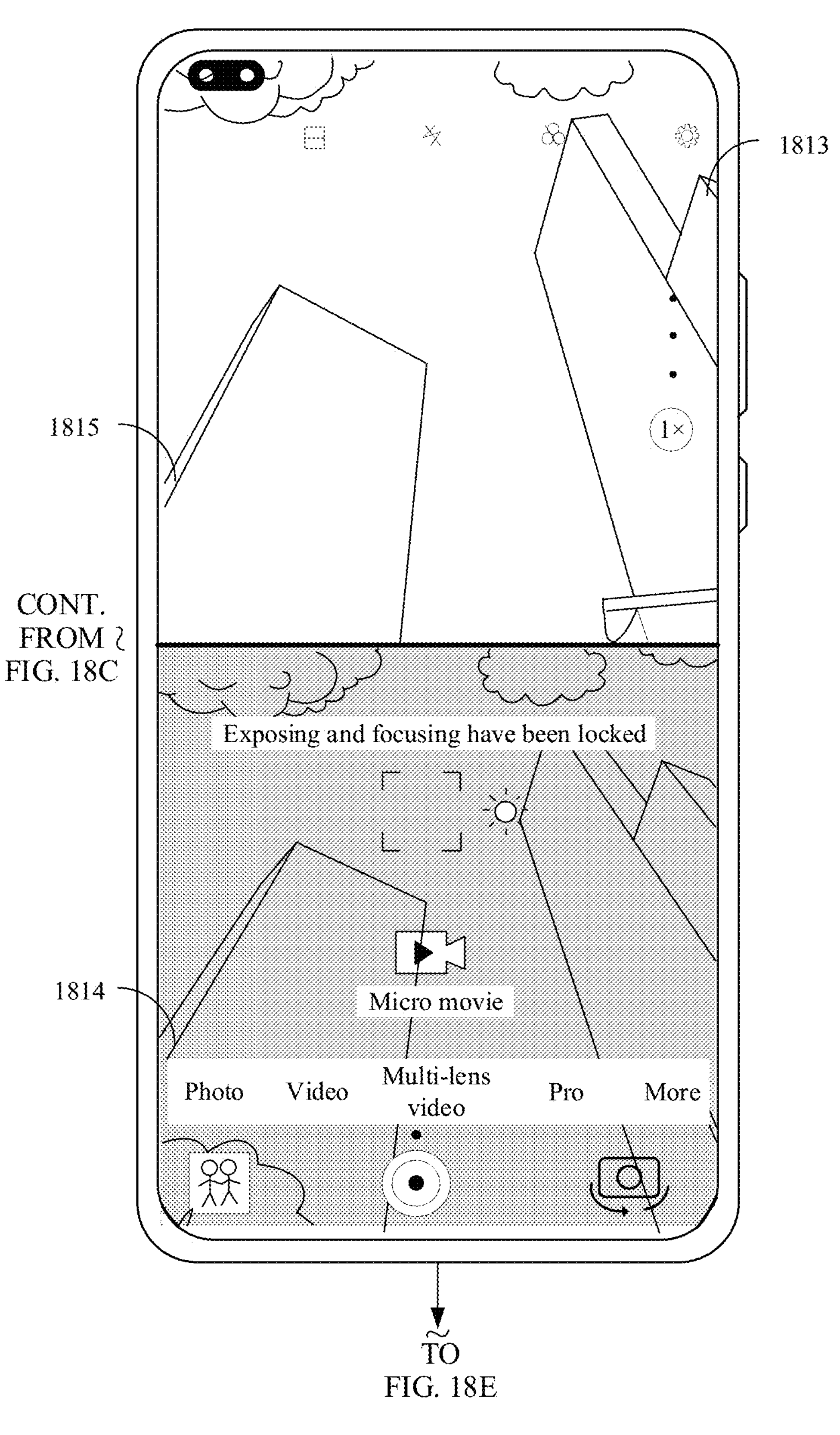
Figure 18E:
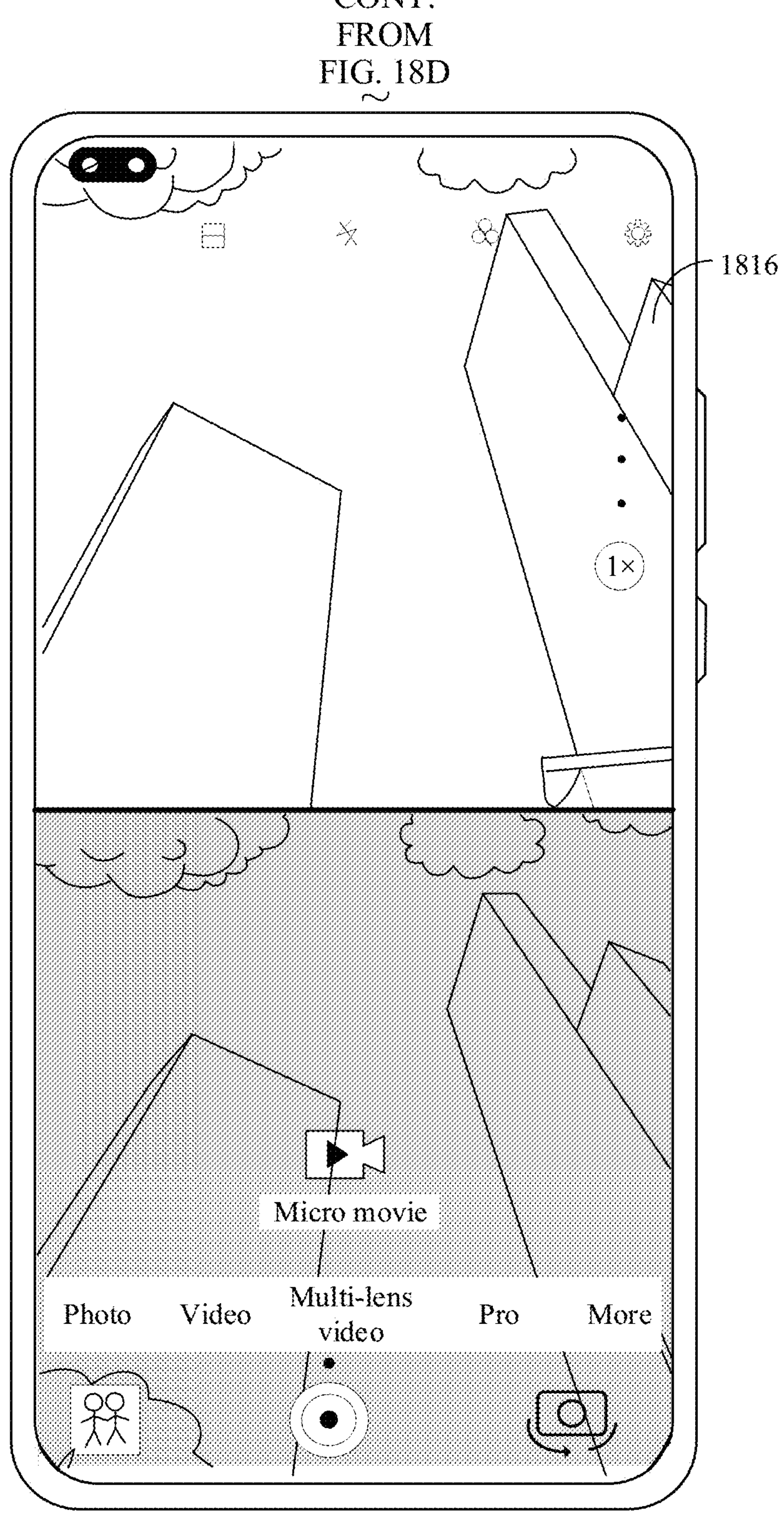

The following illustrates an implementation of this embodiment by using an example in which the any camera lens is the first camera lens. Refer to FIG. 17A to FIG. 17C. Specifically, a shooting method provided in this embodiment may include the following steps.

S1701: A camera application displays a seventh interface, and the seventh interface includes a thirteenth image captured by a first camera lens and a fourteenth image captured by a second camera lens.

It should be understood that the seventh interface may be any viewfinder interfaces in the foregoing embodiments.

For example, the seventh interface may be the first interface in the foregoing description, or an interface 1801 shown in FIG. 18A to FIG. 18E, the thirteenth image is an image 1802 in the interface 1801, and the fourteenth image is an image 1803 in the interface 1801.

For another example, the seventh interface is any interface in the foregoing second interface to the sixth interface, or an interface 1804 in shown in FIG. 18A to FIG. 18E, the thirteenth image is an image 1805 in the interface 1804, the fourteenth image is an image 1806 in the interface 1804, and the image 1805 displays a control a, that is, a button 1807.

S1702: The camera application receives an operation c performed on the thirteenth image by a user.

The operation c is used to trigger exposure compensation performed on only the first camera lens. The operation c may be a tap operation, a long press operation, a sliding gesture, or the like.

An example in which the thirteenth image is the image 1805 in the interface 1804 shown in FIG. 18A to FIG. 18E is used for illustration. The operation c may be a long press operation performed at a position 1808 in a non-control region in the image 1805 by the user.

In a specific implementation, after receiving the operation c performed on the thirteenth image by the user, the camera application may further display first prompt information on the thirteenth image. The first prompt information prompts to perform exposure compensation on only the first camera lens. For example, the first prompt information may be a prompt 1811 on an image 1810 in an interface 1809 shown in FIG. 18A to FIG. 18E, and main content is "Exposing and focusing have been locked". If the image 1810 is an image captured by the first camera lens, the prompt 1811 may prompt to perform exposure compensation on the only the first camera lens.

In a specific implementation, after receiving the operation c performed on the thirteenth image by the user, the camera application may further display the control a on the thirteenth image, to perform exposure compensation on the first camera lens. For example, before receiving the operation c performed on the thirteenth image, the camera application may display the interface 1801 shown in FIG. 18A to FIG. 18E. The thirteenth image is the image 1802 in the interface 1801, and the image 1802 does not display the control a. After receiving the operation c performed on the thirteenth image, the camera application may display the interface 1809 shown in FIG. 18A to FIG. 18E. The thirteenth image is the image 1810 in the interface 1809, and the image 1810 displays the control a, that is, the button 1812.

S1703: The camera application sends a first notification to the camera hardware abstract layer. The first notification indicates to perform exposure compensation on only the first camera lens.

S1704: The camera hardware abstract layer records a third identifier.

When the camera hardware abstract layer records the third identifier, it indicates that exposure compensation is currently performed on only the first camera lens.

S1705: The camera application receives an operation b performed on the control a in the thirteenth image by the user.

S1706: The camera application sends, to a camera hardware abstract layer, an eleventh frame request of the first camera lens and a third EV corresponding to the operation b. The eleventh frame request carries a first identifier.

In this embodiment, after receiving the frame request of the first camera lens and the EV corresponding to the operation b, the camera hardware abstract layer first queries whether the third identifier exists. If the camera hardware abstract layer obtains through querying the third identifier (as shown in S1707 below) exists, it is determined that exposure compensation is currently performed on only the first camera lens. On the contrary, if the camera hardware abstract layer does not obtain through querying the third identifier does not exist, it is determined that exposure compensation may be synchronously performed on a master synchronization camera lens and a slave synchronization camera lens. For example, exposure compensation may be synchronously performed according to a procedure similar to S904 to S919.

S1707: The camera hardware abstract layer determines that the third identifier exists.

That is, exposure compensation may be performed on only the first camera lens.

S1708: The camera hardware abstract layer sends the eleventh frame request and the third EV to a first ISP based on the first identifier.

In this embodiment, when exposure compensation is performed on only the first camera lens, the camera hardware abstract layer does not add configuration information (for example, second configuration information) to the frame request of the first camera lens. Therefore, a corresponding ISP does not determine whether the first camera lens is the master synchronization camera lens or the slave synchronization camera lens based on the configuration information, and does not process the frame request of the first camera lens according to a procedure of synchronously performing exposure compensation, for example, S906 to S908. That is, a determined exposure parameter is not stored in a common storage area. Processing is performed according to S1709 to S1711 below.

S1709: The first ISP determines a ninth exposure parameter of the first camera lens based on the third EV.

S1710: The first ISP sends the ninth exposure parameter to the first camera lens.

S1711: The first camera lens captures a fifteenth image based on the ninth exposure parameter.

S1712: The camera application displays an eighth interface, and the eighth interface includes the fifteenth image captured by the first camera lens and a sixteenth image captured by the second camera lens.

An example in which the seventh interface is the interface 1804 shown in FIG. 18A to FIG. 18E, the thirteenth image is an image 1805 in the interface 1804, and the fourteenth image is an image 1806 in the interface 1804 is used for illustration. The eighth interface may be an interface 1813 shown in FIG. 18A to FIG. 18E, the fifteenth image may be an image 1814 in the interface 1813, and the sixteenth image may be an image 1815 in the interface 1813. Apparently, the image captured by only the first camera lens significantly becomes dark, while the image captured by the second camera lens is not significantly changed.

It should be understood that, when S1701 to S1711 are performed, if the second camera lens does not capture a new frame of the image and report the new frame of the image to the camera application, the sixteenth image is the foregoing fourteenth image. When S1701 to S1711 are performed, if the second camera lens captures a new frame of the image and reports a new frame of the image to the camera application, the sixteenth image is a new image captured by the second camera lens.

It should be noted that in the foregoing embodiments in FIG. 17A to FIG. 17C and FIG. 18A to FIG. 18E, an example in which exposure compensation is performed on only the first camera lens is used for illustration. In practice, exposure compensation is performed on only the second camera lens. In this case, shooting may be completed according to a procedure similar to S1701 and S1712. For example, if the camera hardware abstract layer records a fourth identifier, it indicates that exposure compensation is performed on only the second camera lens. Then, after receiving the frame request and the EV corresponding to the operation b, the fourth identifier needs to be queried, and exposure compensation is implemented based on a query result according to a corresponding procedure. This is not described in this specification.

It can be learned from that, in this solution of this embodiment, based on synchronous exposure compensation, an identifier for canceling synchronous exposure compensation, for example, the third identifier and the fourth identifier, may further be flexibly configured. Therefore, a procedure for synchronously performing exposure compensation or a procedure for synchronously performing exposure compensation on a single camera lens may be flexibly configured.

In some scenarios, after completing exposure compensation performed on any camera lens, the user may not continuously perform exposure compensation on any single camera lens separately. Based on this, continuously refer to FIG. 17A to FIG. 17C. In some embodiments, the shooting method further includes the following steps.

S1713: The camera application receives an operation d performed on the eighth interface by the user.

The operation d may be a tap operation, a long press operation, a sliding gesture, or the like. For example, if the eighth interface is the interface 1813 shown in FIG. 18A to FIG. 18E, the operation d may be a tap operation on any non-control area in the interface 1813.

In a specific implementation, after receiving the operation d performed on the eighth interface by the user, the camera application may further conceal displaying of the first prompt information. For example, after receiving the operation d performed on the eighth interface by the user, the camera application may display an interface 1816 shown in FIG. 18A to FIG. 18E. The interface 1816 does not include the first prompt information, for example, "Exposing and focusing have been locked".

S1714: The camera application sends a second notification to the camera hardware abstract layer. The second notification indicates to conceal to perform exposure compensation on only the single camera lens.

S1715: The camera hardware abstract layer deletes the third identifier.

After the third identifier is deleted, the third identifier may not be subsequently obtained through querying. Therefore, shooting may not be completed according to a procedure (the foregoing S1708 to S1711) for performing exposure compensation on only the first camera lens, but to be completed by synchronously performing exposure compensation.

The foregoing embodiments in FIG. 5A to FIG. 5C to FIG. 18A to FIG. 18E mainly illustrate the specific implementation of synchronously performing exposure compensation. During actual shooting, white balance may be synchronously performed. Generally, the user may not trigger adjustment on the white balance by operating a viewfinder interface. However, only when a new frame of the image needs to be captured, the mobile phone automatically triggers the adjustment, that is, automatically triggers AWB. Correspondingly, the foregoing embodiments in FIG. 7A to FIG. 7C to FIG. 18A to FIG. 18E are usually not applicable to synchronizing a white balance parameter. Therefore, the white balance may only be synchronously implemented according to an embodiment similar to embodiments in FIG. 5A to FIG. 5C.

Figure 19A:
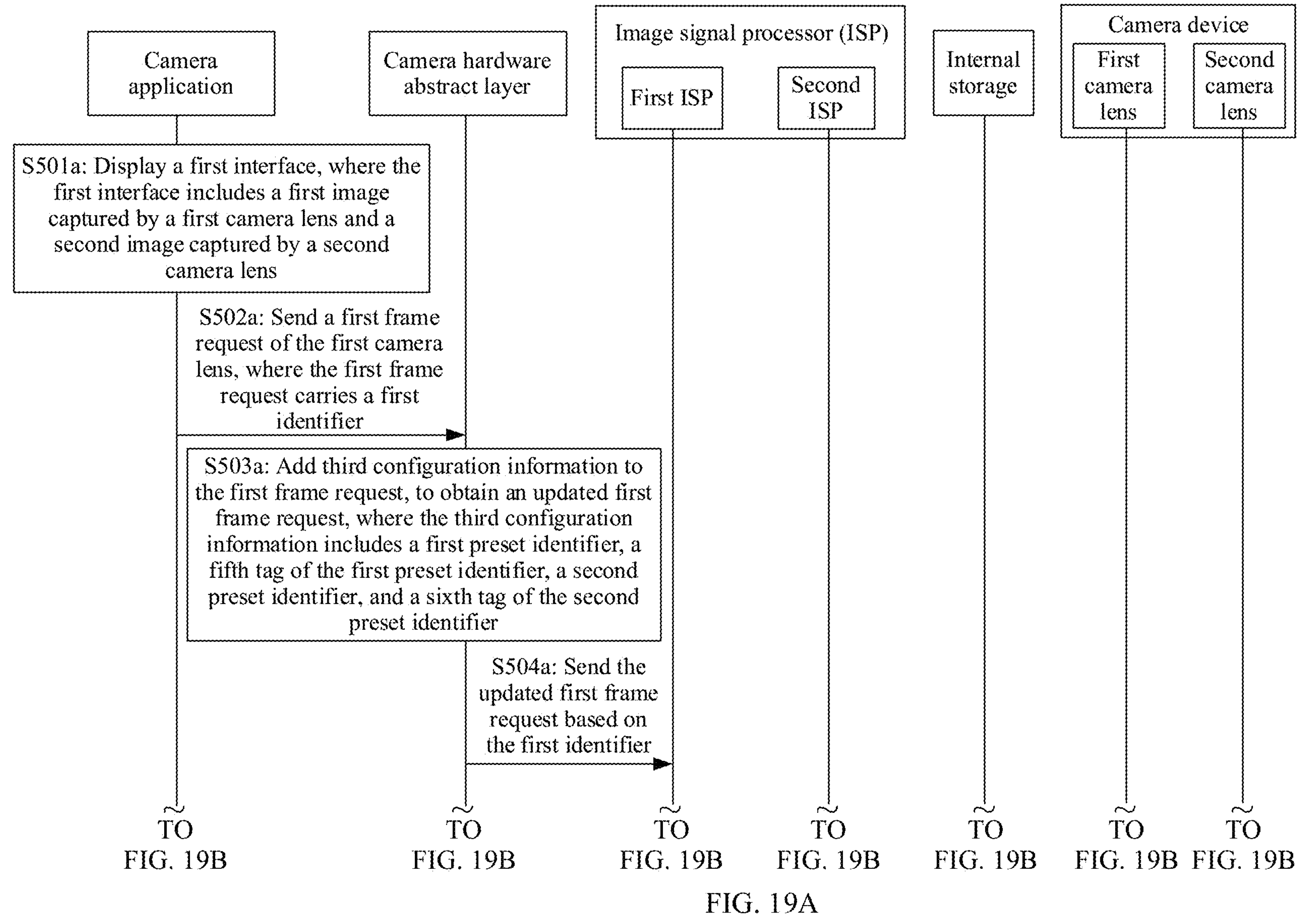
FIG. 19A to FIG. 19C are interaction diagrams 7 of an implementation of a shooting method according to an embodiment of this application.
Figure 19B:
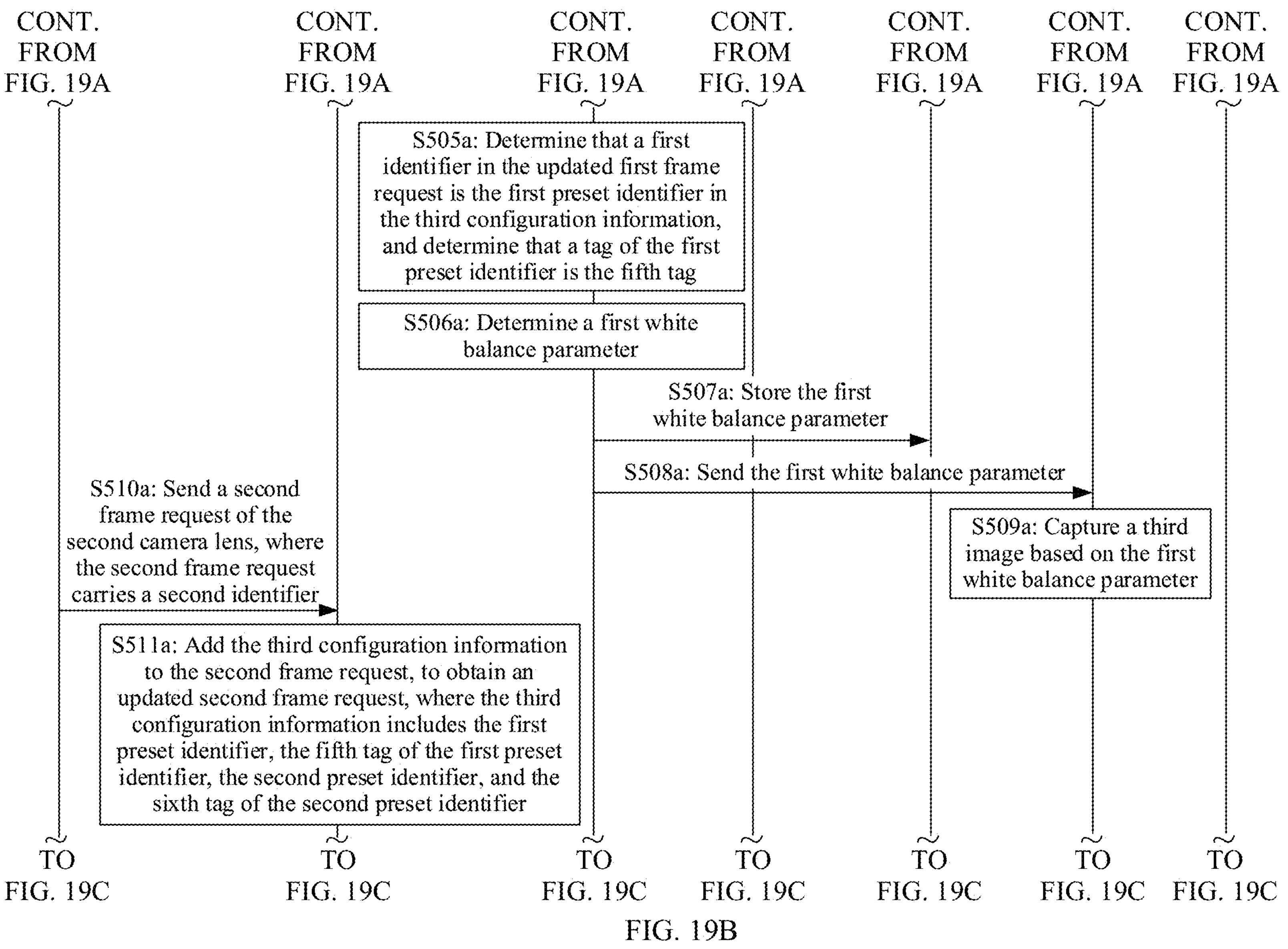
Figure 19C:
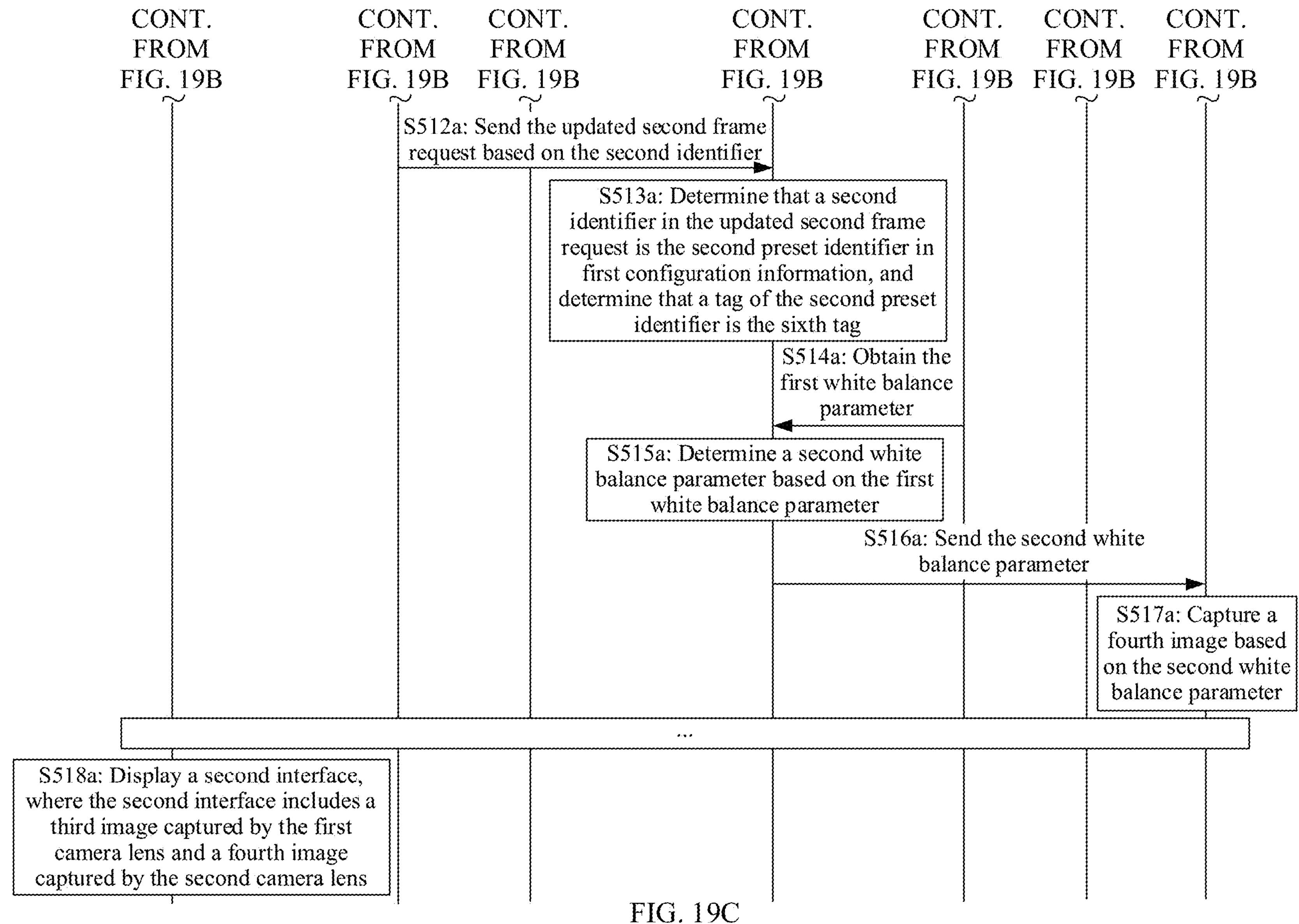

Refer to FIG. 19A to FIG. 19C. Specifically, a shooting method provided in this embodiment may include the following steps.

S501*a*: A camera application displays a first interface, and the first interface includes a first image captured by a first camera lens and a second image captured by a second camera lens.

S502*a*: The camera application sends a first frame request of the first camera lens to a camera hardware abstract layer, and the first frame request carries a first identifier.

S503*a*: The camera hardware abstract layer adds third configuration information to the first frame request, to obtain an updated first frame request, where the third configuration information includes a first preset identifier, a fifth tag of the first preset identifier, a second preset identifier, and a sixth tag of the second preset identifier.

The first preset identifier is an identifier of a master synchronization camera lens, and the fifth tag indicates an attribute of a camera lens indicated by the first preset identifier. The second preset identifier is an identifier of a slave synchronization camera lens, and the sixth tag indicates an attribute of a camera lens indicated by the second preset identifier. If AWB in a shooting process is mainly involved in this embodiment, the attribute of the camera lens indicated by the first preset identifier is to synchronously perform AWB on the master synchronization camera lens, and accordingly, the fifth tag may be AWB-SYNC-TAG-MASTER. The attribute of the camera lens indicated by the second preset identifier is to synchronously perform AWB on the slave synchronization camera lens, and accordingly, the sixth tag may be AWB-SYNC-TAG-SLAVE.

For example, the third configuration information may be {1, AWB-SYNC-TAG-MASTER; 2, AWB-SYNC-TAG-SLAVE}, indicating that the camera lens of which the identifier is 1 is the master synchronization camera lens on which AWB is synchronously performed, and the camera lens of which the identifier is 2 is the slave synchronization camera lens on which AWB is synchronously performed.

S504*a*: The camera hardware abstract layer sends the updated first frame request to a first ISP based on the first identifier.

S505*a*: The first ISP determines that a first identifier in the updated first frame request is the first preset identifier in the third configuration information, and determines that a tag of the first preset identifier is the fifth tag.

After determining that the tag is the fifth tag, it is determined that a current frame request is specific to the master synchronization camera lens. Subsequently, the white balance parameter needs to be determined and stored according to S506*a* and S507*a* below, to enable the slave synchronization camera lens to obtain the white balance parameter.

S506*a*: The first ISP determines a first white balance parameter. For example, the first ISP may determine the first white balance parameter based on an AWB algorithm in a 3A algorithm.

S507*a*: The first ISP stores the first white balance parameter.

S508*a*: The first ISP sends the first white balance parameter to the first camera lens.

S509*a*: The first camera lens captures a third image based on the first white balance parameter.

S510*a*: The camera application sends a second frame request of the second camera lens to the camera hardware abstract layer. The second frame request includes a second identifier.

S511*a*: The camera hardware abstract layer adds the third configuration information to the second frame request, to obtain an updated second frame request, where the third configuration information includes the first preset identifier, the fifth tag of the first preset identifier, the second preset identifier, and the sixth tag of the second preset identifier.

S512*a*: The camera hardware abstract layer sends the updated second frame request to a second ISP based on the second identifier.

S513*a*: The second ISP determines that a second identifier in the updated second frame request is the second preset identifier in the first configuration information, and determines that a tag of the second preset identifier is the sixth tag.

After determining that the tag is the fifth tag, that is, after determining that a current frame request is specific to the slave synchronization camera lens, the white balance parameter needs to be determined according to S514*a* and S515*a* below, to synchronously perform white balance on the master synchronization camera lens.

S514*a*: The second ISP obtains the first white balance parameter.

S515*a*: The second ISP determines a second white balance parameter based on the first white balance parameter.

S516*a*: The second ISP sends the second white balance parameter to the second camera lens.

S517*a*: The second camera lens captures a fourth image based on the second white balance parameter.

S518*a*: The camera application displays a second interface. The second interface includes the third image captured by the first camera lens and the fourth image captured by the second camera lens.

Figure 5A:
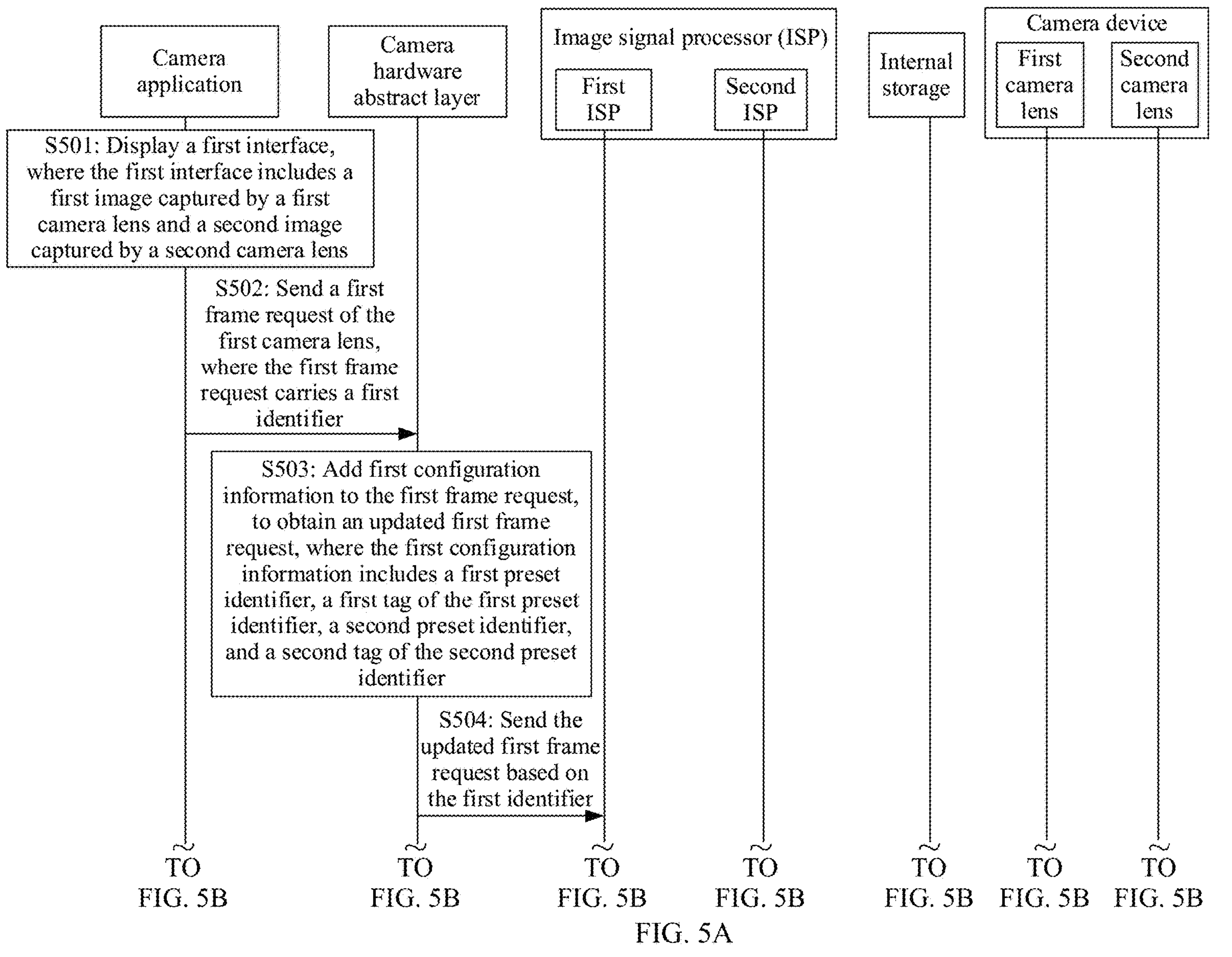
FIG. 5A to FIG. 5C are interaction diagrams 1 of an implementation of a shooting method according to an embodiment of this application.
Figure 5B:
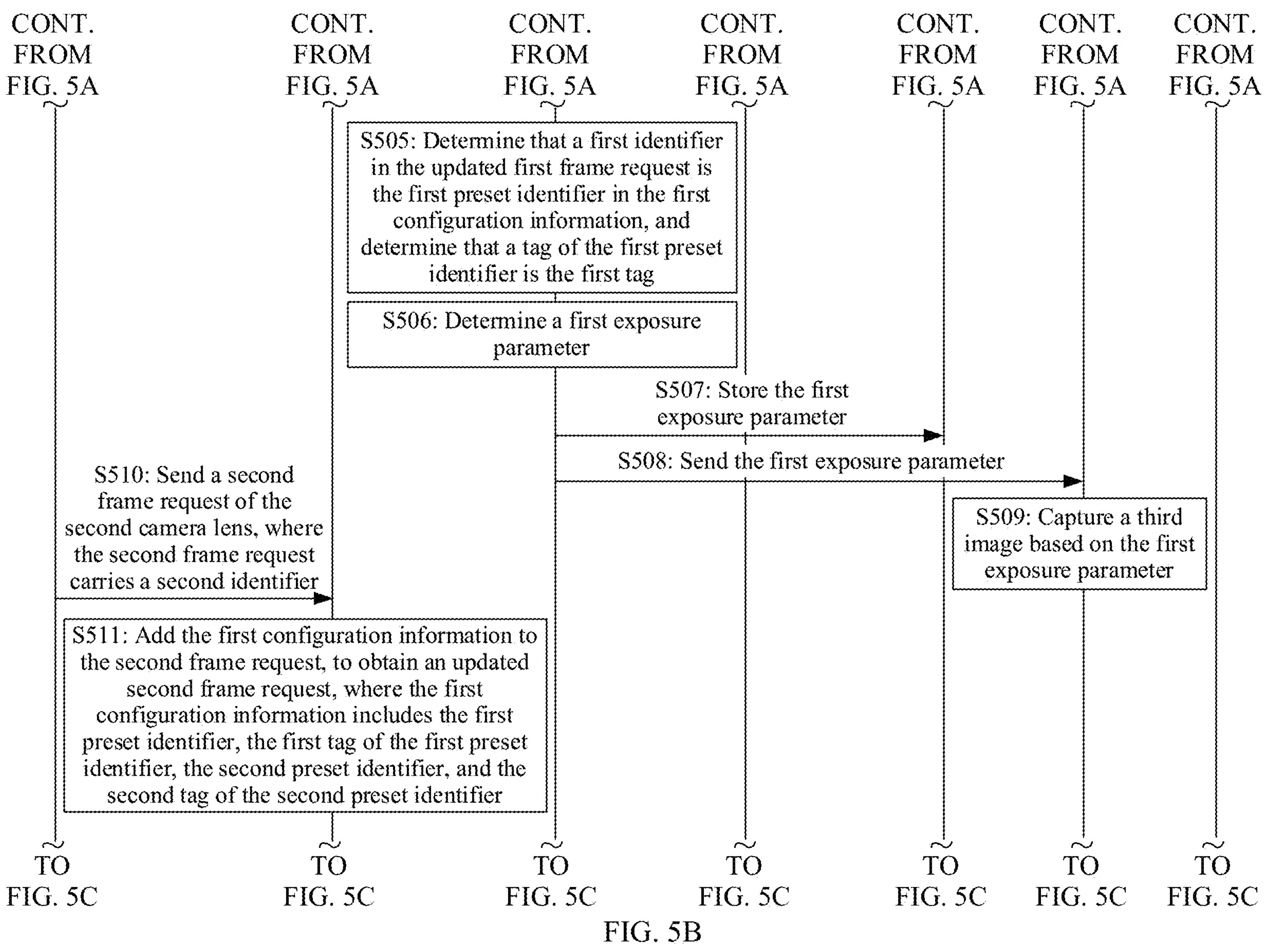
Figure 5C:
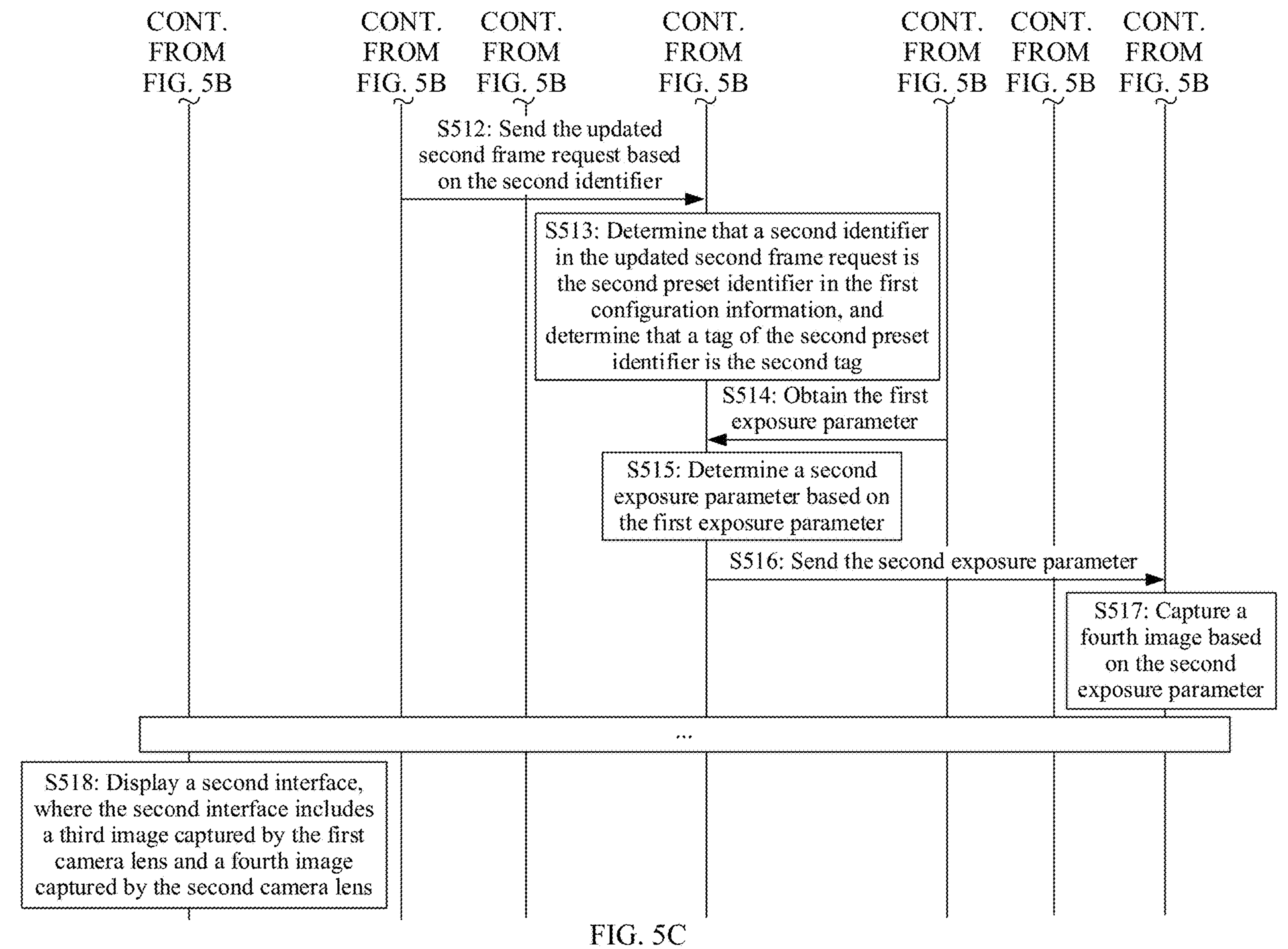

For a part that is not described in detail in embodiments in FIG. 19A to FIG. 19C, reference may be made to related description in embodiments in FIG. 5A to FIG. 5C, provided that the exposure in embodiments in FIG. 5A to FIG. 5C is changed into white balance. Details are not described herein.

It should be noted that embodiments in FIG. 19A to FIG. 19C may be used in combination with any embodiments in FIG. 5A to FIG. 5C to FIG. 18A to FIG. 18E. Therefore, when exposure is synchronously implemented, white balance may further be synchronously implemented.

An embodiment of this application further provides an electronic device. The electronic device may include a memory and one or more processors. The memory is coupled to the processor. The memory is configured to store computer program code. The computer program code includes computer instructions. When the processor executes the computer instructions, the electronic device may perform the functions or steps performed by the devices in the foregoing method embodiments.

Figure 20:
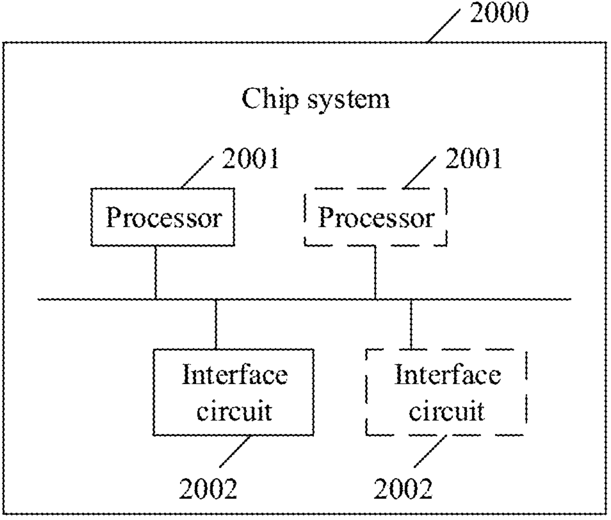
FIG. 20 is a schematic diagram of composition of a chip system according to an embodiment of this application.

An embodiment of this application further provides a chip system. As shown in FIG. 20, a chip system 2000 includes at least one processor 2001 and at least one interface circuit 2002. The processor 2001 and the interface circuit 2002 may be connected by a line. For example, the interface circuit 2002 may be configured to receive a signal from another apparatus (for example, the memory of the electronic device). For another example, the interface circuit 2002 may be configured to transmit a signal to another apparatus (for example, the processor 2001). For example, the interface circuit 2002 may read an instruction stored in the memory, and send the instruction to the processor 2001. When executed by the processor 2001, the instruction causes the electronic device to perform each step in the foregoing embodiment. Certainly, the chip system may further include another discrete device. This is not specifically limited in embodiments of this application.

An embodiment further provides a computer storage medium. The computer storage medium stores computer instructions. When the computer instructions are run on an electronic device, the electronic device is enabled to perform the foregoing related method steps to implement the image processing method in the foregoing embodiments.

An embodiment further provides a computer program product. When the computer program product is run on a computer, the computer is enabled to perform the foregoing related steps to implement the image processing method in the foregoing embodiments.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, so that the chip performs the image processing method in the foregoing method embodiments.

The electronic device, the computer storage medium, the computer program product, or the chip provided in embodiments is configured to perform the corresponding method provided above. Therefore, for beneficial effect that can be achieved, reference may be made to the beneficial effect of the corresponding method provided above. Details are not described herein.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to requirements, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic, mechanical, or another form.

The units described as separate parts may or may not be physically separate, and parts displayed as units may be one or more physical units, may be located in one place, or may be distributed in multiple different places. Some or all of the units may be selected according to actual needs to achieve the objectives of the solutions of embodiments.

In addition, functional units in embodiments of this application may be integrated into one processing unit, or each of the units may exist alone physically, or two or more units are integrated into one unit. The integrated unit may be implemented in the form of hardware, or may be implemented in the form of a software function unit.

If the integrated unit is implemented in the form of a software functional unit and sold or used as an independent product, the integrated unit may be stored in a readable storage medium. Based on such an understanding, the technical solutions in embodiments of this application essentially, or the part contributing to conventional technologies, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended to describe the technical solutions of this application, but are not intended to limit this application. Although this application is described in detail with reference to example embodiments, a person of ordinary skill in the art should understand that modification or equivalent replacement may be made to the technical solutions of this application without departing from the spirit and scope of the technical solutions of this application.

What is claimed is:

1. A method, comprising:

displaying a first interface comprising a first image captured by a first camera lens of an electronic device and a second image captured by a second camera lens of the electronic device, wherein a field of view of the first camera lens is different than a field of view of the second camera lens;

determining which is a larger field of view between the field of view of the first camera lens and the field of view of the second camera lens;

receiving a first operation performed on the second image, wherein the first operation is configured to trigger the electronic device to adjust an exposure parameter of the second camera lens;

responsive to receiving the first operation, determining, based on the first operation and the larger field of view, a first adjusted exposure parameter of the first camera lens or the second camera lens;

after determining the first adjusted exposure parameter, automatically determining a second adjusted exposure parameter of the other of the first camera lens and the second camera lens based on the first adjusted exposure parameter; and displaying a second interface in response to the first operation, wherein the second interface comprises a third image captured by the first camera lens and a fourth image captured by the second camera lens, wherein either a) an exposure of the third image is higher than an exposure of the first image, and an exposure of the fourth image is higher than an exposure of the second image, or b) the exposure of the third image is lower than the exposure of the first image, and the exposure of the fourth image is lower than the exposure of the second image.

2. The method of claim 1, wherein the first camera lens and the second camera lens are either both front-facing camera lenses or both rear-facing camera lenses.

3. The method of claim 1, wherein the field of view of the first camera lens is greater than the field of view of the second camera lens.

4. The method of claim 3, wherein a touch position of the first operation is within a first region of the second image, and image content displayed in the first region is located within a second region of the first image, wherein if an image parameter in the second region of the first image meets a first preset condition, the exposure of the third image is lower than the exposure of the first image, and the exposure of the fourth image is lower than the exposure of the second image, wherein if the image parameter in the second region of the first image meets a second preset condition, the exposure of the third image is higher than the exposure of the first image, and the exposure of the fourth image is higher than the exposure of the second image, and wherein the image parameter comprises at least one of clarity, contrast, and a sharpening degree.

5. The method of claim 3, wherein displaying the second interface is based on an identifier of the second camera lens not being a first preset identifier.

6. The method of claim 1, wherein the field of view of the first camera lens is smaller than the field of view of the second camera lens.

7. The method of claim 6, wherein a touch position of the first operation is within a first region of the second image, wherein if an image parameter in the first region of the second image meets a first preset condition, the exposure of the third image is lower than the exposure of the first image, and the exposure of the fourth image is lower than the exposure of the second image, wherein if the image parameter in the first region of the second image meets a second preset condition, the exposure of the third image is higher than the exposure of the first image, and the exposure of the fourth image is higher than the exposure of the second image, and wherein the image parameter comprises at least one of clarity, contrast, and a sharpening degree.

8. The method of claim 6, wherein displaying the second interface is based on an identifier of the first camera lens being a first preset identifier.

9. The method of claim 1, wherein the first operation indicates a first exposure value (EV) for exposure compensation, wherein if the first EV is greater than a first preset EV, the exposure of the third image is higher than the exposure of the first image, and the exposure of the fourth image is higher than the exposure of the second image, wherein if the first EV is less than a second preset EV, the exposure of the third image is lower than the exposure of the first image, the exposure of the fourth image is lower than the exposure of the second image, and wherein the second preset EV is less than or equal to the first preset EV.

10. The method of claim 9, wherein the second image in the first interface comprises a first control that is configured to trigger the electronic device to adjust an exposure parameter of the second camera lens, and wherein the first operation comprises a sliding operation performed on the first control.

11. The method of claim 1, wherein a second preset identifier is not obtained through querying by the electronic device before displaying the second interface, and wherein the second preset identifier indicates to adjust only the exposure parameter of the second camera lens.

12. The method of claim 11, wherein after displaying the first interface, the method further comprises:

receiving a second operation performed on the second image, wherein the second operation is configured to trigger the electronic device to adjust the exposure parameter of the second camera lens, but not to adjust an exposure parameter of the first camera lens; and recording the second preset identifier in response to the second operation.

13. The method of claim 12, wherein after receiving the second operation, the method further comprises displaying first prompt information in the first interface in response to the second operation, wherein the first prompt information prompts to adjust only the exposure parameter of the second camera lens.

14. The method of claim 12, further comprising displaying a third interface in response to the first operation when the second preset identifier is obtained through querying, wherein the third interface comprises a fifth image captured by the first camera lens and a sixth image captured by the second camera lens, and wherein an absolute difference between an exposure of the fifth image and the exposure of the first image is less than an absolute difference between an exposure of the sixth image and the exposure of the second image.

15. An electronic device, comprising:

a first camera lens;

a second camera lens;

a display one or more processors coupled to the display; and a memory coupled to the one or more processors and configured to store instructions that, when executed by the one or more processors, cause the electronic device to be configured to:

display a first interface comprising a first image captured by the first camera lens and a second image captured by the second camera lens, wherein a field of view of the first camera lens is different than a field of view of the second camera lens;

determine which is a larger field of view between the field of view of the first camera lens and the field of view of the second camera lens;

receive a first operation performed on the second image, wherein the first operation is configured to trigger the electronic device to adjust an exposure parameter of the second camera lens;

responsive to receiving the first operation, determine, based on the first operation; and the larger field of view a first adjusted exposure parameter of the first camera lens;

after determining the first adjusted exposure parameter, automatically determine a second adjusted exposure parameter of the other of the first camera lens and the second camera lens based on the first adjusted exposure parameter; and display a second interface in response to the first operation, wherein the second interface comprises a third image captured by the first camera lens and a fourth image captured by the second camera lens, wherein either a) an exposure of the third image is higher than an exposure of the first image, and an exposure of the fourth image is higher than an exposure of the second image, or b) the exposure of the third image is lower than the exposure of the first image, and the exposure of the fourth image is lower than the exposure of the second image.

16. The electronic device of claim 15, wherein the field of view of the first camera lens is greater than the field of view of the second camera lens.

17. The electronic device of claim 16, wherein a touch position of the first operation is within a first region of the second image, and image content displayed in the first region is located within a second region of the first image, wherein if an image parameter in the second region of the first image meets a first preset condition, the exposure of the third image is lower than the exposure of the first image, and the exposure of the fourth image is lower than the exposure of the second image, wherein if the image parameter in the second region of the first image meets a second preset condition, the exposure of the third image is higher than the exposure of the first image, and the exposure of the fourth image is higher than the exposure of the second image, and wherein the image parameter comprises clarity, contrast, and a sharpening degree.

18. The electronic device of claim 15, wherein the field of view of the first camera lens is smaller than the field of view of the second camera lens.

19. The electronic device of claim 18, wherein a touch position of the first operation is within a first region of the second image, wherein if an image parameter in the first region of the second image meets a first preset condition, the exposure of the third image is lower than the exposure of the first image, and the exposure of the fourth image is lower than the exposure of the second image, wherein if the image parameter in the first region of the second image meets a second preset condition, the exposure of the third image is higher than the exposure of the first image, and the exposure of the fourth image is higher than the exposure of the second image, and wherein the image parameter comprises at least one of clarity, contrast, and a sharpening degree.

20. A non-transitory computer-readable storage medium storing instructions that, and when executed by one or more processors of an electronic device, cause the electronic device to be configured to:

display a first interface comprising a first image captured by a first camera lens of the electronic device and a second image captured by a second camera lens of the electronic device, wherein a field of view of the first camera lens is different than a field of view of the second camera lens;

determine which is a larger field of view between the field of view of the first camera lens and the field of view of the second camera lens;

receive a first operation performed on the second image, wherein the first operation is configured to trigger the electronic device to adjust an exposure parameter of the second camera lens;

responsive to receiving the first operation, determine, based on the first operation and the larger field of view, a first adjusted exposure parameter of the first camera lens;

after determining the first adjusted exposure parameter, automatically determine a second adjusted exposure parameter of the other of the first camera lens or the second camera lens based on the first adjusted exposure parameter; and display a second interface in response to the first operation, wherein the second interface comprises a third image captured by the first camera lens and a fourth image captured by the second camera lens, wherein either a) an exposure of the third image is higher than an exposure of the first image, and an exposure of the fourth image is higher than an exposure of the second image, or b) the exposure of the third image is lower than the exposure of the first image, and the exposure of the fourth image is lower than the exposure of the second image.

* * * * *